US005514430A

United States Patent [19]
Andersen et al.

[11] Patent Number: 5,514,430
[45] Date of Patent: May 7, 1996

[54] COATED HYDRAULICALLY SETTABLE CONTAINERS AND OTHER ARTICLES FOR STORING, DISPENSING, AND PACKAGING FOOD AND BEVERAGES

[75] Inventors: Per J. Andersen; Simon K. Hodson, both of Santa Barbara, Calif.

[73] Assignee: E. Khashoggi Industries, Santa Barbara, Calif.

[21] Appl. No.: 320,522

[22] Filed: Oct. 7, 1994

Related U.S. Application Data

[60] Division of Ser. No. 95,662, Jul. 21, 1993, Pat. No. 5,385,764, which is a continuation-in-part of Ser. No. 929,893, Aug. 11, 1992, abandoned, and Ser. No. 19,151, Feb. 17, 1993, Pat. No. 5,453,310.

[51] Int. Cl.[6] .............................. B32B 13/00; C04B 14/00
[52] U.S. Cl. ........................ 428/34.4; 428/34.5; 428/34.7; 428/35.4; 428/36.5; 428/36.6; 428/312.4; 428/319.3; 428/703; 106/400; 106/638; 206/449; 206/524.3; 206/524.6; 206/524.7
[58] Field of Search ................................ 428/34.4, 34.5, 428/34.7, 35.4, 36.5, 36.6, 312.4, 319.3, 703; 206/449, 524.3, 524.6, 524.7; 106/400, 638

[56] References Cited

U.S. PATENT DOCUMENTS

| 109,669 | 11/1870 | Rowland . |
| 128,980 | 7/1872 | Rowland . |

(List continued on next page.)

FOREIGN PATENT DOCUMENTS

| 0263723A2 | 4/1988 | European Pat. Off. . |
| 0290007A1 | 11/1988 | European Pat. Off. . |
| 0340765A2 | 11/1989 | European Pat. Off. . |
| 0340707A2 | 11/1989 | European Pat. Off. . |
| 0497151A1 | 8/1992 | European Pat. Off. . |
| 2841172 | 9/1978 | Germany . |
| 3011330 | 3/1980 | Germany . |
| 47-20190 | 9/1972 | Japan . |
| 51-2729 | 1/1976 | Japan . |
| 53-16730 | 2/1978 | Japan . |
| 54-31320 | 3/1979 | Japan . |
| 54-48821 | 4/1979 | Japan . |
| 55-37407 | 3/1980 | Japan . |
| 55-100256 | 7/1980 | Japan . |
| 56-17965 | 2/1981 | Japan . |
| 58-120555 | 7/1983 | Japan . |
| 62-36056 | 8/1985 | Japan . |
| 62-36055 | 8/1985 | Japan . |
| 60-260484 | 12/1985 | Japan . |
| 60-264375 | 12/1985 | Japan . |
| 62-253407 | 4/1986 | Japan . |
| 62-46941 | 2/1987 | Japan . |
| 62-39204 | 2/1987 | Japan . |
| 62-151304 | 7/1987 | Japan . |
| 63-123851 | 5/1988 | Japan . |
| 63-210082 | 8/1988 | Japan . |
| 63-218589 | 9/1988 | Japan . |
| 63-248759 | 10/1988 | Japan . |
| 63-310780 | 12/1988 | Japan . |
| 64-37478 | 2/1989 | Japan . |
| 2-51460 | 2/1990 | Japan . |
| 2-141484 | 5/1990 | Japan . |
| 2-190304 | 7/1990 | Japan . |
| 3-80141 | 4/1991 | Japan . |
| 3-13551 | 7/1991 | Japan . |
| 3-187962 | 8/1991 | Japan . |
| 3-208847 | 9/1991 | Japan . |
| 3-202313 | 9/1991 | Japan . |
| 3-202310 | 9/1991 | Japan . |
| 4-70304 | 3/1992 | Japan . |
| 453555 | 1/1936 | United Kingdom . |
| 490820 | 8/1938 | United Kingdom . |
| 2086748 | 5/1982 | United Kingdom . |
| 2192392 | 1/1988 | United Kingdom . |
| 2220934 | 1/1990 | United Kingdom . |
| 2265916 | 10/1993 | United Kingdom . |
| WO87/00828 | 2/1987 | WIPO . |
| WO91/12186 | 8/1991 | WIPO . |

OTHER PUBLICATIONS

Alexanderson, *Self–Smoothing Floors Based on Polymer Cement Concrete*, Concrete International (Jan. 1990).

Algnesberger, *The Use of Anionic Melamine Resin as a Concrete Additive*, Cement Lime and Gravel (Sep. 1973).

Andersen, *Control and Monitoring of Concrete Production—A Study of Particle Packing and Rheology*, The Danish Academy of Technical Sciences (1990).

Andersen, *Effect of Organic Superplasticizing Admixtures and Their Components on Zeta Potential and Related Properties of Cement Materials*, Master of Science thesis, Pennsylvania State University (1987).

Andersen, *Effects of W/C–Ratio and Dispersion on the Pore Size Distribution of Cement Paste and Concrete*, Paper prepared for MRL by Per Just Anderson (Aug. 1988).

Andersen, et al, *Tailoring of Cement–Bound Materials By the Use of Packing and Rheological Models*, American Ceramic Society (1988).

(List continued on next page.)

*Primary Examiner*—Jenna L. Davis
*Assistant Examiner*—Blaine R. Copenheaver
*Attorney, Agent, or Firm*—Workman, Nydegger & Seeley

[57] ABSTRACT

Containers incorporating a hydraulically settable structural matrix including a hydraulically settable binder such as cement for use in the storing, dispensing, and/or packaging of food and beverage products are disclosed. The disposable and nondisposable food and beverage articles of manufacture have high tensile, compressive, and flexural strengths, and are lightweight, insulative (if desired), inexpensive, and more environmentally compatible than those currently used. These disposable containers and cups are particularly useful for dispensing hot and cold food and beverages in the fast food restaurant environment. The structural matrix of the food and beverage containers includes a hydraulic cement paste (formed from the reaction of water with, e.g., a portland-type cement) preferably in combination with a rheology-modifying plasticizer, such as methylhydroxyethylcellulose, various aggregate materials, and fibrous materials, which provide desired properties at a cost which is economical.

18 Claims, No Drawings

U.S. PATENT DOCUMENTS

| | | |
|---|---|---|
| 591,168 | 10/1897 | Heinzerling . |
| 882,538 | 3/1908 | Sargent . |
| 1,223,834 | 4/1917 | Sanger . |
| 1,234,692 | 7/1917 | Poznanski . |
| 1,427,103 | 8/1922 | Haenicke et al. . |
| 1,874,974 | 8/1932 | Hammenecker . |
| 1,932,150 | 10/1933 | Tada . |
| 1,954,117 | 4/1934 | Caldwell . |
| 1,965,538 | 7/1934 | Stewart . |
| 2,045,099 | 6/1936 | Pond . |
| 2,170,102 | 8/1939 | Thompson . |
| 2,205,735 | 6/1940 | Scherer, Jr. . |
| 2,307,629 | 1/1943 | MacIldowie . |
| 2,432,971 | 12/1947 | Ruthman et al. . |
| 2,496,895 | 2/1950 | Staley . |
| 2,549,507 | 4/1951 | Morgan et al. . |
| 2,629,667 | 2/1953 | Kaveler et al. . |
| 2,700,615 | 1/1955 | Heijmer et al. . |
| 2,793,957 | 5/1957 | Mangold et al. . |
| 2,820,713 | 1/1958 | Wagner . |
| 2,837,435 | 6/1958 | Miller et al. . |
| 2,917,778 | 12/1959 | Lyon, Jr. et al. . |
| 2,959,489 | 11/1960 | Wagner . |
| 3,006,615 | 10/1961 | Mason, Jr. . |
| 3,027,266 | 3/1962 | Wikne . |
| 3,030,258 | 4/1962 | Wagner . |
| 3,042,578 | 7/1962 | Denning . |
| 3,052,595 | 9/1962 | Pye . |
| 3,117,104 | 1/1964 | Klug . |
| 3,149,986 | 9/1964 | Zelmanoff . |
| 3,169,877 | 2/1965 | Bartoli et al. . |
| 3,215,549 | 11/1965 | Ericson . |
| 3,305,613 | 2/1967 | Spence . |
| 3,306,961 | 2/1967 | Spence . |
| 3,356,779 | 12/1967 | Schulze . |
| 3,393,261 | 7/1968 | Herzig et al. . |
| 3,403,205 | 9/1968 | Ottenholm . |
| 3,432,317 | 3/1969 | Kelly et al. . |
| 3,459,632 | 8/1969 | Caldwell et al. . |
| 3,468,993 | 9/1969 | Bierlich . |
| 3,470,005 | 9/1969 | Flachsenberg et al. . |
| 3,492,385 | 1/1970 | Simunic . |
| 3,520,707 | 7/1970 | Steinberg et al. . |
| 3,526,172 | 9/1970 | Stuart . |
| 3,558,070 | 1/1971 | Gabriels . |
| 3,579,366 | 5/1971 | Rehmar . |
| 3,683,760 | 8/1972 | Silva . |
| 3,689,294 | 9/1972 | Brannauer . |
| 3,745,891 | 7/1973 | Bodendoerfer . |
| 3,753,749 | 8/1973 | Nutt . |
| 3,754,954 | 8/1973 | Gabriel et al. . |
| 3,759,729 | 9/1973 | Fahn . |
| 3,770,859 | 11/1973 | Bevan . |
| 3,806,571 | 4/1974 | Ronnmark et al. . |
| 3,819,389 | 6/1974 | Uchikawa et al. . |
| 3,824,107 | 7/1974 | Weiant . |
| 3,827,895 | 8/1974 | Copeland . |
| 3,841,885 | 10/1974 | Jakel . |
| 3,855,908 | 12/1974 | Schmidt et al. . |
| 3,857,715 | 12/1974 | Humphrey . |
| 3,902,912 | 9/1975 | Wolf . |
| 3,904,341 | 9/1975 | Putti . |
| 3,908,523 | 9/1975 | Shikaya . |
| 3,914,359 | 10/1975 | Bevan . |
| 3,917,781 | 11/1975 | Gabriel et al. . |
| 3,927,163 | 12/1975 | Gabriel et al. . |
| 3,954,490 | 5/1976 | Cockram . |
| 3,968,004 | 7/1976 | Coffey et al. . |
| 3,989,534 | 11/1976 | Plunguian et al. . |
| 4,002,482 | 1/1977 | Coenen . |
| 4,017,321 | 4/1977 | Reighter . |
| 4,017,324 | 4/1977 | Eggers . |
| 4,028,454 | 6/1977 | Davidovits et al. . |
| 4,040,851 | 8/1977 | Ziegler . |
| 4,043,862 | 8/1977 | Roberts . |
| 4,046,584 | 9/1977 | Snyder et al. . |
| 4,053,346 | 10/1977 | Amberg et al. . |
| 4,070,199 | 1/1978 | Downing et al. . |
| 4,070,953 | 1/1978 | Richards et al. . |
| 4,072,549 | 2/1978 | Amberg et al. . |
| 4,073,658 | 2/1978 | Ohtani et al. . |
| 4,077,809 | 3/1978 | Plunguian et al. . |
| 4,084,980 | 4/1978 | Motoki . |
| 4,093,690 | 6/1978 | Murray . |
| 4,117,059 | 9/1978 | Murray . |
| 4,117,060 | 9/1978 | Murray . |
| 4,121,402 | 10/1978 | Cress et al. . |
| 4,132,555 | 1/1979 | Barrable . |
| 4,133,619 | 1/1979 | Wise . |
| 4,135,940 | 1/1979 | Peltier . |
| 4,157,998 | 6/1979 | Berntsson et al. . |
| 4,158,989 | 6/1979 | Barr . |
| 4,159,302 | 6/1979 | Greve et al. . |
| 4,185,923 | 1/1980 | Bouette et al. . |
| 4,187,768 | 2/1980 | Suzuki . |
| 4,188,231 | 2/1980 | Valore . |
| 4,190,454 | 2/1980 | Yamagisi et al. . |
| 4,196,161 | 4/1980 | Toffolom et al. . |
| 4,202,857 | 5/1980 | Lowe . |
| 4,209,336 | 6/1980 | Previte . |
| 4,210,490 | 7/1980 | Taylor . |
| 4,225,247 | 9/1980 | Hodson . |
| 4,225,357 | 9/1980 | Hodson . |
| 4,225,383 | 9/1980 | McReynolds . |
| 4,230,502 | 10/1980 | Lustig et al. . |
| 4,233,080 | 11/1980 | Koeppel . |
| 4,233,368 | 11/1980 | Baehr et al. . |
| 4,234,344 | 11/1980 | Tinsley et al. . |
| 4,239,716 | 12/1980 | Ishida et al. . |
| 4,257,710 | 3/1981 | Delcoigne et al. . |
| 4,257,814 | 3/1981 | Kellet et al. . |
| 4,261,754 | 4/1981 | Krenchel et al. . |
| 4,264,367 | 4/1991 | Schutz . |
| 4,264,368 | 4/1981 | Schutz . |
| 4,272,198 | 6/1981 | Velikov et al. . |
| 4,279,695 | 7/1981 | Winterbottom . |
| 4,287,247 | 9/1981 | Reil et al. . |
| 4,299,790 | 11/1981 | Greenberg . |
| 4,305,758 | 12/1981 | Powers et al. . |
| 4,310,996 | 1/1982 | Mulvey et al. . |
| 4,326,891 | 4/1982 | Sadler . |
| 4,353,748 | 10/1982 | Birchall et al. . |
| 4,362,679 | 12/1982 | Malinowski . |
| 4,370,166 | 1/1983 | Powers et al. . |
| 4,373,957 | 2/1983 | Pedersen . |
| 4,377,440 | 3/1983 | Gasland . |
| 4,378,271 | 3/1983 | Hargreaves et al. . |
| 4,383,862 | 5/1983 | Dyson . |
| 4,406,703 | 9/1983 | Guthrie et al. . |
| 4,410,366 | 10/1983 | Birchall et al. . |
| 4,423,112 | 12/1983 | Luthringshauser et al. . |
| 4,427,610 | 1/1984 | Murray . |
| 4,428,741 | 1/1984 | Westphal . |
| 4,428,775 | 1/1984 | Johnson et al. . |
| 4,444,593 | 4/1984 | Schutz . |
| 4,445,970 | 5/1984 | Post et al. . |
| 4,452,596 | 6/1984 | Clauss et al. . |
| 4,460,348 | 7/1984 | Iioka et al. . |
| 4,462,835 | 7/1984 | Car . |
| 4,481,037 | 11/1984 | Beale et al. . |
| 4,490,130 | 12/1984 | Konzal et al. . |
| 4,497,662 | 2/1985 | Chisholm et al. . |

| | | |
|---|---|---|
| 4,504,315 | 3/1985 | Allemann et al. |
| 4,508,595 | 4/1985 | Gasland |
| 4,522,772 | 6/1985 | Bevan |
| 4,524,828 | 6/1985 | Sabins et al. |
| 4,529,653 | 7/1985 | Hargreaves et al. |
| 4,529,662 | 7/1985 | Lancaster et al. |
| 4,529,663 | 7/1985 | Lancaster et al. |
| 4,533,393 | 8/1985 | Neuschaeffer et al. |
| 4,536,173 | 8/1985 | Puls |
| 4,545,854 | 10/1985 | Gomez et al. |
| 4,549,930 | 10/1985 | Dessauer |
| 4,551,384 | 11/1985 | Aston et al. |
| 4,552,463 | 11/1985 | Hodson |
| 4,571,233 | 2/1986 | Konzal |
| 4,581,003 | 4/1986 | Ito et al. |
| 4,585,486 | 4/1986 | Fujita et al. |
| 4,588,443 | 5/1986 | Bache |
| 4,613,627 | 9/1986 | Sherman et al. |
| 4,619,636 | 10/1986 | Bogren |
| 4,621,763 | 11/1986 | Brauner |
| 4,622,026 | 11/1986 | Ito et al. |
| 4,623,150 | 11/1986 | Moehlman et al. |
| 4,636,345 | 1/1987 | Jensen et al. |
| 4,637,860 | 1/1987 | Harper et al. |
| 4,640,715 | 2/1987 | Heitzmann et al. |
| 4,642,137 | 2/1987 | Heitzman et al. |
| 4,650,523 | 3/1987 | Kikuchi et al. |
| 4,655,981 | 4/1987 | Nielsen et al. |
| 4,673,438 | 6/1987 | Wittwer et al. |
| 4,680,023 | 7/1987 | Varano |
| 4,707,187 | 11/1987 | Tsuda et al. |
| 4,710,422 | 12/1987 | Fredenucci |
| 4,746,481 | 5/1988 | Schmidt |
| 4,749,444 | 6/1988 | Lorz et al. |
| 4,753,710 | 6/1988 | Langley et al. |
| 4,754,589 | 7/1988 | Leth |
| 4,755,494 | 7/1988 | Ruben |
| 4,772,439 | 9/1988 | Trevino-Gonzalez |
| 4,784,693 | 11/1988 | Kirkland et al. |
| 4,786,670 | 11/1988 | Tracy et al. |
| 4,789,244 | 12/1988 | Dunton et al. |
| 4,797,161 | 1/1989 | Kirchmayr et al. |
| 4,799,961 | 1/1989 | Friberg |
| 4,836,940 | 6/1989 | Alexander |
| 4,840,672 | 4/1989 | Baes |
| 4,842,649 | 6/1989 | Heitzmann et al. |
| 4,872,913 | 10/1989 | Dunton et al. |
| 4,888,059 | 12/1989 | Yamaguchi et al. |
| 4,889,428 | 12/1989 | Hodson |
| 4,892,589 | 1/1990 | Kirkland et al. |
| 4,895,598 | 1/1990 | Hedberg et al. |
| 4,912,069 | 3/1990 | Ruben |
| 4,919,758 | 4/1990 | Wagle et al. |
| 4,921,250 | 5/1990 | Ayres |
| 4,923,665 | 5/1990 | Andersen et al. |
| 4,925,530 | 5/1990 | Sinclair et al. |
| 4,927,043 | 5/1990 | Vanderlaan |
| 4,927,573 | 5/1990 | Alpár et al. |
| 4,939,192 | 7/1990 | t'Sas |
| 4,944,595 | 7/1990 | Hodson |
| 4,948,429 | 8/1990 | Arfaei |
| 4,952,278 | 8/1990 | Gregory et al. |
| 4,963,603 | 10/1990 | Felegi, Jr. et al. |
| 4,975,473 | 12/1990 | Kaneda et al. |
| 4,976,131 | 12/1990 | Grims et al. |
| 4,979,992 | 12/1990 | Bache |
| 4,983,257 | 1/1991 | Schultz et al. |
| 4,985,119 | 1/1991 | Vinson et al. |
| 4,999,056 | 3/1991 | Rasmussen |
| 5,017,268 | 5/1991 | Clitherow et al. |
| 5,018,379 | 5/1991 | Shirai et al. |
| 5,021,093 | 6/1991 | Beshay |
| 5,030,282 | 7/1991 | Matsuhashi et al. |
| 5,039,003 | 8/1991 | Gordon et al. |
| 5,039,378 | 8/1991 | Pommier et al. |
| 5,039,560 | 8/1991 | Durgin et al. |
| 5,047,086 | 9/1991 | Hayakawa et al. |
| 5,051,217 | 9/1991 | Alpár et al. |
| 5,061,346 | 10/1991 | Taggart et al. |
| 5,071,512 | 12/1991 | Bixler et al. |
| 5,085,366 | 2/1992 | Durgin et al. |
| 5,085,707 | 2/1992 | Bundy et al. |
| 5,089,198 | 2/1992 | Leach |
| 5,102,596 | 4/1992 | Lempfer et al. |
| 5,104,487 | 4/1992 | Taggart et al. |
| 5,106,423 | 4/1992 | Clarke |
| 5,106,880 | 4/1992 | Miller et al. |
| 5,108,677 | 4/1992 | Ayres |
| 5,108,679 | 4/1992 | Rirsch et al. |
| 5,110,413 | 5/1992 | Steer |
| 5,122,231 | 6/1992 | Anderson |
| 5,126,013 | 6/1992 | Wiker et al. |
| 5,126,014 | 6/1992 | Chung |
| 5,132,155 | 7/1992 | Singh et al. |
| 5,134,179 | 7/1992 | Felegi, Jr. et al. |
| 5,141,797 | 8/1992 | Wheeler |
| 5,151,130 | 9/1992 | Croft et al. |
| 5,154,771 | 10/1992 | Wada et al. |
| 5,156,718 | 10/1992 | Neubert |
| 5,160,676 | 11/1992 | Singh et al. |
| 5,167,894 | 12/1992 | Baumgarten |
| 5,169,566 | 12/1992 | Stucky et al. |
| 5,178,730 | 1/1993 | Bixler et al. |
| 5,184,995 | 2/1993 | Kuchenbecker |
| 5,221,435 | 6/1993 | Smith, Jr. |
| 5,232,496 | 8/1993 | Jennings et al. |
| 5,240,561 | 8/1993 | Kaliski |
| 5,269,845 | 12/1993 | Grunau et al. |
| 5,273,821 | 12/1993 | Olson et al. |
| 5,290,355 | 3/1994 | Jakel |

OTHER PUBLICATIONS

Andersen, *Tailoring of Concrete Materials*, R&H Annual Review (1988).

Attwood, *Paperboard*, in the Wiley Encyclopedia of Packaging Technology, 500–506 (Marilyn Bakker ed., 1986).

Ashby, *Materials Selection in Engineering Design*, Indian Journal of Technology, vol. 28 (Jun.–Aug. 1990).

Ashby, *Overview No. 80; On the Engineering Properties of Materials*, Acta Metall, vol 3, No. 5, 1273–1293 (1989).

Bach, *Cement–Based Products Processed the Plastics Way*.

Bache, *Densified Cement/Ultra–Fine Particle–Based Materials*, Presented at the Second International Conference on Superplasticizers in Concrete, in Ottawa, Canada (Jun. 10–12, 1981).

Bailey, *Flexural Strength of Cements*, Nature, vol. 292, 2 (Jul. 1981).

Bajza, *On The Factors Influencing the Strength of Cement Compacts*, Cement and Concrete Research, vol. 2, 67–78 (1972).

Balaguru, et al., *Flexural Behavior of Slurry Infiltrated Fiber Concrete (SIFCON) Made Using Condensed Silica Fume*.

Bardsley, *Form/Fill/Seal, Horizontal*, in the Wiley Encyclopedia of Packaging Technology, 364–367 (Marilyn Bakker ed., 1986).

Baum, et al., *Paper*, in Kirk–Othmer Concise Encyclopedia of Chemical Technology, 834–836 (Martin Grayson ed., 1985).

Bemis Company, *Bags, Paper, in The Wiley Encyclopedia of Packaging Technology*, 36–39 (Marilyn Bakker ed., 1986).

Benbow, et al., *The Extrusion Mechanics of Pastes—The Influence of Paste Formulation on Extrusion Parameters*, Chemical Engineering Science, vol. 42, No. 9, 2151–2162 (1987).

Berger, et al., *Acceleration of Hydration of Calcium Silicates by Carbon Dioxide Treatment*, Nature Physical Science, vol. 240 (Nov. 6, 1972).

Blaha, *Ideas in Concrete*, Concrete Products (Sep. 1992).

Bohrer, *Cartons, Folding in The Wiley Encyclopedia of Packaging Technology*, 146–152 (Marilyn Bakker ed., 1986).

Bousum, *Carriers, Beverage, in The Wiley Encyclopedia of Packaging Technology*, 129–132 (Marilyn Bakker ed., 1986).

Brady, et al., *Materials Handbook*, 588–594 (1991).

Brown, et al., *An Investigation of a High Speed Shear Mixer on Selected Pastes and Mortars*, Mat. Res. Soc. Symp. Proc Vol. 137 (1989).

Bukowski, et al., *Reactivity and Strength Development of CO2 Activated Non–Hydraulic Calcium Silicates*, Cement and Concrete Research, vol. 9, 57–68 (1979).

Clauson–Kaas, *Opsprojtet Glasfiberton i Byggeriet* (1987). (See Statement of Relevance as there is no English translation ).

Collepardi, et al., *Combined Effect of Lignosulfate and Carbonate on Pure Portland Clinker Compounds Hydration J. Tetracalcium Aluminoferrite Hydration*, Cement and Concrete Research, vol. 10, 455–462 (1980).

Collepardi, et al., *Influence of Polymerization of Sulfonated Naphthalene Condensate and its Interaction with Cement*.

Kline, *Corrugating Operations and Raw Materials in Paper and Paperboard: Manufacturing and Converting Fundamentals*, 184–195 (2d ed. 1991).

Kline, *Packaging in Paper and Paperboard: Manufacturing and Converting Fundamentals*, 196–211 (2d ed. 1991).

Kline, *Paper and Paperboard Manufacturing and Converting Fundamentals*, 19–28 (2d ed. 1982).Andersen, *Rheology of Cement Paste, Mortar and Concrete*, G.M. Idorn Consult.

Clauson–Kaas, et al., *Ekstrudering af Fiberbeton*, Teknologisk Institut, Byggeteknik, TR–Projekt 1985–133/177–85.538 (Dec. 1986). English Translation–Clauson–Kaas, et al., *Extrusion of Fiber Concrete–Interim Report*, Technological Institute of Denmark, Department of Building Technology TR–Project 1985–133/177–85.538 (Dec. 1986).

Ferretti, *Distributed Reinforcement Concrete Pipes: An Innovative Product*, Concrete International (May 1993).

Robinson, *Extrusion Defects*.

*Cementing the Future*, National Science Foundation Center for Science and Technology of Advanced Cement–Based Materials, vol. 6, No. 1 (Spring 1994).

Davidson, et al., *Water–Soluble Resins*, New York: Reinhold Publishing Corp., Chapman & Hall, Ltd., London.

Devlin, et al., *Waxes, in The Wiley Encyclopedia of Packaging Technology* 697–700 (Marilyn Bakekr ed., 1986).

Dow Plastics, *Thermoforming Process Guide*.

Eriksen et al., *Foam Stability Experiment on Solutions Containing Superplasticizing and Air–etraining Agents for Concrete*, The Technological Institue, Department of Building Technology, Taastrup, Denmark.

Eubanks, *Cans, Composite, in The Wiley Encyclopedia of Packaging Technology*, 94–98 (Marilyn Bakker ed., 1986).

Ferretti, *Distributed Reinforcement Concrete Pipes: An Innovative Product*, MRS, 44–48 (May 1993).

Fordos, *Natural or Modified Cellulose Fibres as Reinforcement in Cement Composites*, Concrete Technology & Design vol. 5, Natural Fiber Reinforced Cement and Concrete (1988).

Greminger, Jr. et al., *Alkyl and Hydroxyalkylalkylcellulose*, Dow Chemical U.S.A., Midland, Oregon.

Gresher, *Carded Packaging, in The Wiley Encyclopedia of Packaging Technology*, 124–129 (Marilyn Bakker ed., 1986).

Hanlon, *Fibre Tubes Cans, and Drums, in Handbook of Package Engineering*, 7–1 to 7–15 (2d ed. 1984).

Hewlett, *Physico–Chemical Mechanisms of Admixtures Lecture*, CGLI Advanced Concrete Technology Course, Cement and Concrete Association Training Centre (1975).

Hlavac, *The Technology of Ceramics*, Glass Science and Technology, 4: The Technology of Glass and Ceramic, Elsevier Publishing (1983).

Hyland, *F–Flute Inches Its Way Into Folding Carton Market*, Paperboard Packaging, at 28–29 (May 1993).

Iler, *The Chemistry of Silica*, 430–432 (1979).

Johansen, et al., *Particle Packing and Concrete Properties*, Materials Science of Concrete II, 111–147.

Jones, et al., *Raw Materials Processing*, Ceramics: Industrial Processing and Testing, Iowa State University Press (1972).

Kaye, *Adhesives, in The Wiley Encyclopedia of Packaging Technology*, 14–16 (Marilyn Bakker ed., 1986).

Klieger, *Studies of the Effect of Entrained Air on the Strength and Durability of Concretes Made with Various Maximum Sizes of Aggregate*, Research and Development Laboratories of the Portland Cement Association (Oct. 1952).

Knab, et al., *Effects of Maximum Void Size and Aggregate Characteristics on the Strength of Mortar*, Cement and Concrete Research. vol. 13, 383–390 (1983).

Knudsen, *On Particle Size Distribution in Cement Hydration*, Presented to the 7th International Congress on the Chemistry of Cement, Paris (1980).

Kohn, et al., *Cans Fabrication, in The Wiley Encyclopedia of Packaging Technology*, 100–108 (Marilyn Bakker ed., 1986).

Laenger, *Designing an Extruder with Allowance for the Properties of Ceramic Extrusion Compounds–Part 1, cfi/Ber. DKG 67, No. 4 (1990).*

Laenger, *Extruderauslegung unter Berucksichtingung . . . English Translation–Designing an Extruder with Allowance for the Properties of Ceramic . . . Part 2a*, cfi/Ber. DKG 68, No. 9 (1991).

Laenger, *Extruderauslegung unter Berucksichtingung . . . English Translation–Designing an Extruder with Allowance for the Properties of Ceramic . . . Part 2b*, cfi/Ber. DKG 68, No. 10/11 (1991).

Laenger, *Extruderauslegung unter Berucksichtingung . . . English Translation–Designing an Extruder with Allowance for the Properties of Ceramic . . . Part 3*, cfi/Ber. DKG 69, No. 3 (1992).

Laenger, *Extruderauslegung unter Berucksichtingung . . . English Translation–Designing an Extruder with Allowance for the Properties of Ceramic . . . Part 4a*, cfi/Ber. DKG 69, No. 7/8 (1992).

Laenger, *Extruderauslegung unter Berucksichtingung . . . English Translation–Designing an Extruder with Allowance for the Properties of Ceramic . . . 4b*, cfi/Ber. DKG 69, No. 9 (1992).

Laenger, *Extruderauslegung unter Berucksichtingung . . . English Translation–Designing an Extruder with Allowance for the Properties of Ceramic . . . Part 5a*, cfi/Ber. DKG 69, 10 (1992).

Laenger, *Extruderauslegung unter Berucksichtingung . . . English Translation–Designing an Extruder with llowance for the Properties of Ceramic . . . Part 5b*, cfi/Ber. DKG 70, No. 3 (1993).

Lavin, *Cans, Composite, Self–manufactured, in The Wiley Encyclopedia of Packaging Technology*, 98–100 (Marilyn Bakker ed., 1986).

Lawrence, *The Properties of Cement Paste Compacted Under High Pressure: Research Report 19*, Cement and Concrete Association Research Report 19 (Jun. 1969).

Leaversuch, *Blowing Agents: Products Minimize Tradeoffs as CFC Phase–out Takes Effect*, Modern Plastics (1993).

Lecznar, et al., *Strength of Neat Cement Pastes Molded Under Pressure*, Journal of the American Concrete Institute Concrete Briefs (Feb. 1961).

Lentz, *Printing, in The Wiley Encyclopedia of Packaging Technology*, 554–559 (Marilyn Bakker ed., 1986).

Lewis, et al., *Microstructure–Property Relationships in Macro–Defect–Free Cement*, MRS Bulletin (Mar. 1993).

Lewis, Sr., *Condensed Chemical Dictionary*, 870 (12th ed. 1993).

Lisiecki, *Cartons, Gabletop, in The Wiley Encyclopedia of Packaging Technology*, 152–154 (Marilyn Bakker ed., 1986).

Litvan, et al., *Particulate Admixture for Enhanced Freeze–Thaw Resistance of Concrete*, Cement and Concrete Research, vol. 8, 53–60, Pergamon Press, Inc. (1978).

Lynch, et al., *Boxes, Rigid–Paperboard, in The Wiley Encyclopedia of Packaging Technology*, 76–79 (Marilyn Bakker ed., 1986).

Manson, et al., *Use of Polymers in Highway Concrete*, National Cooperative Highway Research Program Report 190 (1978).

Maries, *The Activation of Portland Cement by Carbon Dioxide*.

Mass, *Premixed Cement Paste*, Concrete International (Nov. 1989).

Maycock, et al., *Carbonation of Hydrated Calcium Silicates*, Cement and Concrete Research, vol. 4, 69–76 (1974).

Miyake, et al., Sakai, *Superplasticized Concrete Using Refined Lignosulfate and its Action Mechanism*, Cement and Concrete Research, vol. 15 (1985).

Moyer, *Form/Fill/Seal, Vertical, in The Wiley Encyclopedia of Packaging Technology*, 367–369 (Marilyn Bakker ed., 1986).

Naaman, et al., *Tensile Stress–Strain Properties of SIFCON*, ACI Materials Journal (May–Jun. 1989).

Niel, *Supplementary Paper II–117, The Influence of Alkali––Carbonate on the Hydration of Cement* (1968).

Purton, *The Effect of Sand Grading on the Calcium Silicate Brick Reaction*, Cement and Concrete Research vol. 4, 13–29 (1974).

Putnam, et al., *Papermaking Additives, in Kirk–Othmer Concise Encyclopedia of Chemical Technology*, 836–837 (Martin Grayson ed., 1985).

Radek, *Closure Lines, in The Wiley Encyclopedia Packaging Technology*, 171–172 (Marilyn Bakker ed., 1986).

Rosenberg, et al., *A New Mineral Admixture of High––Strength Concrete–Proposed Mechanism for Strength Enhancement*, Second International Conference on the Use of Fly Ash, Silica Fume, Slag and Natural Pozzolans in Concrete (Apr. 21–25, 1986).

Roy, *New Strong Cement Materials: Chemically Bonded Ceramics*, Science vol. 235, 6 (Feb. 1987).

Roy, et al., *Processing of Optimized Cements and concretes via Particle Packing*, MRS Bulletin (Mar. 1993).

Roy, et al., *Very High Strength Cement Pastes Prepared by Hot Pressing and Other High Pressure Techniques*, Cement and Concrete Research, vol. 2, 349–366 (1972).

Satas, *Coating, Equipment, in The Wiley Encyclopedia of Packaging Technology*, 186–191 (Marilyn Bakker ed., 1986).

Sciaudone, *Boxes, Rigid–Plastic, in The Wiley Encyclopedia of Packaging Technology*, 78–79 (Marilyn Bakker ed., 1986).

Shilstone, Sr., *Mix Temperature and $$$$$*, Concrete Producer News (Oct. 1989).

Shilstone, Sr., *Concrete Mixture Optimizaiton by Coarseness Factor, Mortar Factor & Particle Distribution*, Concrete International (Dec. 1989).

Shilstone, Sr., *Mixture Optimization for Fast–Track*, Report for American Concrete Institution Convention, San Diego, CA.

Sikora, *Paper, The Wiley Encyclopedia of Packaging Technology*, 497–500 (Marilyn Bakker ed., 1986).

Skalny, et al., *Low Water to Cement Ratio Concretes*, Cement, and Concrete Research, vol. 3, 29–40 (1973).

Skalny, et al., *Properties of Cement Pastes Prepared by High Pressure Compaction*, ACI Journal, Mar. (1970).

Soroushian, et al., *Recycling of Wood and Paper in Cementitious Matierals*, Mat. Res. Soc. Sypm. Proc., vol. 266 (1992).

Stix, *Concrete Solutions*, Scientific American (Apr. 1993).

Strabo, et al., *Cementbaserede Hybridkompositte*, Teknologisk Institut, Byggeteknik, TR–Projekt 1985–133/177–85.533 (1987). *English Translation*–Strabo, et al., *Cement–Based Hybrid Composites*, Technological Institute of Denmark, Department of Building Technology, TR–Project 1985–133/177–85.533 (1987).

Stabo, et al., *Elstudering af Fiberbeton*, Teknologisk Institut, Byggeteknik, TR–Projekt 1985–133/177–85.538 (Oct. 1987). *English Translation*–Strabo, et al., *Extrusion of Fiber Concrete*, Danish Technological Institute, Department of Building Technology, TR–Project 1985–133/177–85.538 (Oct. 1987).

Strabo, et al., *Fiberbeton Teknologi*, Teknologisk Institut, Byggeteknik, TR–Projekt 133/177–82.042 (1986). *English Translation*–Strabo, et al., *Fiber Concrete Technology*, Technological Institute of Denmark, Department of Building Technology, TR–Project 133/117–82.042 (1986).

Strabo, et al., *Nye Formgivningsmetoder til Fiberbeton*, Teknologisk Institut, Byggeteknik, TR–Projekt 1984–133/117–84.028 (Apr. 1987). *English Translation*–Strabo, et al, *New Design Methods for Fiber Concrete*, Technological Institute of Denmark, Department of Building Technology, TR–Project 1984–133/117–84.028 (Apr. 1987).

Studt, *New Advances Revive Interest In Cement–Based Materials*, R&D Magazine (Nov. 1992). Sun, et al., *The Composition of Hydrated DSP Cement Pastes*.

Sutherland, *Air–Entrained Concrete*, Cement and Concrete Association, Cement and Concrete Association (1970).

Suzuki, et al., *Formation and Carbonation of C–S–H In Water*, Cement and Concrete Research, vol. 15, 213–224 (1985).

Swec, *Boxes, Corrugated*, in The Wiley Encyclopedia of Packaging Technology, 66–76 (Marilyn Bakker ed., 1986).

Swientek, *Formidable Films*, Prepared Foods, at 118–121 (Sep. 1993).

Unwalla, et al., editors, *Recycled Materials for Making Concrete*, The Indian Concrete Journal, vol. 53, No. 9 (Sep. 1979).

Verbeck, *Carbonation of Hydrated Portland Cement*, Cement and Concrete Special Technical Publication No. 203 (1958).

Vrana, *Khashoggi Kin Reported Planning Private Placement of Shares in New Container Firm*, (Mar. 28, 1993).

Wagner, *Polymer Modification of Portland Cement Systems*, Chemtech (Feb. 1973).

Waldman, *Molded Pulp*, in The Wiley Encyclopedia of Packaging Technology, 559–561 (Marilyn Bakker ed., 1986).

Westman, et al., *The Packing of Particles* (1930).

Weiss et al., *High Tensile Cement Pastes as a Low–Energy Substitute for Metals, Plastics, Ceramic, and Wood. Phase 1: Preliminary Technological Evaluation*, CTL Project CR7851–4330, Final Report, Prepared for U.S. Dept. of Energy (Nov. 1984).

Young, et al., *Introduction to MDF Cement Composites*, ACBM vol. 1, No. 2 (Fall 1989).

Young, *Macro–Defect–Free Cement: A Review*, Mat. Res. Soc. Symp. Proc., vol. 179 (1991).

Yudenfreund, et al., *Hardened Portland Cement Pastes of Low Porosity, II. Exploratory Studies Dimensional Changes*, Cement and Concrete Research, vol. 2, 331–348 (1972).

Zukowski, et al., *Rheology of Cementitous Systems*, MRS Bulletin (Mar. 1993).

*The Coating Process for Paper* (1993).

*The Colcrete Process*, Undated Publication.

*Doing More With Less: Optimizing Concrete Mix*, Better Roads (Aug. 1990).

*Flexible Packages*, in Modern Packaging Encyclopedia and Planning Guide, 114–126 (Gross et al. eds., 2d ed. 1972).

*Fiberbeton–nyt*, Teknologisk Institute, Byggeteknik, Blad nr. 1 (Oct. 1987). *English Translation–Fiber Concrete News*, The Technological Institute of Denmark, Department of Building Technology, Pamphlet No. 1 (Oct. 1987).

*Labeling and Printing*, in Modern Packaging Encyclopedia and Planning Guide, 193–214 (Gross et al. eds., 2d ed. 1972).

*Materials*, in Modern Packaging Encyclopedia and Planning Guide 54–113 (Gross et al. eds., 2d ed. 1972).

*Nye Metoder i Beton Kan Betyde Teknisk Knock–Out for Plast. English Translation–New Method for Concrete May Mean Technical Knock–Out for Plastic*, The Engineer, No. 14 (1986).

*Plastic–Forming Processes*.

*Report of the Panel on Solids Processing*.

*Rigid and Semirigid Containers*, in Modern Packaging Encyclopedia and Planning Guide, 127–192 (Gros et al. eds., 2d ed. 1972).

Shipping and Protection, in Modern Packaging Encyclopedia and Planning Guide, 215–240 (Gross et al. eds., 2d ed. 1972).

*Space–Age Concrete That May Sub for Steel*.

*Zien In The Food Industry*, Freeman Industries, Inc.

COATED HYDRAULICALLY SETTABLE CONTAINERS AND OTHER ARTICLES FOR STORING, DISPENSING, AND PACKAGING FOOD AND BEVERAGES

RELATED APPLICATIONS

This application is a divisional of application Ser. No. 08/095,662 entitled "Hydraulically Settable Containers and Other Articles for Storing, Dispensing, and Packaging Food and Beverages and Methods for Their Manufacture," and filed Jul. 21, 1993, in the names of Per Just Andersen, Ph.D., and Simon K. Hodson, now issued as U.S. Pat. No. 5,385,764, which is a continuation-in-part of application Ser. No. 07/929,893 entitled "Cementitious Food and Beverage Storage, Dispensing, and Packaging Containers and the Methods of Manufacturing Same," filed Aug. 11, 1992, in the names of Per Just Andersen, Ph.D., and Simon K. Hodson (abandoned) and also a continuation-in-part of application Ser. No. 08/019,151 entitled "Cementitious Materials for Use in Packaging Containers and Their Methods of Manufacture," filed Feb. 17, 1993, in the names of Per Just Andersen, Ph.D., and Simon K. Hodson, now issued U.S. Pat. No. 5,453,310. For purposes of disclosure, both of these applications are incorporated herein by specific reference.

BACKGROUND OF THE INVENTION

The Field of the Invention

The present invention relates to containers and other articles of manufacture for use in storing, dispensing, and packaging food and beverage products. More particularly, the present invention is directed to both disposable and nondisposable food and beverage containers and other articles manufactured from hydraulically settable materials that can be lightweight, insulative, inexpensive, and more environmentally neutral than those currently used in the storing, dispensing (e.g., serving or portioning), and packaging of food and beverage products. Disposable containers and cups within the scope of the present invention are particularly useful for dispensing hot and cold food and beverages in the fast food restaurant environment.

The Relevant Technology Just Andersen, Ph.D., and Simon K. Hodson, now issued U.S. Pat. No. 5,453,310. For purposes of disclosure, both of these applications are incorporated herein by specific reference.

A. Food and Beverage Containers.

Today, the world enjoys food and beverages products which are safer than ever before. Advanced processing and packaging techniques allow foods to travel safely for long distances from their point of origin. Even with lengthy and time-consuming distribution networks, today's food products arrive in a wholesome condition. Packaging protects food from environmental influences and distribution damage, particularly chemical and physical influence and damage. Packaging also provides a medium for the dissemination of information to the consumer: for example, nutritional information, cooking instructions, ingredients, product weight, advertising, brand identification, and pricing.

Packaging helps protect food products from gases, moisture, light, microorganisms, vermin, physical shock, crushing forces, vibration, leaking, or spilling. In addition, goods may be dispensed using specific packaging aids, such as disposable cups, plates, or boxes (such as the "clam shell" frequently used in the fast food industry for burgers, sandwiches, and salads).

Typically, such disposable containers and cups are made from paper (including cardboard), plastic (particularly polystyrene), glass, and metal materials. Paper and metal products are particularly useful with cold beverages and food products. Each year over one hundred billion aluminum cans, billions of glass bottles, and thousands of tons of paper and plastic are used in storing and dispensing soft drinks, juices, and beer.

Hot items (such as fast food and many drinks) require a container that is insulated to slow the loss of heat, both to keep the item hot and to protect the consumer from being burned. The container of choice in recent years has typically been made from polystyrene. Although paper or plastic coated containment products can be equipped with special handles, polystyrene containers have remained the superior disposable container of choice when insulation is required, because of insulation capabilities, cost, and stability.

In spite of the more recent attention that has been given to reduce the use of paper and plastic materials, they continue to be used because of strength properties and mass producibility. Moreover, for any given use for which they are designed, such materials are relatively inexpensive, lightweight, easy to mold, strong, durable, and resistant to degradation during use.

B. The Impact of Paper, Plastic, Glass and Metal.

Recently there has been a debate as to which of these materials (e.g., paper, polystyrene, glass, or metal cans) is most damaging to the environment. Consciousness-raising organizations have convinced many people to substitute one material for another in order to be more environmentally "correct." The debate often misses the point that each of these materials has its own unique environmental weaknesses. One material may appear superior to another when viewed in light of a particular environmental problem, while ignoring different, often larger, problems associated with the supposedly preferred material. In fact, paper, cardboard, plastic, polystyrene, glass, and metal materials each has its own unique environmental weaknesses.

Polystyrene products have more recently attracted the ire of environmental groups, particularly containers and other packaging materials. While polystyrene itself is a relatively inert substance, its manufacture involves the use of a variety of hazardous chemicals and starting materials. Unpolymerized styrene is very reactive and therefore presents a health problem to those who must handle it. Because styrene is manufactured from benzene (a known mutagen and probably a carcinogen), residual quantities of benzene can be found in styrene.

More potentially damaging has been the use of chlorofluorocarbons (or "CFCs") in the manufacture of "blown" or "expanded" polystyrene products. This is because CFCs have been linked to the destruction of the ozone layer. In the manufacture of foams, including blown polystyrene, CFCs (which are highly volatile liquids) have been used to "expand" or "blow" the polystyrene into a foamed material, which is then molded into the form of cups, plates, trays, boxes, "clam-shell" containers, spacers, or packaging materials. Even the substitution of less "environmentally damaging" blowing agents (e.g., HCFC, $CO_2$, and pentanes) are still significantly harmful and their elimination would be beneficial.

As a result, there has been widespread pressure for companies to stop using polystyrene products in favor of more environmentally safe materials. Some environmental groups have favored a temporary return to the use of natural products such as paper or wood, which are believed to be biodegradable. Nevertheless, other environmental groups have taken the opposite view in order to minimize cutting trees and depleting the forests.

Although paper products are ostensibly biodegradable and have not been linked to the destruction of the ozone layer, recent studies have shown that the manufacture of paper probably more strongly impacts the environment than does the manufacture of polystyrene. In fact, the wood pulp and paper industry has been identified as one of the five top polluters in the United States. For instance, products made from paper require ten times as much steam, fourteen to twenty times the electricity, and twice as much cooling water compared to an equivalent polystyrene product. Various studies have shown that the effluent from paper manufacturing contains ten to one hundred times the amount of contaminants produced in the manufacture of polystyrene foam.

In addition, a by-product of paper manufacturing is that the environment is impacted by dioxin, a harmful toxin. Dioxin, or more accurately, 2,3,7,8-tetrachlorodibenzo[b,e][1,4]dioxin, is a highly toxic, teragenic contaminant, and is extremely dangerous even in very low quantities. Toxic effects of dioxin in animals and humans include anorexia, severe weight loss, hepatoxicity, hematoporphyria, vascular lesions, chloracne, gastric ulcers, porphyrinuria, porphyria, cutanea tarda, and premature death. Most experts in the field believe that dioxin is a carcinogen.

The highest level of dioxin allowed in the discharge waters from paper mills is about 0.5 part per trillion. However, fish found downstream from paper pulp mills can contain nearly 200 parts per trillion of dioxin, with levels of 50 parts per trillion being not uncommon.

The manufacturing processes of metal cans (particularly those made of aluminum and tin), glass bottles, and ceramic containers for food and beverages utilize high amounts of energy because of the necessity to melt and then separately work and shape the raw metal into an intermediate or final product. These high energy and processing requirements not only utilize valuable energy resources, but they also result in significant air, water, and heat pollution to the environment.

With glass and ceramic materials, in addition to the high processing costs, the final food and beverage product is brittle. Further, while glass can be recycled, that portion which ends up in landfills is essentially nonbiodegradable. (For purposes of convenience, since the many of the problems of metal materials, when compared to the products of the present invention, are the same as with glass and ceramic materials, reference hereinafter will generally be made only to metal prior art materials and problems. However, it will be appreciated that many, if not most, of the same comments are applicable to food and beverage containers made from glass or ceramic materials.)

Some of these pollution problems are being addressed; however, the result is the use of more energy, as well as the significant addition to the capital requirements for the manufacturing facilities. Further, while significant efforts have been expended in recycling programs, only a portion of the raw material needs come from recycling—most of the raw material set comes from nonrenewable resources.

A huge variety of objects such as containers, packing materials, mats, disposable utensils, cans, and decorative items are presently mass-produced from paper, plastic, and metal. Unfortunately, the vast majority of paper and polystyrene (and even metal) items eventually wind up within our ever diminishing landfills, or worse, are scattered on the ground or dumped into bodies of water as litter. Because plastic and metals are essentially nonbiodegradable, they persist within the land and water as unsightly, value diminishing, and (in some cases) toxic foreign materials.

Even paper or cardboard, believed by many to be biodegradable, can persist for years, even decades, within landfills where they are shielded from air, light, and water, all of which are required for normal biodegradation activities. There are reports of telephone books and newspapers having been lifted from garbage dumps that had been buried for decades. This longevity of paper is further complicated since it is common to treat, coat, or impregnate paper with various protective materials which further slow or prevent degradation.

Another problem with paper, cardboard, polystyrene, and plastic is that each of these requires relatively expensive organic starting materials, some of which are nonrenewable, such as the use of petroleum in the manufacture of polystyrene and plastic. Although trees used in making paper and cardboard are renewable in the strict sense of the word, their large land requirements and rapid depletion in certain areas of the world undermines this notion. Hence, the use of huge amounts of essentially nonrenewable starting materials in making disposable containers cannot be sustained and is not wise from a long term perspective. Furthermore, the processes used to make the packaging stock raw materials (such as paper pulp, styrene, or metal sheets) are very energy intensive, cause major amounts of water and air pollution, and require significant capital requirements.

In light of the foregoing, the debate should not be directed to which of these materials is more or less harmful to the environment, but rather toward asking: Can we discover or develop an alternative material which will solve most, if not all, of the various environmental problems associated with each of these presently used materials?

3. Traditional Hydraulically Settable Materials.

On the other hand, for millennia, man has made great use of nondepletable inorganic materials such as clay or stone. Similarly, hydraulically settable materials such as those that contain hydraulic cement or gypsum (hereinafter "hydraulically settable," "hydraulic," or "cementitious" compositions, materials, or mixtures) have been used for thousands of years to create useful, generally large, bulky structures that are durable, strong, and relatively inexpensive. For example, cement is a hydraulically settable binder derived from clay and limestone, and it is essentially nondepletable.

Those materials containing a hydraulic cement are generally formed by mixing hydraulic cement with water and usually some type of aggregate to form a cementitious mixture, which hardens into concrete. Ideally, a freshly mixed cementitious mixture is fairly nonviscous, semi-fluid, and capable of being mixed and formed by hand. Because of its fluid nature, concrete is generally shaped by being poured into a mold, worked to eliminate large air pockets, and allowed to harden. If the surface of the concrete structure is to be exposed, such as on a concrete sidewalk, additional efforts are made to finish the surface to make it more functional and to give it the desired surface characteristics.

Due to the high level of fluidity required for typical cementitious mixtures to have adequate workability, the uses of concrete and other hydraulically settable mixtures have been limited mainly to simple shapes which are generally large, heavy, and bulky, and which require mechanical forces to retain their shape for an extended period of time until sufficient hardening of the material has occurred. Another aspect of the limitations of traditional cementitious mixtures or slurries is that they have little or no form stability and are molded into the final form by pouring the mixture into a space having externally supported boundaries or walls.

It is precisely because of this lack of moldability (which may be the result of poor workability and/or poor form stability), coupled with the low tensile strength per unit weight, that cementitious materials have traditionally been useful only for applications where size and weight are not limiting factors and where the forces or loads exerted on the concrete are generally limited to compressive forces or loads, as in, e.g., roads, foundations, sidewalks, and walls.

Moreover, cementitious materials have historically been brittle, rigid, unable to be folded or bent, and of low elasticity, deflection and flexural strength. The brittle nature and lack of tensile strength (about 1–4 MPa) in concrete is ubiquitously illustrated by the fact that concrete readily cracks or fractures upon the slightest amount of shrinkage or bending, unlike other materials such as metal, paper, plastic, or ceramic. Consequently, typical cementitious materials have not been suitable for making small, lightweight objects, such as containers or thin sheets, which are better if made from materials with much higher tensile and flexural strengths per unit weight compared to typical cementitious materials.

More recently, higher strength cementitious materials have been developed which might be capable of being formed into smaller, denser objects. One such material is known as "Macro-defect Free" or "MDF" concrete, such as is disclosed in U.S. Pat. No. 4,410,366 to Birchall et al. See also, S. J. Weiss, E. M. Gartner & S. W. Tresouthick, "High Tensile Cement Pastes as a Low Energy Substitute for Metals, Plastics, Ceramics, and Wood," U.S. Department of Energy CTL Project CR7851-4330 (Final Report, November 1984).

However, such high strength cementitious materials have been prohibitively expensive and would be unsuitable for making inexpensive containers where much cheaper materials better suited for such uses (e.g., paper and plastic) are readily available. Another drawback is that MDF concrete cannot be used to mass produce small lightweight objects due to the high amount of time and effort involved in forming and hardening the material and the fact that it is highly water soluble. Therefore, MDF concrete has been limited to expensive objects of simple shape.

Another problem with traditional, and even more recently developed high strength concretes, has been the lengthy curing times almost universally required for most concretes. Typical concrete products formed from a flowable mixture require a hardening period of 10–24 hours before the concrete is mechanically self-supporting, and upwards of a month before the concrete reaches a substantial amount of its maximum strength. Extreme care has had to be used to avoid moving the cementitious articles until they have obtained sufficient strength to be demolded. Movement or demolding prior to this time has usually resulted in cracks and flaws in the cementitious structural matrix. Once self-supporting, the object could be demolded, although it has not typically attained the majority of its ultimate strength until days or even weeks later.

Since the molds used in forming cementitious objects are generally reused in the production of concrete products and a substantial period of time is required for even minimal curing of the concrete, it has been difficult to economically and commercially mass produce cementitious objects. Although zero slump concrete has been used to produce large, bulky objects (such as molded slabs, large pipes, or bricks which are immediately self-supporting) on an economically commercial scale, such production is only useful in producing objects at a rate of a few thousand per day. Such compositions and methods cannot be used to mass produce small, thin-walled objects at a rate of thousands per hour.

Demolding a cementitious object can create further problems. As concrete cures, it tends to bond to the forms unless expensive releasing agents are used. It is often necessary to wedge the forms loose to remove them. Such wedging, if not done properly and carefully each time, often results in cracking or breakage around the edges of the structure. This problem further limits the ability to make thin-walled cementitious articles or shapes other than flat slabs, particularly in any type of a commercial mass production.

If the bond between the outer wall of the molded cementitious article and the mold is greater than the internal cohesive or tensile strengths of the molded article, removal of the mold will likely break the relatively weak walls or other structural features of the molded article. Hence, traditional cementitious objects must be large in volume, as well as extraordinarily simple in shape, in order to avoid breakage during demolding (unless expensive releasing agents and other precautions are used).

Typical processing techniques of concrete also require that it be properly consolidated after it is placed in order to ensure that no voids exist between the forms or in the structural matrix. This is usually accomplished through various methods of vibration or poking. The problem with consolidating, however, is that the more extensive the consolidation of the concrete after it has been placed, the greater the segregation or bleeding of the concrete.

"Bleeding" is the migration of water to the top surface of freshly placed concrete caused by the settling of the aggregate. Excessive bleeding increases the water to cement ratio near the top surface of the concrete slab, which correspondingly weakens and reduces the durability of the surface of the slab. The overworking of concrete during the finishing process not only brings an excess of water to the surface, but also some fine material, thereby resulting in inhomogeneity or nonuniformity which manifest themselves as subsequent surface defects.

For each of the foregoing reasons, as well as numerous others which cannot be listed here, cementitious materials have not generally had application outside of the formation of large, slab-like objects, such as in buildings, foundations, walk-ways, or highways, or as mortar to adhere bricks or cured concrete blocks. It is completely counterintuitive, as well as contrary to human experience, to even imagine the manufacture of small lightweight objects (such as containers comparable to the lightweight materials made from paper, plastic, or metal) from cementitious materials within the scope of the present invention.

Due to the more recent of the tremendous environmental impacts of using paper, cardboard, plastic, polystyrene, and metals for a variety of single-use, mainly disposable items such as containers (not to mention the ever mounting political pressures), there has been an acute need (long since recognized by those skilled in the art) to find environmentally sound substitute materials, such as cementitious materials, for these disposable items.

In spite of such pressures and long-felt need, the technology simply has not existed for the economic and feasible production of cementitious materials which could be substituted for paper, cardboard, plastic, polystyrene, or metal products such as containers. However, because cementitious materials essentially comprise such environmentally neutral components such as rock, sand, clay, and water, they would be ideally suited, from an ecological standpoint, to replace paper, cardboard, plastic, or polystyrene materials as the material of choice for such applications.

Such materials are not only made from nondepletable components, they do not impact the environment nearly as much as do paper, cardboard, plastic, and polystyrene. Another advantage of cementitious and other inorganic materials is that they are far less expensive than paper, cardboard, plastic, polystyrene, or metals.

While paper, cardboard, plastic, polystyrene, and metal products might be comparably priced to each other, they are far more expensive than typical cementitious materials. Because no rational business would ignore the economic benefit which would necessarily accrue from the substitution of radically cheaper cementitious materials for paper, cardboard, plastic, polystyrene, or metals, the failure to do so can only be explained by a marked absence of available technology to make such a substitution.

In light of the foregoing, what is needed are new materials other than paper, cardboard, plastic, or polystyrene which can be used in the manufacture of containers used in storing, dispensing, and packaging food or beverages. Such materials would represent a significant advancement in the art if they could be made without relying so heavily on the use of trees, petroleum, or other essentially nonrenewable or slowly renewing resources as the source of the primary starting material.

It would yet be an advancement in the art if such materials were more environmentally neutral, both in their manufacture and in their disposal. More particularly, it would be a tremendous advancement in the art if the manufacture of food and beverage containers did not result in the release of dioxin, CFCs or other dangerous chemicals into the environment, as does the use of presently used materials. Similarly, it would be an advancement if such containers were essentially made of components found naturally within the earth into which they may eventually be discarded.

It would be a significant advancement if such materials could be made to contain a high percentage of air voids so as to provide the insulation properties of containers made from polystyrene. It would yet be a significant advancement in the art if such materials could also be made to have properties of strength and aesthetics similar to those of paper, plastic, or thin metal.

It would be a significant improvement if such new materials could be made to have each of the properties found in existing materials used to make all of the various food and beverage containers found in the marketplace. This improvement would be even more important if such materials could be made to possess yet other properties not found in any of the existing materials (such as long shelf life, noncorrosive, and fire and heat resistant), which could be exploited to manufacture new food and beverage containers which have not hitherto been possible.

From a practical point of view, it would be a significant improvement in the art if such materials used in the manufacture of food and beverage containers could be produced at a cost that was comparable to, and even less expensive than, existing containers.

From a manufacturing perspective, it would be a significant advancement in the art if such materials could rapidly obtain form stability, maintain their shape without external support, and be handled in a manner similar to other materials presently used to manufacture food and beverage containers.

Such materials used to manufacture food and beverage containers are disclosed and claimed herein.

BRIEF SUMMARY AND OBJECTS OF THE INVENTION

The present invention relates to novel compositions and methods for the manufacture of food and beverage containers made from hydraulic settable materials. It has been found that lightweight, strong, and environmentally compatible (and if desired, flexible or insulative) food and beverage containers can be readily and inexpensively mass produced from hydraulically settable materials, including cement and gypsum, through innovative processes developed through materials science and microstructural engineering approaches. Disposable containers, cups, and other article of manufacture within the scope of the present invention are particularly useful for dispensing hot and cold food and beverages in the fast food restaurant environment.

The materials science and microstructural engineering approaches of the present invention build into the microstructure of the hydraulically settable compositions of the present invention the desired physical characteristics and properties, while at the same time remaining cognizant of costs and other complications involved in the large scale manufacturing systems. In doing so, many of the problems have been overcome which have historically relegated the use of most hydraulically settable materials to bulky, massive structural objects.

As discussed in greater detail hereinafter, the materials science and microstructural engineering approaches, instead of the traditional trial-and-error, mix-and-test approach, specifically allow for the design of hydraulically settable materials with the properties of high tensile and flexural strength, high insulation, low weight, low cost, and low environmental impact desired for disposable food and beverage containers. Control of the design of the hydraulically settable compositions on the microstructural level has come, in part, from the discovery that during formation of an object either (a) the rheology of the composition should be chemically modified to give moldability and rapid form stability, or (b) the water to cement ratio of the composition should be reduced by processing or by adding energy.

The result is the ability to mass produce on a commercially viable scale a wide variety of food and beverage containers and articles (including many which are disposable) from hydraulically settable materials at a cost that is usually competitive with, and in most cases even superior to, the cost involving using other materials. Moreover, because the hydraulically settable materials of the present invention comprise environmentally neutral components, the manufacture of food and beverage containers therefrom impacts the environment to a much lesser extent than does the manufacture of containers from these other materials. The hydraulically settable materials of the present invention preferably do not require the use of high concentrations of wood pulp or petroleum products as does the manufacture of food and beverage containers from paper, cardboard, plastic, polystyrene, or metals.

The major components within the hydraulically settable materials of the present invention include mainly inorganic materials, such as a hydraulic binder (like cement or gypsum), aggregates (like perlite, sand, glass, silica, vermiculite, clay, mica, and even waste concrete products), and sufficient water to hydrate, or react with, the hydraulic binder.

Although certain embodiments may also include organic components, such as cellulose-based fibers and/or rheology-modifying agents, these represent a small fraction of the overall mass of the hydraulically settable materials used to manufacture food and beverage containers. Together, the organic components will make up usually less than about 30% by volume of the unhardened hydraulically settable mixture; preferably, this fraction will be less than about 15% by volume.

However, due to the versatility of the hydraulically settable mixtures used in the manufacture of food and beverage containers, a wide range of fibers, both organic and inorganic, can be used. Any abundant fiber, not just wood fiber, but preferably those that can be planted and harvested in an agribusiness setting, works well within the invention. The use of such fibrous materials would have the additional beneficial effect of preserving our dwindling forests.

In any event, natural fibers from, e.g., wood, flax, abaca, hemp, cotton, and bagasse are preferred. Because they are held together with a hydraulic binder, they do not require the intense processing used to make most paper or cardboard products. Such processes are necessary in the paper industry in order to release the lignin within the wood pulp and to fray the fibers in order to achieve a web effect between the fibers in order to bind the fibers together. No such intense processing is necessary in the present invention, which to a major extent preserves the strength of the fibers and allows them to be included in far lesser amounts while still deriving a high level of strength therefrom.

Hence, the advantages of fibers can be incorporated into a hydraulic binder, with the addition of smaller concentration and without the extensive processing as in paper. Further, contaminated water is not a significant by-product in the processing of the present invention, as is the case in paper production.

Unlike the manufacture of plastic or polystyrene, the hydraulically settable materials of the present invention utilize little or no petroleum-based products or derivatives as starting materials. Thus, although some amount of fossil fuel is necessary to generate the energy used in manufacturing the hydraulically settable containers, only a fraction of the petroleum used in the manufacture of polystyrene or plastic products will be consumed overall. In addition, the energy requirements of the present invention are much less than the energy requirements of paper manufacturing; similarly, the initial capital investments can be less with the present invention.

Finally, another advantage of the hydraulically settable containers of the present invention is that their disposal impacts the environment less than paper and cardboard products, and much less than plastic or polystyrene products. The hydraulically settable materials of the present invention can be readily recycled. Nevertheless, even if not recycled, the hydraulically settable containers of the present invention can be discarded and reduced to a fine granular powder which has a composition complementary to the components of the earth into which it will be placed.

This disintegration process is not dependent on biodegradation forces but will occur as the result of various forces which may be present, such as moisture and/or pressure. For example, the rheology-modifying agent will dissolve over time through exposure to water, thereby creating voids within the matrix of the material. These voids make the material soft and easier to crush. In addition, both the rheology-modifying agent and the cellulose fibers are biodegradable (i.e., subject to breakdown by microorganisms, heat, light, and water).

If the hydraulically settable waste materials are discarded into a landfill, they will crumble into a fine granular powder under the weight of the other garbage present, thereby increasing the specific surface area available for further biodegradation and erosion. If discarded on the ground, the forces of water and wind, and even fortuitous compressive forces, such as from cars running over them or people stepping on them, will cause the hydraulically settable waste materials to be reduced to a substantially inorganic, more innocuous granular powder in a short period of time relative to the time it usually takes for the typical disposable paper or polystyrene foam cup to decompose under the same circumstances.

A plastic or metal cup or can thrown into a lake or stream will last for decades, perhaps even centuries, while a hydraulically settable container will dissolve in a short period of time into essentially a dirt-like sand or mud, the time of dissolution being dependent largely on the mix design of the hydraulically settable mixture used to manufacture the container.

The preferred structural matrix of the food and beverage containers manufactured according to the present invention is formed from the reaction products of a cementitious or other hydraulically settable mixture. A hydraulically settable mixture will, at a minimum, contain a hydraulic binder, such as hydraulic cement or gypsum hemihydrate, and water.

In order to design the desired specific functional properties into the hydraulically settable mixture and/or the hardened structural matrix for a specific container, a variety of other additives can be included within the hydraulic mixture, such as rheology-modifying agents, dispersants, one or more aggregate materials, fibers, air entraining agents, blowing agents, or reactive metals. The identity and quantity of any additive will depend on the desired properties or performance criteria of both the hydraulically settable mixture as well as the final hardened container made therefrom.

Rheology-modifying agents can be added to increase the cohesive strength, "plastic-like" behavior, and the ability of the mixture to retain its shape when molded or extruded. They act as thickeners and increase the yield stress of the hydraulically settable mixture, which is the amount of force necessary to deform the mixture. This creates high "green strength" in the molded or extruded product. Suitable rheology-modifying agents include a variety of cellulose-, starch-, and protein-based materials (which are generally highly polar), all of which assist in bridging the individual particles together.

Dispersants, on the other hand, act to decrease the viscosity and the yield stress of the mixture by dispersing the individual hydraulic binder particles. This allows for the use of less water while maintaining adequate levels of workability. Suitable dispersants include any material which can be adsorbed onto the surface of the hydraulic binder particles and which act to disperse the particles, usually by creating a charged area on the particle surface or in the near colloid double layer.

In the case where both a rheology-modifying agent and a dispersant are used, it will usually be advantageous to add the dispersant first and the rheology-modifying agent second in order to obtain the beneficial effects of each. Otherwise, if the rheology-modifying agent is first adsorbed by the binder particles, it may create a protective colloid layer, which will prevent the dispersant from being adsorbed by the particles and imparting its beneficial effect to the hydraulically settable mixture.

It may be preferable to include one or more aggregate materials within the hydraulically settable mixture in order to add bulk and decrease the cost of the mixture. Aggregates often impart significant strength properties and improve workability. An example of one such aggregate is ordinary sand or clay, which is completely environmentally safe, extremely inexpensive, and essentially inexhaustible.

In other cases, lightweight aggregates can be added to yield a lighter, and often more insulating, final product. Examples of lightweight aggregates are perlite, vermiculite, hollow glass spheres, aerogel, xerogel, pumice, and other lightweight, rocklike materials. These aggregates are likewise environmentally neutral and relatively inexpensive.

Fibers may be added to the hydraulically settable mixture in order to increase the compressive, tensile, flexural, and cohesive strengths of the wet material as well as the hardened container made therefrom. In the case where a food or beverage container is made from a hardened sheet, the inclusion of fibers will allow the hydraulically settable sheet to be rolled up, scored, or folded into the desired shape of a food or beverage container. Fiber should preferably have high tear and burst strengths (i.e., high tensile strength), examples of which include abaca, southern pine, flax, bagasse (sugar cane fiber), cotton, and hemp. Fibers with a high aspect ratio work best in imparting strength and toughness to the hydraulically settable material.

One significant aspect of the present invention is that the food and beverage containers can be economically and mass producibly manufactured. The food and beverage products disclosed herein are not intended to be handmade at the rate of a few at a time, but are intended to be made at the rate of hundreds, thousands, or tens of thousands per hour. The creation of new materials that can be rapidly processed in such a manner (that is, similar to paper, plastic, or metals) comes from utilization of one of the following approaches during the manufacturing process: (a) chemically modifying the hydraulically settable mixture (such as by the addition of a rheology-modifying agent) in order to give the mixture workability and then rapid form stability, or (b) reducing the water to cement ratio during the formation process (such as by the addition of energy in the form of heat or pressure). The application of these principles will become readily apparent from the following methods of manufacture.

Preferred methods of manufacturing hydraulically settable containers within the scope of the present invention include the steps of: (1) mixing a hydraulic binder and water in order to form a hydraulic paste, often in a high shear mixer; (2) adding other desired materials such as a rheology-modifying agent, dispersant, aggregates, and fibers to create a hydraulically settable mixture having the desired rheological as well as ultimate strength, weight, insulative, and low cost properties; and (3) forming an appropriate food or beverage container from the hydraulically settable mixture. The forming step (including molding the hydraulically settable mixture) may be carried out using a variety of methods; the three currently preferred methods include: (a) directly molding the article from a quantity of the hydraulic mixture, (b) molding or stamping the article from a moistened sheet of the mixture, and (c) forming the article by rolling, bending or folding a substantially dry sheet molded from the material. These methods are herein referred to as "direct molding," "wet sheet molding," and "dry sheet molding," respectively.

According to the presently preferred "direct molding" manufacturing method, the hydraulically settable mixture (prepared as described above) having the desired properties is positioned between a male die of a desired shape and a female die having a shape substantially complementary to that of the male die. The mixture is typically positioned by partially mating the dies and then injecting, such as by an auger-type (either single or double) or piston-type extruder, the mixture between the dies. Alternatively, a quantity of the mixture can be placed on a first die such that as the first die is mated with a second die, the mixture is positioned between the dies.

Next, the mixture is pressed between the dies so as to mold the mixture into the desired shape for the container. The types of dies that can be used include solid, split, and progressive dies. The type of die selected depends on the size, shape and complexity of the container being manufactured.

To economically produce the containers and articles, the fashioned containers must quickly obtain form stability. In one embodiment, the dies are each heated to a predetermined temperature so as to rapidly dry the surface of the container, thereby creating a form-stable container. Heating the dies also functions to form a steam barrier that minimizes the adhering of the container to the dies. Additional methods, such as cooling the dies or adding a nonhydrating liquid that rapidly evaporates, can also be used to quickly impart form stability to the containers. Still other methods used to impart form stability include the addition of gypsum hemihydrate, carbonate sources, accelerators, methyl cellulose, starch, and fibers to the mixture or limiting the amount of water in the mixture.

Once the containers obtain sufficient form stability, they can be removed from the dies. Removal from the dies is typically accomplished by airveying, or sucking the containers off the mold. Alternatively, a template can be used to lift the containers off the mold.

Finally, the containers are passed through a drying apparatus to drive off additional amounts of water within the container, thereby increasing the strength and improving the form stability of the container. The heat imparted by the drying apparatus also increases the rate of hydration of the hydraulic cement and reduces the time in which the cementitious matrix hardens. Once the container has obtained sufficient strength, the container can be packaged and shipped.

In the currently preferred embodiment of the "wet sheet molding" process for manufacturing the food and beverage articles, the hydraulically settable mixture having the desired characteristics (prepared according to the procedure described above) is extruded through a die, for example, an auger- or piston-type extruder, into relatively thin sheets of a predetermined thickness. In one embodiment, a vacuum is attached to the auger to remove excess air from the mixture.

The extruded sheets are then "calendered" by passing them between a set of reduction rollers to form sheets with a more uniform thickness and a smoother surface. The rollers can be heated to create a steam barrier that minimizes adherence between the rollers and hydraulically settable mixture. Heating the rollers also has the effect of driving off a portion of the water within the sheets. Likewise, the rollers can also be cooled to prevent sticking of the mixture. In some cases, it may be preferable to pass the sheets through a series of sets of rollers having progressively smaller distances between the sets of rollers to obtain a calendered sheet having a progressively thinner thickness.

In addition, by using a pair of rollers having different orientations in the "Z" direction (or normal to the surface of the sheet), such as by using a flat roller paired with a conical roller, a percentage of the fibers can be oriented in the "X" (or width-wise) direction. In this way, a sheet having bidirectionally oriented fibers can be manufactured. This is thought to occur because the conical roller can widen the sheet in the "X" direction. Sheets having bidirectionally aligned fibers produce containers having a more uniform strength.

A portion of the sheet is then fashioned into a desired shape for a container or article. This is preferably accomplished by pressing the sheet between a male die of a desired shape and a female die having a substantially complementary configuration of the male die shape. Alternative types of dies that can be used include split dies and progressive dies. The containers can also be formed by applying one of many vacuum forming techniques to the hydraulically settable sheets.

As with the direct molding process, the containers are then passed through a drying apparatus to drive off additional amounts of water within the container to increase the strength, improve the form stability of the container, increase the rate of hydration of the hydraulic cement, and reduce the time in which the cementitious matrix ultimately hardens. In fact, each of the techniques used to obtain rapid form stability in the direct molding process can also be used in the wet sheet molding process. Finally, the containers are cut from the remaining sheet.

The presently preferred "dry sheet molding" method of manufacturing containers from hydraulically settable sheets within the scope of the present invention includes the steps of: (1) placing the hydraulically settable mixture (prepared as described above) into an extruder, such as an auger or piston extruder, in a manner substantially the same as in the "wet sheet molding" process; (2) while providing a means for deairing the hydraulic mixture, extruding the mixture through an appropriate die to preferably form a flat sheet of a desired thickness or a pipe that can be unfolded into a sheet; (3) as in the "wet sheet molding" process, reducing the thickness of the sheet by passing it between at least one pair of rollers; and (4) drying the sheet to create a substantially hardened structural matrix.

In addition, the sheet can be optionally compacted while still in a slightly moistened condition in order to eliminate unwanted voids within the structural matrix, increase the fiber adhesion, reduce porosity, and/or increase surface smoothness. This is carried out by passing the sheet between one or more separate sets of compaction rollers. By carefully controlling the water content, it will be possible to ensure that the compaction rollers only compress and increase the density of the sheet without further elongating the sheet.

The compaction step improves the strength of the final hardened sheet by creating a more uniform structural matrix while also leaving the sheet with a smoother finish. The optional compaction step is generally preferred in the case of thinner sheets, where strength per unit of thickness should be maximized and where insulation ability is less important. Compaction is generally unnecessary for thicker sheets intended to have high insulation and/or low weight characteristics.

The sheet can also be optionally scored, score cut, or perforated while in a slightly moistened or even in the dry condition in order to create a line within the structural matrix upon which the sheet can later be hinged or bent. Optionally, the sheet could be passed through a set of corrugation rollers in order to produce a corrugated sheet and/or cardboard.

Before, during, or after any of the three foregoing molding processes, coatings may be applied to the surface of a substantially dried sheet or container for a number of reasons, such as to make the container more waterproof, more flexible, or to give it a glossier surface. Coatings based upon materials such as soybean and methocel, alone or in combination with polyethylene glycol, can be applied to the surface in order to permanently soften the sheet or container or hinge within the container.

Elastomers, plastic, or paper coatings can aid in preserving the integrity of a fold or hinge (if used), whether or not the underlying hardened structural matrix fractures upon bending at the hinge. It may be also desirable to print or emboss the sheets or containers with indicia, logos, or other printed material.

Additional embodiments of the present invention include the addition of air voids in order to add insulative properties (for both hot and cold foods and beverages) to the cups and containers. These air voids are created by the incorporation of gas through various techniques into the cementitious mixture—one method being the mechanical incorporation of air voids during the mixing process, and another being the incorporation of a gas which is chemically generated in situ within the cement paste.

The compositions of the present invention can be varied to yield products of substantially different character. For example, very lightweight products (similar to that of polystyrene foam) with rigid walls can be manufactured. For convenience, this first type of product is sometimes herein referred to as a "foam-like" product.

Alternatively, products that have an appearance more like that of a pottery or ceramic product can be made according to the present invention. However, the products of the present invention are much lighter, typically having a bulk specific gravity less than about 1.5, whereas pottery or ceramic products typically have a bulk specific gravity of 2.0 or greater. This second type of product of the present invention is sometimes herein referred to as a "clay-like" product, because it is a zero-slump, form stable, hydraulically settable material that still has excellent workability properties.

Both foam-like and clay-like materials may first be molded into a sheet (or a continuous roll), which is later stamped, pressed, scored, folded, or rolled into a desired container or other article of manufacture. This third kind of product will be referred to as a "sheet-like" product, which will appear most like, and take the place of, paper or cardboard in many food and beverage containers.

A key feature of the microstructural engineering design of the present invention is the materials science optimization of each desired property (including minimization of cost). It is only because of the unique microstructural engineering of the present invention that the cementitious mixtures can be molded into a thin-walled, complex, lightweight product such as a food and beverage container and still maintain its shape without external support during the green state until hardening can be accomplished.

Indeed, the economic viability of mass producing food and beverage cups from cementitious materials is only possible because the cementitious mixture is self-supporting during the green state and will maintain its molded state throughout the curing process. In addition, the compositions of the present invention importantly provide cementitious mixtures that rapidly reach a sufficiently high tensile and compressive strength so that the molded containers can be handled and manipulated using conventional means.

From the foregoing, it will be appreciated that an object of the present invention is the development of new hydraulically settable materials which can be used in place of paper, cardboard, plastic, or polystyrene in the manufacture of containers used in storing, dispensing, and packaging food or beverages.

Further, another object and feature of the present invention is the development of materials which could be made without relying on trees, petroleum, or other essentially nonrenewable or slowly renewing resources to provide the primary starting material.

Yet another object of the present invention is the development of materials that are more environmentally neutral, both in their manufacture and in their disposal than paper, cardboard, plastic, polystyrene, and metal materials. A further object of the present invention is the development of products which require less energy and lower initial capital investments for manufacturing.

It is another object that the manufacture of such food and beverage containers does not result in the release of dioxin, CFCs or other dangerous chemicals into the environment, as does the use of presently used materials. Similarly, it is an object that such containers are essentially made of components found naturally within the earth into which they may eventually be discarded.

It is another object and feature of certain embodiments of the present invention that such containers can be made to provide the insulation properties of containers made from polystyrene foam.

It is yet another feature and object of the present invention to provide materials that can be made to have similar properties of strength and esthetics as paper, plastic, or metal materials.

Another object and feature of the present invention is to provide new materials that can be made to alternatively have each of the properties found in existing materials used to make all of the various food and beverage containers found in the marketplace. It is yet another object and feature to provide new materials that can be made to possess yet other properties not found in any of the existing materials, which could be exploited to manufacture new food and beverage containers which have not hitherto been possible.

Another object of the present invention is to provide new materials used in the manufacture of food and beverage containers which can be produced at a cost that is comparable to, and even less expensive than, existing containers.

A further object and feature of the present invention is to provide hydraulically settable materials which can rapidly obtain form stability, maintain their shape without external support, and be handled in a manner similar to other materials presently used to manufacture food and beverage containers, such that cost-effective mass producibility is possible.

These and other objects and features of the present invention will become more fully apparent from the following description and appended claims, or may be learned by the practice of the invention.

DETAILED DESCRIPTION OF THE PREFERRED EMBODIMENTS

The present invention is directed to novel hydraulically settable compositions and methods used to manufacture containers and other articles of manufacture for use in the storing, dispensing, and packaging of various food and beverage products. More particularly, the present invention is directed to disposable and nondisposable hydraulically settable food and beverage containers and cups manufactured which are lightweight, have a high tensile and flexural strength, have a low bulk density, are insulative (if desired), can be produced cost effectively, and which have a low environmental impact compared to containers presently used to store, dispense, and package food and beverages, particularly in the fast food industry.

As discussed above, the cups and containers within the scope of the present invention can be made to have a variety of densities and physical characteristics. "Foam-like," "clay-like," and "sheet-like" products can be manufactured, depending upon the concentrations and types of the materials used and the molding, casting, or extrusion process utilized.

I. General Discussion.

A. Microstructural Engineering Design.

As mentioned above, the food and beverage containers and articles of the present invention have been developed from the perspective of microstructural engineering in order to build into the microstructure of the hydraulically settable material certain desired, predetermined properties, while at the same time remaining cognizant of costs and other manufacturing complications. Furthermore, this microstructural engineering analysis approach, in contrast to the traditional trial-and-error, mix-and-test approach, has resulted in the ability to design hydraulically settable materials with those properties of strength, weight, insulation, cost, and environmental neutrality that are necessary for appropriate food and beverage containers in a significantly more efficient manner.

The number of different raw materials available to engineer a specific product is enormous, with estimates ranging from between fifty thousand and eighty thousand. They can be drawn from such disparately broad classes as metals, polymers, elastomers, ceramics, glasses, composites, and cements. Within a given class, there is some commonality in properties, processing, and use-patterns. Ceramics, for instance, have a high modulus of elasticity, while polymers have a low modulus; metals can be shaped by casting and forging, while composites require lay-up or special molding techniques; hydraulically settable materials, including those made from hydraulic cements, historically have low flexural strength, while elastomers have high flexural strength.

However, compartmentalization of material properties has its dangers; it can lead to specialization (the metallurgist who knows nothing of ceramics) and to conservative thinking ("we use steel because that is what we have always used"). It is this specialization and conservative thinking that has limited the consideration of using hydraulically settable materials for a variety of products, such as in connection with the food and beverage industry.

Nevertheless, once it is realized that hydraulically settable materials have such a wide utility and can be designed and microstructurally engineered, then their applicability to a variety of possible products becomes obvious. Hydraulically settable materials have an additional advantage over other conventional materials in that they gain their properties under relatively gentle and nondamaging conditions. (Other materials require high energy, severe heat, or harsh chemical processing that significantly affects the material components.) Therefore, many nonhydraulically settable materials can be incorporated into hydraulically settable materials with surprising synergistic properties or results if properly designed and engineered.

The design of the compositions of the present invention has been developed and narrowed, first by primary constraints dictated by the design, and then by seeking the subset of materials which maximizes the performance of the components. At all times during the process, however, it is important to realize the necessity of designing products which can be manufactured in a cost-competitive process.

Primary constraints in materials selection are imposed by characteristics of the design of a component which are critical to a successful product. With respect to a cup or container for a food and beverage product, those primary constraints include minimal weight, strength (both compressive and tensile), and toughness requirements, while simultaneously keeping the costs to those comparable to paper, plastic, and metal counterparts.

As discussed above, one of the problems with hydraulically settable materials in the past has been that they are typically poured into a form, worked, and then allowed to set, harden, and cure over a long period of time—even days or weeks. Experts generally agree that it takes at least one month for traditional concrete products to reach a substantial degree of their optimum strength. Even with expensive "set accelerators," this strength gain occurs over a period of days. Such time periods are certainly impractical for the economic mass production of disposable containers and similar products.

As a result, an important feature of the present invention is that when the hydraulically settable mixture is molded, it will maintain its shape (i.e., support its own weight subject to minor forces, such as gravity and movement through the processing equipment) in the green state without external support. Further, from a manufacturing perspective, in order for production to be economical, it is important that the molded container (or sheet used to make a container) rapidly (in a matter of minutes, or even seconds) achieve sufficient strength so that it can be handled using ordinary manufacturing procedures, even though the hydraulically settable mixture may still be in a green state and not fully hardened.

Another advantage of the microstructural engineering approach of the present invention is the ability to develop compositions in which cross-sections of the structural matrix are more homogeneous than have been typically achieved in the prior art. Ideally, when any two given samples of about 1–2 mm$^3$ of the hydraulically settable structural matrix are taken, they will have substantially similar amounts of voids, aggregates, fibers, any other additives., and properties of the matrix.

In its simplest form, the process of using materials science in microstructurally engineering and designing a hydraulically settable material comprises characterizing, analyzing, and modifying (if necessary): (a) the aggregates, (b) the predicted particle packing, (c) the system rheology, and (d) the processing and energy of the manufacturing system. In characterizing the aggregates, the average particle size is determined, the natural packing density of the particles (which is a function of the size distribution of the particles) is determined, and the strength of the particles is ascertained.

With this information, the particle packing can be predicted according to mathematical models. It has been established that the particle packing is a primary factor for designing desired requirements of the ultimate product, such as workability, form stability, shrinkage, bulk density, insulative capability, tensile, compressive, and flexural strengths, elasticity, durability, and cost optimization. The particle packing is affected not only by the particle and aggregate characterization, but also by the amount of water and its relationship to the interstitial void volume of the packed aggregates.

System rheology is a function of both macro-rheology and micro-rheology. The macro-rheology is the relationship of the solid particles with respect to each other as defined by the particle packing. The micro-rheology is a function of the lubricant fraction of the system. By modification of the lubricants (which may be water, rheology-modifying agents, plasticizers, or other materials), the viscosity and yield stress can be chemically modified. The micro-rheology can also be modified physically by changing the shape and size of the particles, e.g., the use of chopped fibers, plate-like mica, round-shaped silica fume, or crushed rough cement particles will interact with the lubricants differently.

Finally, the manufacturing processing can be modified to manipulate the balance between workability and form stability. As applied to the present invention, this becomes important in significantly increasing the yield stress during formation of the article of manufacture by either chemical additive (such as by adding a rheology-modifying agent) or by adding energy to the system (such as by heating the molds). Indeed, it is this discovery of how to manipulate the hydraulically settable compositions in order to quickly increase the form stability of the compositions during the formation process that make the present invention such a significant advancement in the art.

From the following discussion, it will be appreciated how each of the component materials within the hydraulically settable mixture, as well as the processing parameters, contributes to the primary design constraints of the food and beverage container so that they can be economically mass produced. Specific compositions are set forth in the examples given later in order to demonstrate how the maximization of the performance of each component accomplishes the combination of desired properties.

B. Food and Beverage Containers

The term "container" as used in this specification and the appended claims is intended to include any article, receptacle, or vessel utilized for storing, dispensing, packaging, or portioning items, whether such use is intended to be short term or long term. Examples of such containers include boxes, cups, jars, bottles, plates, cartons, cases, crates, dishes, egg cartons, lids, straws, cutlery, utensils, or other types of holders. It will be appreciated that in certain circumstances, the container may seal the contents from the external atmosphere, and in other circumstances may merely hold or retain the items.

The term "disposable container" as used in this specification and the appended claims refers to a container which has the characteristics typically associated with disposable materials. That is, the container (a) is manufactured in such a way that it is economical for the container to be used only once and then discarded, and (b) has a construction such that it can be readily discarded or thrown away in conventional waste landfill areas as an environmentally neutral material (without causing significant extraordinary environmental hazards). The use of the term "disposable" does not mean that the container must necessarily only be a single-use container and that it be discarded after only one use.

The terms "food" and/or "beverage" are used collectively and are often interchangeably used herein. It is the objective of the present invention to develop container products for use with food and beverages. Accordingly, the hydraulically settable materials used in the containers of the present invention have been developed to accommodate the specific needs of storing, dispensing, packing, and portioning food and beverage products. The present invention is of particular use in the "fast-food" industry where disposable cups, plates, trays, platters, and "clam-shell" containers are frequently used to dispense the products.

For purposes of the present invention, the food and beverage containers disclosed and claimed in the present invention are directed to those containers and materials which come in direct contact with the food or beverage, including any coating or liner that might be incorporated with the container. In other words, the present invention is not directed to packaging materials generally, or to containers which hold other containers which hold the food or beverage products. Such general packaging materials are disclosed in a related patent specification from which priority is claimed above.

The phrases "mass producible" or manufactured in a "commercial" or "economic" manner are intended in the specification and the appended claims to refer to a capability of the containers and articles of manufacture described herein to be rapidly produced at a rate of hundreds, thousands, or tens of thousands per hour. The present invention is directed to innovative compositions which solve the prior art problems of incorporating hydraulically settable binders into the matrices of products which can be rapidly manufactured by machine, rather than individual hand manufacture of one product at a time (such as "throwing pots").

The products are intended to be competitive in the marketplace with food or beverage containers currently made of various materials such as paper, plastic, polystyrene, or metals. Hence, the articles of manufacture of the present invention must be economical to manufacture (typically, the cost will not exceed a few cents per item). Such cost restraints thus require automated production of thousands of the articles in a very short period of time. Hence, requiring the products of the present invention to be economically mass produced is a significant limitation on the qualities of the material and the products.

C. Hydraulically Settable Materials.

The materials used to manufacture the food and beverage containers of the present invention develop strength through the chemical reaction of water and a hydraulic binder, such as hydraulic cement, calcium sulfate (or gypsum) hemihydrate, and other substances which harden after being exposed to water. The term "hydraulically settable materials" as used in this specification and the appended claims includes any material whose structural matrix and strength properties are derived from a hardening or curing of a hydraulic binder. These include cementitious materials, plasters, and other hydraulically settable materials as defined herein. The hydraulically settable binders used in the present invention are to be distinguished from other cements or binders such as polymerizable, water insoluble organic cements, glues, or adhesives.

The terms "hydraulically settable materials," "hydraulic cement materials," or "cementitious materials," as used herein, are intended to broadly define compositions and materials that contain both a hydraulically settable binder and water, regardless of the extent of hydration or curing that has taken place. Hence, it is intended that the term "hydraulically settable materials" shall include hydraulic paste or hydraulically settable mixtures in a green (i.e., unhardened) state, as well as hardened hydraulically settable or concrete products.

1. Hydraulic Cements.

The terms "hydraulically settable binder" or "hydraulic binder" as used in this specification and the appended claims are intended to include any inorganic binder such as hydraulic cement, gypsum hemihydrate, or calcium oxide which develops strength properties and hardness by chemically reacting with water and, in some cases, with carbon dioxide in the air and water. The terms "hydraulic cement" or "cement" as used in this specification and the appended claims are intended to include clinker and crushed, ground, milled, and processed clinker in various stages of pulverization and in various particle sizes.

Examples of typical hydraulic cements known in the art include: the broad family of portland cements (including ordinary portland cement without gypsum), calcium aluminate cements (including calcium aluminate cements without set regulators), plasters, silicate cements (including β-dicalcium silicates, tricalcium silicates, and mixtures thereof), gypsum cements, phosphate cements, high alumina cements, microfine cements, slag cements, magnesium oxychloride cements, MDF, "densit-type" cements, and aggregates coated with microfine cement particles.

The term "hydraulic cement" is also intended to include other cements known in the art, such as α-dicalcium silicate, which can be made hydraulic under hydrating conditions within the scope of the present invention. The basic chemical components of the hydraulic cements within the scope of the present invention usually include $CaO$, $SiO_2$, $Al_2O_3$, $Fe_2O_3$, $MgO$, $SO_3$, in various combinations thereof. These react together in a series of complex reactions to form insoluble calcium silicate hydrates, carbonates (from $CO_2$ in the air and added water), sulfates, and other salts or products of calcium and magnesium, together with hydrates thereof. The aluminum and iron constituents are thought to be incorporated into elaborate complexes within the above mentioned insoluble salts. The cured cement product is a complex matrix of insoluble hydrates and salts which are complexed and linked together much like stone, and are similarly inert.

Hydraulically settable compositions are typically formed by mixing a hydraulic binder or combinations thereof (such as hydraulic cement) and water; the resulting mixture may be referred to as a "hydraulic paste" (or "cement paste"). The hydraulic binder and water are mixed either simultaneously or subsequently, with some sort of aggregate blended to form a "hydraulically settable mixture." Mortar and concrete are examples of hydraulically settable mixtures formed by mixing hydraulic cement, water, and some sort of aggregate, such as sand or rock.

Gypsum is also a hydraulically settable binder that can be hydrated to form a hardened binding agent. One hydratable form of gypsum is calcium sulfate hemihydrate, commonly known as "gypsum hemihydrate." The hydrated form of gypsum is calcium sulfate dihydrate, commonly known as "gypsum dihydrate." Calcium sulfate hemihydrate can also be mixed with calcium sulfate anhydride, commonly known as "gypsum anhydrite" or simply "anhydrite."

Although gypsum binders or other hydraulic binders such as calcium oxide are generally not as strong as hydraulic cement, high strength may not be as important as other characteristics (e.g., the rate of hardening) in some applications. In terms of cost, gypsum and calcium oxide have an advantage over hydraulic cement, because they are somewhat less expensive. Moreover, in the case where the hydraulically settable material contains a relatively high percentage of weak, lighter weight aggregates (such as perlite), the aggregates will often comprise a "weak link" within the structural matrix. At some point, adding a stronger binder may be inefficient because the binder no longer contributes its higher potential strength due to a high content of weaker aggregates.

In addition, gypsum hemihydrate is known to set up or harden in a much shorter time period than traditional cements. In fact, in use with the present invention, it will harden and attain most of its ultimate strength within about thirty minutes. Hence, gypsum hemihydrate can be used alone or in combination with other hydraulically settable materials within the scope of the present invention.

Terms such as "hydrated" or "cured" hydraulically settable mixture, material, or matrix refers to a level of substantial water-catalyzed reaction which is sufficient to produce a hydraulically settable product having a substantial amount of its potential or final maximum strength. Nevertheless, hydraulically settable materials may continue to hydrate long after they have attained significant hardness and a substantial amount of their final maximum strength.

Terms such as "green" or "green state" are used in conjunction with hydraulically settable mixtures which have not achieved a substantial amount of their final strength, regardless of whether such strength is derived from artificial drying, curing, or other means. Hydraulically settable mixtures are said to be "green" or in a "green state" just prior to and subsequent to being molded into the desired shape. The moment when a hydraulically settable mixture is no longer "green" or in a "green state" is not necessarily a clear-cut line of demarcation, since such mixtures generally attain a substantial amount of their total strength only gradually over time. Hydraulically settable mixtures can, of course, show an increase in "green strength" and yet still be "green." For this reason, the discussion herein often refers to the form stability of the hydraulically settable material in the green state.

As mentioned above, preferable hydraulic binders include white cement, portland cement, microfine cement, high alumina cement, slag cement, gypsum hemihydrate, and calcium oxide, mainly because of their low cost and suitability for the manufacturing processes of the present invention. This list of cements is by no means exhaustive, nor in any way is it intended to limit the types of binders which would be useful in making the hydraulically settable containers within the scope of the claims appended hereto.

The present invention may include other types of cementitious compositions such as those discussed in patent application Ser. No. 07/526,231 filed May 18, 1990 (now abandoned), in the names of Hamlin M. Jennings, Ph.D. and Simon K. Hodson, and entitled "Hydraulically Bonded Cement Compositions and Their Methods of Manufacture and Use," wherein powdered hydraulic cement is placed in a near net final position and compacted prior to the addition of water for hydration. A related continuation-in-part application, U.S. Pat. No. 5,358,676 was filed in the names of Hamlin M. Jennings, Ph.D., Per Just Andersen, Ph.D. and Simon K. Hodson, and also entitled "Hydraulically Bonded Cement Compositions and Their Methods of Manufacture and Use." For purposes of disclosure, the forgoing patents are incorporated herein by specific reference.

Additional types of hydraulic cement compositions include those wherein carbon dioxide is mixed with hydraulic cement and water. Hydraulic cement compositions made by this method are known for their ability to more rapidly achieve green strength. This type of hydraulic cement composition is discussed in U.S. Pat. No. 5,232,496, in the names of Hamlin M. Jennings, Ph.D. and Simon K. Hodson, and entitled "Process for Producing Improved Building Material and Products Thereof," wherein water and hydraulic cement are mixed in the presence of a carbonate source selected from the group consisting of carbon dioxide, carbon monoxide, carbonate salts, and mixtures thereof. For purposes of disclosure, the forgoing patent is incorporated herein by specific reference.

In many situations, it may not be desirable for the food or beverage container to be water soluble. Unfortunately, certain materials which might be desirable to incorporate into such containers dissolve in water. An important advantage of using a hydraulically settable mixture is that the resulting structural matrix is generally water insoluble (at least over the period of time during which use of the product is intended), which allows it to encapsulate the water soluble aggregates or other materials added to the hydraulically settable mixture. Hence, an otherwise water soluble component can be incorporated into the greatly insoluble hydraulically settable matrix and impart its advantageous properties and characteristics to the final product.

Nevertheless, in order to design a disposable food or beverage container which will more readily decompose or disintegrate after it has fulfilled its intended use, it may be desirable for the food or beverage container to break down in the presence of water or moisture. One of the advantages of the microstructural engineering approach of the present invention is the ability to design into the hydraulically settable structural matrix the desired properties of water resistance or solubility. In order to obtain a container that readily decomposes in the presence of water, it will generally be necessary to decrease the amount of hydraulic binder within the material. Hence, the degree of water solubility or insolubility is generally related to the concentration of hydraulic binder, particularly hydraulic cement, within the hydraulically settable mixture. In most cases, adding more hydraulic binder will make the container less soluble in water.

2. Hydraulic Paste.

In each embodiment of the present invention, the hydraulic paste or cement paste is the key constituent which eventually gives the container the ability to "set up" and develop strength properties. The term "hydraulic paste" shall refer to a hydraulic binder which has been mixed with water. More specifically, the term "cement paste" shall refer to hydraulic cement which has been mixed with water. The terms "hydraulically settable," "hydraulic," or "cementitious" mixture shall refer to a hydraulic cement paste to which aggregates, fibers, rheology-modifying agents, dispersants, or other materials have been added, whether in the green state or after it has hardened and/or cured. The other ingredients added to the hydraulic paste serve the purpose of altering the properties of the unhardened, as well as the final hardened product, including, but not limited to, strength, shrinkage, flexibility, bulk density, insulating ability, color, porosity, surface finish, and texture.

Although the hydraulic binder is understood as the component which allows the hydraulically settable mixture to set up, to harden, and to achieve much of the strength properties of the material, certain hydraulic binders also aid in the development of better early cohesion and green strength. For example, hydraulic cement particles are known to undergo early gelating reactions with water even before it becomes hard; this can contribute to the internal cohesion of the mixture.

It is believed that aluminates, such as those more prevalent in portland grey cement (in the form of tricalcium aluminates) are responsible for a colloidal interaction between the cement particles during the earlier stages of hydration. This in turn causes a level of flocculation/gelation to occur between the cement particles. The gelating, colloidal, and flocculating affects of such binders has been shown to increase the moldability (i.e., cohesion and plasticity) of hydraulically settable mixtures made therefrom.

As set forth more fully below, additives such as fibers and rheology-modifying agents can make substantial contributions to the hydraulically settable materials in terms of tensile, flexural, and compressive strengths. Nevertheless, even where high concentrations of fibers and/or rheology-modifying agents are included and contribute substantially to the tensile and flexural strengths of the hardened material, it has been shown that the hydraulic binder nevertheless continues to add substantial amounts of compressive strength and other important properties to the final hardened material. In the case of hydraulic cement, it also substantially reduces the solubility of the hardened material in water.

The percentage of hydraulic binder within the overall mixture varies depending on the identity of the other added constituents. However, the hydraulic binder is preferably added in an amount ranging from between about 5% to about 90% as a percentage by weight of the wet hydraulically settable mixture. From the disclosure and examples set forth herein, it will be understood that this wide range of weights covers hydraulically settable mixtures used to manufacture foam-like, clay-like, or sheet-like materials and containers.

It will be appreciated from the foregoing that embodiments within the scope of the present invention will vary from a very lightweight "foam-like" product to a somewhat higher density "clay-like" product. In addition, either foam-like or clay-like materials may first be molded into sheets to form a "sheet-like" product, resulting in a product which can be handled much like paper, cardboard, plastic, or even a sheet of metal. Within these broader categories will be other variations and differences which will require varying quantities and identities of the components. The components and their relative quantities may substantially vary depending upon the specific container or other product to be made.

Generally, when making a "foam-like" product, it will be preferable to include the hydraulic binder within the range from between about 10% to about 90% by weight of the wet hydraulically settable mixture, and more preferably within the range from between about 20% to about 50%.

When making a "clay-like" product, it will be preferable to include the hydraulic binder within the range from between about 5% to about 75% by weight of the wet hydraulically settable mixture, more preferably within the range from between about 8% to about 60%, and most preferably within the range from between about 10% to about 45%.

Finally, when making a "sheet-like" product, it will be preferable to include the hydraulic binder within the range from between about 5% to about 90% by weight of the green hydraulically settable mixture, preferably within the range from about 8% to about 50%, and most preferably within the range from about 10% to about 30%.

Despite the foregoing, it will be appreciated that all concentrations and amounts are critically dependent upon the qualities and characteristics that are desired in the final product. For example, in a very thin wall structure (even as thin as 0.05 mm) where strength is needed, such as in a drinking straw, it may be more economical to have a very high percentage of hydraulic binder with little or no aggregate. In such a case, it may also be desirable to include a high amount of fiber to impart flexibility and toughness.

Conversely, in a product in which high amounts of air are incorporated (such as a low density, lightweight, insulating cup), there may be a greater percentage of the rheology-modifying agent, a smaller amount of cement, and larger amounts of lightweight aggregates. Such materials can have as high a percentage of air as do polystyrene foam products.

The other important constituent of hydraulic paste is water. By definition, water is an essential component of the hydraulically settable materials within the scope of the present invention. The hydration reaction between hydraulic binder and water yields reaction products which give the hydraulically settable materials the ability to set up and develop strength properties.

In most applications of the present invention, it is important that the water to cement ratio be carefully controlled in order to obtain a hydraulically settable mixture which after molding, extrusion, and/or calendering is self-supporting in the green state. Nevertheless, the amount of water to be used is dependent upon a variety of factors, including the types and amounts of hydraulic binder, aggregates, fibrous materials, rheology-modifying agents, and other materials or additives within the hydraulically settable mixture, as well as the molding or forming process to be used, the specific product to be made, and its properties.

The preferred amount of added water within any given application is primarily dependent upon two key variables: (1) the amount of water which is required to react with and hydrate the binder; (2) the amount of water required to give the hydraulically settable mixture the necessary rheological properties and workability.

In order for the green hydraulically settable mixture to have adequate workability, water must generally be included in quantities sufficient to wet each of the particular components and also to at least partially fill the interstices or voids between the particles (including, e.g., binder particles, aggregates, and fibrous materials). If water soluble additives are included, enough water must be added to dissolve or otherwise react with the additive. In some cases, such as where a dispersant is added, workability can be increased while using less water.

The amount of water must be carefully balanced so that the hydraulically settable mixture is sufficiently workable, while at the same time recognizing that lowering the water content increases both the green strength and the final strength of the hardened product. Of course, if less water is initially included within the mixture, less water must be removed in order to allow the product to harden.

The appropriate rheology to meet these needs can be defined in terms of yield stress. The yield stress of the hydraulically settable mixture will usually be in the range from between about 5 kPa to about 5,000 kPa, with the more preferred mixtures having a yield stress within a range from about 100 kPa to about 1,000 kPa, and the most preferred mixtures having a yield stress in the range from about 200 kPa to about 700 kPa. The desired level of yield stress can be (and may necessarily have to be) adjusted and optimized to the particular molding process being used to form the food or beverage container.

In each of the molding processes, it may be desirable to initially include a relatively high water to cement ratio in light of the fact that the excess water can be removed by heating the molded products during or shortly after the molding process. One of the important features of the present invention as compared to the manufacture of paper is that the amount of water in the initial mixture is much less; hence, the yield stress is greater for the hydraulically settable mixtures. The result is that the total amount of water that must be removed from the initial mixture to obtain a self-supporting material (i.e., a form stable material) is much less in the case of the present invention when compared to the manufacture of paper.

Nevertheless, one skilled in the art will understand that when more aggregates or other water absorbing additives are included, a higher water to hydraulically settable binder ratio is necessary in order to provide the same level of workability and available water to hydrate the hydraulically settable binder. This is because a greater aggregate concentration provides a greater volume of interparticulate interstices, or voids, which must be filled by the water. Porous, lightweight aggregates can also internally absorb significant amounts of water due to their high void content.

Both of the competing goals of greater workability and high green strength can be accommodated by initially adding a relatively large amount of water and then driving off much of the water as steam during the molding process, usually by the use of heated molds, rollers, or drying tunnels.

Based on the foregoing qualifications, typically hydraulically settable mixtures within the scope of the present invention will have a water to cement ratio within a range from about 0.1 to about 10, preferably about 0.3 to about 3.5, and most preferably from about 1 to about 3. The total amount of water remaining after drying the material to remove excess water will range up to about 10% by weight with respect to the dry, hardened hydraulically settable sheet or container.

It should be understood that the hydraulic binder has an internal drying effect on the hydraulically settable mixture because binder particles chemically react with water and reduce the amount of free water within the interparticulate interstices. This internal drying effect can be enhanced by including faster reacting hydraulic binders, such as gypsum hemihydrate, along with slower reacting hydraulic cement.

According to a preferred embodiment of the present invention, it has been found desirable that the hydraulic binder and water be mixed in a high shear mixture such as that disclosed and claimed in U.S. Pat. No. 4,225,247 entitled "Mixing and Agitating Device"; U.S. Pat. No. 4,552,463 entitled "Method and Apparatus for Producing a Colloidal Mixture"; U.S. Pat. No. 4,889,428 entitled "Rotary Mill"; U.S. Pat. No. 4,944,595 entitled "Apparatus for Producing Cement Building Materials"; and U.S. Pat. No. 5,061,319 entitled "Process for Producing Cement Building Material." For purposes of disclosure, the forgoing patents are incorporated herein by specific reference. High shear mixers within the scope of these patents are available from E. Khashoggi Industries of Santa Barbara, Calif., the assignee of the present invention.

The use of a high shear mixer has resulted in a more homogeneous hydraulically settable mixture, which has resulted in a product with higher strength. Furthermore, these high shear mixes can be utilized to entrain significant amounts of air into the hydraulically settable mixture to create "foam-like" products.

C. Rheology-modifying Agents.

The inclusion of a rheology-modifying agent acts to increase the plastic or cohesive nature of the hydraulically settable mixture so that it behaves more like a moldable clay. The rheology-modifying agent tends to thicken the hydraulically settable mixture by increasing the yield stress without greatly increasing the viscosity of the mixture. Raising the yield stress in relation to the viscosity makes the material more plastic-like and moldable, while greatly increasing the subsequent form stability or green strength.

A variety of natural and synthetic organic rheology-modifying agents may be used which have a wide range of properties, including viscosity and solubility in water. For example, where it is desirable for the container to more quickly break down into environmentally benign components, it may be preferable to use a rheology-modifying agent which is more water soluble. Conversely, in order to design a material capable of withstanding prolonged exposure to water, it may be preferable to use a rheology-modifying agent which is less soluble in water or to use a high content of the hydraulic binder with respect to the rheology-modifying agent.

The various rheology-modifying agents contemplated by the present invention can be roughly organized into the following categories: (1) polysaccharides and derivatives thereof, (2) proteins and derivatives thereof, and (3) synthetic organic materials. Polysaccharide rheology-modifying agents can be further subdivided into (a) cellulose-based materials and derivatives thereof, (b) starch-based materials and derivatives thereof, and (c) other polysaccharides.

Suitable cellulose-based rheology-modifying agents include, for example, methylhydroxyethylcellulose, hydroxymethylethylcellulose, carboxymethylcellulose, methylcellulose, ethylcellulose, hydroxyethylcellulose, hydroxyethylpropylcellulose, etc. The entire range of possible permutations is enormous and shall not be listed here, but other cellulose materials which have the same or similar properties as these would also work well.

Suitable starch-based materials include, for example, amylopectin, amylose, seagel, starch acetates, starch hydroxyethylethers, ionic starches, long-chain alkylstarches, dextrins, amine starches, phosphates starches, and dialdehyde starches.

Other natural polysaccharide-based rheology-modifying agents include, for example, alginic acid, phycocolloids, agar, gum arabic, guar gum, locust bean gum, gum karaya, and gum tragacanth.

Suitable protein-based rheology-modifying agents include, for example, Zein® (a prolamine derived from corn), collagen (derivatives extracted from animal connective tissue such as gelatin and glue), and casein (the principle protein in cow's milk).

Finally, suitable synthetic organic plasticizers include, for example, polyvinyl pyrrolidone, polyethylene glycol, polyvinyl alcohol, polyvinylmethyl ether, polyacrylic acids, polyacrylic acid salts, polyvinyl acrylic acids, polyvinyl acrylic acid salts, polyacrylimides, ethylene oxide polymers, polylactic acid, and latex, which is a styrene-butadiene copolymer.

The rheology of polylactic acid is significantly modified by heat and could be used alone or in combination with any other of the foregoing rheology-modifying agents.

A currently preferred rheology-modifying agent is methylhydroxyethylcellulose, examples of which are Tylose® FL 15002 and Tylose® 4000, both of which are available from Hoechst Aktiengesellschaft of Frankfurt, Germany. Lower molecular weight rheology-modifying agents such as Tylose® 4000 can act to plasticize the mixture rather than thicken it, which helps during extrusion or rolling procedures.

More particularly, lower molecular weight rheology-modifying agents improve the internal flow of the hydraulically settable mixture during molding processes by lubricating the particles. This reduces the friction between the particles as well as between the mixture and the adjacent mold surfaces. Although a methylhydroxyethylcellulose rheology-modifying agent is preferred, almost any non-toxic rheology-modifying agent (including any listed above) which imparts the desired properties would be appropriate.

Another preferred rheology-modifying agent that can be used instead of, or in conjunction with, Tylose® is polyethylene glycol having a molecular weight of between 20,000 and 35,000. Polyethylene glycol works more as a lubricant and adds a smoother consistency to the mixture. For this reason, polyethylene glycol might be referred more precisely as a "plasticizer." In addition, it gives the molded hydraulically settable material a smoother surface. Finally, polyethylene glycol can create a coating around soluble components of the mixture and thereby render the hardened product less water soluble.

Finally, starch-based rheology-modifying agents are of particular interest within the scope of the present invention because of their comparatively low cost compared to cellulose-based rheology-modifying agents such as Tylose®. Although starches typically require heat and/or pressure in order to gelate, starches may by modified and prereacted so that they can gel at room temperature. The fact that starches, as well as many of the other rheology-modifying agents listed above, have a variety of solubilities, viscosities, and rheologies allows for the careful tailoring of the desired properties of a mix design so that it will conform to the particular manufacturing and performance criteria of a particular food or beverage container.

The rheology-modifying agent within the hydraulically settable materials of the present invention can be included in an amount up to about 50% by weight of the mixture. Generally, however, the preferable concentration is up to about 20%, with less than about 10% being more preferable.

D. Aggregates.

Aggregates common in the concrete industry may be used in the hydraulically settable mixtures of the present invention, except that they often must be more finely ground due to the size limitations imposed by the generally thin-walled structures of the present invention. The diameter of the aggregates used will most often be less than about 30% of the cross-section of the structural matrix of the container.

Aggregates may be added to increase the strength, decrease the costs by acting as a filler, decrease the weight, and/or increase the insulation ability of the resultant hydraulically settable materials. Aggregates, particularly plate-like aggregates, are also useful for creating a smooth surface finish.

Examples of useful aggregates include perlite, vermiculite, sand, gravel, rock, limestone, sandstone, glass beads, aerogels, xerogels, seagel, mica, clay, synthetic clay, alumina, silica, fly ash, silica fume, tabular alumina, kaolin, microspheres, hollow glass spheres, porous ceramic spheres, gypsum dihydrate, calcium carbonate, calcium aluminate, cork, seeds, lightweight polymers, xonotlite (a crystalline calcium silicate gel), lightweight expanded clays, unreacted cement particles, pumice, exfoliated rock, and other geologic materials.

Unreacted cement particles may also be considered to be "aggregates" in the broadest sense of the term. Even discarded hydraulically settable materials, such as discarded sheets, containers, or other objects of the present invention can be employed as aggregate fillers and strengtheners. It will be appreciated that the containers of the present invention can be effectively recycled.

Both clay and gypsum are particularly important aggregate materials because of their ready availability, extreme low cost, workability, ease of formation, and because they can also provide a degree of binding and strength if added in high enough amounts. Clay is a general term used to identify essentially all earths that form a paste with water and harden when dried. The predominant clays include silica and alumina (used for making pottery, tiles, brick, and pipes) and kaolinite. The kaolinic clays are anauxite, which has the chemical formula $Al_2O_3.SiO_2.H_2O$, and montmorilonite, which has the chemical formula $Al_2O_3.SiO_2.H_2O$. However, clays may contain a wide variety of other substances, such as iron oxide, titanium oxide, calcium oxide, calcium oxide, zirconium oxide, and pyrite.

In addition, although clays have been used for millennia and can obtain hardness even without being fired, such unfired clays are vulnerable to water degradation and exposure, are extremely brittle, and have low strength. Nevertheless, clay makes a good, inexpensive aggregate within the hydraulically settable structural matrix.

Similarly, gypsum hemihydrate is also hydratable and forms the dihydrate of calcium sulfate in the presence of water. Thus, gypsum may exhibit the characteristics of both an aggregate and a binder depending on whether (and the concentration of) the hemihydrate or dihydrate form is added to a hydraulically settable mixture.

Examples of aggregates which can add a lightweight characteristic to the cementitious mixture include perlite, vermiculite, glass beads, hollow glass spheres, calcium carbonate, synthetic materials (e.g., porous ceramic spheres, tabular alumina, etc.), cork, lightweight expanded clays, sand, gravel, rock, limestone, sandstone, pumice, and other geological materials.

In addition to conventional aggregates used in the cement industry, a wide variety of other aggregates, including fillers, strengtheners, metals and metal alloys (such as stainless steel, calcium aluminate, iron, copper, silver, and gold), balls or hollow spherical materials (such as glass, polymeric, and metals), filings, pellets, powders (such as microsilica), and fibers (such as graphite, silica, alumina, fiberglass, polymeric, organic fibers, and other such fibers typically used to prepare various types of composites), may be combined with the hydraulic cements within the scope of the present invention. Even materials such as seeds, starches, gelatins, and agar-type materials can be incorporated as aggregates in the present invention.

From the foregoing, it will be understood that the amount of a particular aggregate within a mixture will vary depending upon the desired performance criteria of a particular food or beverage container. There are many situations when little or no aggregate will be used. However, in most situations, the aggregate will be included in an amount of up to about 80% by weight of the green or wet hydraulic settable mixture.

In the products contemplated by the present invention where high insulation is desired, the amount of lightweight aggregate will usually be within the range from between about 3% to about 50% by weight, and most preferably, within the range from about 20% to about 35% by weight of the green mixture. Heavier weight aggregates will also be included in roughly the same amounts, albeit in lower quantities per unit of mass.

Further, it will be appreciated that for any given product, certain of these aggregates may be preferable while others may not be usable. For example, certain of the aggregates may contain harmful materials that, for some uses, could leach from the hydraulically settable mixture; nevertheless, most of the preferred materials are not only nontoxic under most uses in the food and beverage industry, but they are also more environmentally neutral than the components in existing disposable products.

Fibrous aggregates are used in the present invention primarily to modify the weight characteristics of the cementitious mixture, to add form stability to the mixture, and to add strength and flexibility to the resulting cementitious matrix, although certain fibers may also impart some level of insulation to the final product. Therefore, the term "aggregates" will refer to all other filler materials, which are nonfibrous, and whose function is mainly to impart strength, rheological, textural, and insulative properties to the materials.

It is often preferable, according to the present invention, to include a plurality of differently sized and graded aggregates capable of more completely filling the interstices between the aggregate and hydraulic binder particles. Optimizing the particle packing density reduces the amount of water necessary to obtain adequate workability by eliminating spaces which would otherwise be filled with interstitial water, often referred to as "capillary water." In addition, using less water increases the strength of the final hardened product (according to the Feret Equation).

In order to optimize the packing density, differently sized aggregates with particle sizes ranging from as small as about 0.5 μm to as large as about 2 mm may be used. (Of course, the desired purpose and thickness of the resulting product will dictate the appropriate particle sizes of the various aggregates to be used.) It is within the skill of one in the art to know generally the identity and sizes of the aggregates to be used in order to achieve the desired characteristics in the final hydraulically settable article or container.

In certain preferred embodiments of the present invention, it may be desirable to maximize the amount of the aggregates within the hydraulically settable mixture in order to maximize the properties and characteristics of the aggregates (such as qualities of strength, low density, or high insulation). The use of particle packing techniques may be employed within the hydraulically settable material in order to maximize the amount of the aggregates.

A detailed discussion of particle packing can be found in the following article coauthored by one of the inventors of the present invention: Johansen, V. & Andersen, P. J., "Particle Packing and Concrete Properties," *Materials Science of Concrete II* at 111–147, The American Ceramic Society (1991). Further information is available in the Doctoral Dissertation of Anderson, P. J., "Control and Monitoring of Concrete Production—A Study of Particle Packing and Rheology," The Danish Academy of Technical Sciences. The advantages of such packing of the aggregates can be further understood by reference to the examples which follow in which hollow glass spheres of varying sizes are mixed in order to maximize the amount of the glass balls in the hydraulically settable mixture.

In embodiments in which it is desirable to obtain a food or beverage container with high insulation capability, it may be preferable to incorporate into the hydraulically settable matrix a lightweight aggregate which has a low thermal conductivity, or "k-factor" (defined as W/m·K). The k-factor is roughly the reciprocal of the expression commonly used in the United States to describe the overall thermal resistance of a given material, or "R-factor," which is generally defined as having units of hr·ft$^2$°F./BTU. The term R-factor is most commonly used in the United States to describe the overall thermal resistance of a given material without regard to the thickness of the material. However, for purposes of comparison, it is common to normalize the R-factor to describe thermal resistance per inch of thickness of the material in question or hr·ft$^2$°F./BTU·in.

For purposes of this specification, the insulation ability of a given material will hereinafter be expressed only in terms of the IUPAC method of describing thermal conductivity, i.e., "k-factor." (The conversion of thermal resistance expressed in British units (hr·ft$^2$°F./BTU·in) to IUPAC units can be performed by multiplying the normalized number by 6.9335 and then taking the reciprocal of the product.) Generally, aggregates having a very low k-factor also contain large amounts of trapped interstitial space, air, mixtures of gases, or a partial vacuum which also tends to greatly reduce the strength of such aggregates. Therefore, concerns for insulation and strength tend to compete and should be carefully balanced when designing a particular mixed design.

The preferred insulating, lightweight aggregates include expanded or exfoliated vermiculite, perlite, calcined diatomaceous earth, and hollow glass spheres—all of which tend to contain large amounts of incorporated interstitial space. However, this list is in no way intended to be exhaustive, these aggregates being chosen because of their low cost and ready availability. Nevertheless, any aggregate with a low k-factor, which is able to impart sufficient insulation properties into the cementitious food container, is within the purview of the present invention.

E. Fibers.

As used in the specification and the appended claims, the terms "fibers" and "fibrous materials" include both inorganic fibers and organic fibers. Fibers are a particular kind of aggregate which may be added to the hydraulically settable mixture to increase the cohesion, elongation ability, deflection ability, toughness, fracture energy, flexural, tensile and, on occasion, compressive strengths of the resulting hydraulically settable material. Fibrous materials reduce the likelihood that the hydraulically settable container will shatter when a strong cross-sectional force is applied.

Fibers which may be incorporated into the structural matrix are preferably naturally occurring fibers, such as cellulosic fibers extracted from hemp, cotton, plant leaves, wood or stems, or fibers made from glass, silica, ceramic, or metal. Glass fibers are preferably pretreated to be alkali resistant.

Preferred fibers of choice include glass fibers, abaca, bagasse, wood fibers (both hard wood or soft wood, such as southern pine), and cotton. Recycled paper fibers can be used, but they are somewhat less desirable because of the fiber disruption that occurs during the original paper manufacturing process. Any equivalent fiber, however, which imparts strength and flexibility is also within the scope of the present invention. Abaca fibers are available from Isarog Inc. in the Philippines. Glass fibers, such as Cemfill® are available from Pilkington Corp. in England.

These fibers are preferably used in the present invention due to their low cost, high strength, and ready availability. Nevertheless, any equivalent fiber which imparts compressive and tensile strength, as well as toughness and flexibility (if needed), is certainly within the scope of the present invention. The only limiting criteria is that the fibers impart the desired properties without adversely reacting with the other constituents of the hydraulic material and without contaminating foodstuffs stored or dispensed in the containers containing such fibers.

The fibers used to make the food and beverage containers of the present invention preferably have a high length to width ratio (or "aspect ratio") because longer, narrower fibers can impart more strength to the structural matrix without significantly adding bulk and mass to the mixture. The fibers should have an aspect ratio of at least about 10:1, preferably at least about 100:1, and most preferably at least about 200:1.

Preferred fibers should also have a length that is several times the diameter of the hydraulic binder particles. Fibers having a length that is at least twice the length of the hydraulic binder particles will work; fibers having an average length that is at least 10 times the diameter of the hydraulic binder particles are preferred, with at least 100 times being more preferred, and even 1000 times being very useful.

The amount of fibers added to the hydraulically settable mixture matrix will vary depending upon the desired properties of the final product, with strength, toughness, flexibility, and cost being the principle criteria for determining the amount of fiber to be added in any mixed design. In most cases, fibers will be added in the amount within the range from about 0.2% to about 50% by volume of the hardened hydraulically settable mixture, more preferably within the range from about 1% to about 30% by volume, and most preferably within the range from about 5% to about 15% by volume.

It will be appreciated, however, that the strength of the fiber is a very important feature in determining the amount of the fiber to be used. The stronger the tensile strength of the fiber, the less the amount that must be used to obtain the same tensile strength in the resulting product. Of course, while some fibers have a high tensile strength, other types of fibers with a lower tensile strength may be more elastic. Hence, a combination of two or more fibers may be desirable in order to obtain a resulting product that maximizes multiple characteristics, such as high tensile strength and high elasticity.

It should be understood that the fibers used within the scope of the present invention differ from fibers typically employed in making paper or cardboard products, primarily in the way in which the fibers are processed. In the manufacture of paper, either a Kraft or a sulfite process is typically used to form the pulp sheet. In the Kraft process, the pulp fibers are "cooked" in a NaOH process to break up the fibers. In a sulfite process, acid is used in the fiber disintegration process.

In both of these processes, the fibers are first processed in order to release lignins locked within the fiber walls. However, in order to release the lignins from the fiber, some of the strength of the fiber is lost. Because the sulfite process is even more severe, the strength of the paper made by a sulfite process will generally have only about 70% of the strength of paper made by the Kraft process. (Hence, to the extent wood fibers are included, those processed using a Kraft process would be preferred.)

Once the wood has been made into wood pulp by either a Kraft or a sulfite process, it is further processed in a beater in order to further release lignins and hemicellulose within the fibers and also to fray the fibers. A slurry generally containing 99.5% water and 0.5% wood pulp is subjected to heavy beating in order to release enough hemicellulose and fray the fibers sufficiently to form a fibrous mixture that is essentially self-binding through an intertwining web effect between the fibers.

The fibers are essentially self-binding through a web effect of the frayed fiber ends and the adhesive ability of the released lignins and hemicellulose, as well as the hydrogen bonding between the fibers. Hence, "web physics" and hydrogen bonding govern the forces maintaining the integrity of the resultant paper or cardboard product. However, the cost of such harsh treatment is that the fibers develop major flaws along the entire length of the fiber, thereby resulting in a loss of much of their tensile, tear, and burst strengths.

In contrast, the fibers within the scope of the present invention undergo no such harsh treatment from the beater and, therefore, retain most of their initial strength. This is possible because they are bound together using a hydraulic binder. Hence, matrix to fiber adhesion rather than web physics forces are chiefly responsible for maintaining the integrity of the products of the present invention.

Consequently, far less fiber may be added to the hydraulically settable mixtures of the present invention while still deriving a high level of strength from the fibers. Employing less fiber while maintaining good strength properties allows a more economically produced sheet or container (as compared to paper) because (1) fiber is typically far more expensive than either the hydraulic binder or the aggregates, and (2) the capital investment for the processing equipment is much less.

It should also be understood that some fibers, such as southern pine and abaca, have high tear and burst strengths, while others, such as cotton, have lower strength but greater flexibility. In the case where both flexibility and high tear and burst strength is desired, a mixture of fibers having the various properties can be added to the mixture.

F. Dispersants.

The term "dispersant" is used herein to refer to the class of materials which can be added to reduce the viscosity and yield stress of the hydraulically settable mixture. A more detailed description of the use of dispersants may be found in the Master's Thesis of Andersen, P. J., "Effects of Organic Superplasticizing Admixtures and their Components on Zeta Potential and Related Properties of Cement Materials" (1987). For purposes of disclosure, the foregoing Master's Thesis is incorporated herein by specific reference.

Dispersants generally work by being adsorbed onto the surface of the hydraulic binder particles and/or into the near colloid double layer of the binder particles. This creates a negative charge on or around the surfaces of the particles, causing them to repel each other. This repulsion of the particles adds "lubrication" by reducing the friction or attractive forces that would otherwise cause the particles to have greater interaction. Hence, less water can be added initially while maintaining the workability of the hydraulically settable mixture.

Greatly reducing the viscosity and yield stress may be desirable where plastic-like properties, cohesiveness, and/or form stability are less important. Adding a dispersant aids in keeping the hydraulically settable mixture workable even when very little water is added, particularly where there is a "deficiency" of water. Hence, adding a dispersant allows for an even greater deficiency of water, although the molded sheet or container may have somewhat less form stability if too much dispersant is used. Nevertheless, including less water initially will theoretically yield a stronger final cured product according to the Feret Equation.

Whether or not there is a deficiency of water is both a function of the stoichiometric amount of water required to hydrate the binder and the amount of water to occupy the interstices between the particles in the hydraulically settable mixture, including the hydraulic binder particles themselves, the particles within the aggregate material, and/or the fibrous material. As stated above, particle packing reduces the volume of the interstices between the hydraulic binder and aggregate particles and, therefore, the amount of water necessary to fully hydrate the binder and maintain the workability of the hydraulically settable mixture by filling the interstitial space.

However, due to the nature of the coating mechanism of the dispersant, the order in which the dispersant is added to the mixture is often critical. If a flocculating/gelating agent such as Tylose® is added, the dispersant must be added first and the flocculating agents second. Otherwise, the dispersant will not be able to become adsorbed on the surface of the hydraulic binder particles, as the Tylose® will be irreversibly adsorbed to form a protective colloid on the surface, thereby preventing the dispersant from being adsorbed.

A preferred dispersant is sulfonated naphthalene-formaldehyde condensate, an example of which is WRDA 19, which is available from W. R. Grace, Inc., located in Baltimore. Other dispersants which would work well include sulfonated melamine-formaldehyde condensate, lignosulfonate, and polyacrylic acid.

The amount of added dispersant will generally range up to about 5% by weight of the hydraulic binder, more preferably within the range of between about 0.2% to about 4%, and most preferably within a range of between about 0.5% to about 2%. However, it is important not to include too much dispersant, as it tends to retard the hydration reactions between, e.g., hydraulic cement and water. Adding too much dispersant can, in fact, prevent hydration, thereby destroying the binding ability of the cement paste altogether.

The dispersants contemplated within the present invention have sometimes been referred to in the concrete industry as "superplasticizers." In order to better distinguish dispersants from rheology-modifying agents, which often act as plasticizers, the term "superplasticizer" will not be used in this specification.

G. Air Voids.

Where insulation, not strength, is the overriding factor (i.e., whether it is desired to insulate hot or cold materials), it may be desirable to incorporate tiny air voids within the hydraulically settable structural matrix of the containers in addition to, or in place of, lightweight aggregates in order to increase the container's insulating properties. The incorporation of air voids into the cementitious mixture is carefully calculated to impart the requisite insulation characteristics without degrading the strength of the container to the point of nonutility. Generally, however, if insulation is not an important feature of a particular product, it is desirable to minimize any air voids in order to maximize strength and minimize volume.

In certain embodiments, nonagglomerated air voids may be introduced by high shear, high speed mixing of the hydraulically settable mixture, with a foaming or stabilizing agent added to the mixture to aid in the incorporation of air voids. The high shear, high energy mixers discussed above are particularly useful in achieving this desired goal. Suitable foaming and air entraining agents include commonly used surfactants. One currently preferred surfactant is a polypeptide alkylene polyol, such as Mearlcrete® Foam Liquid.

In conjunction with the surfactant, it will be necessary to stabilize the entrained air within the material using a stabilizing agent like Mearlcel 3532®, a synthetic liquid anionic biodegradable solution. Both Mearlcrete® and Mearlcel® are available from the Mearl Corporation in New Jersey. Another foaming and air-entraining agent is vinsol resin. In addition, the rheology-modifying agent can act to stabilize the entrained air. Different air-entraining agents and stabilizing agents impart different degrees of foam stability to the hydraulically settable mixture, and they should be chosen in order to impart the properties that are best suited for a particular manufacturing process.

During the entrainment of air, the atmosphere above the high speed mixer can be saturated with a gas such as carbon dioxide, which has been found to cause an early false setting and create form and foam stability of the hydraulically settable mixture. The early false setting and foam stability is thought to result from the reaction of $CO_2$ and hydroxide ions within the hydraulically settable mixture to form soluble sodium and potassium carbonate ions, which in turn can interact with the aluminate phases in the cement and accelerate the setting of the mixture.

Foam stability helps maintain the dispersion, and prevents the agglomeration, of the air voids within the uncured hydraulically settable mixture. Failure to prevent the coalescence of the air voids actually decreases the insulation effect, and it also greatly decreases the strength of the cured hydraulically settable mixture. Raising the pH, increasing the concentration of soluble alkali metals such as sodium or potassium, adding a stabilizing agent such as a polysaccharide rheology-modifying agent, and carefully adjusting the concentrations of surfactant and water within the hydraulically settable mixture all help to increase the foam stability of the mixture.

During the process of molding and/or hardening the hydraulically settable mixture, it is often desirable to heat up the hydraulically settable mixture in order to increase the volume of the air void system. Heating also aids in rapidly removing significant amounts of the water from the hydraulically settable mixture, thereby increasing the green strength of the molded product.

If a gas has been incorporated into the hydraulically settable mixture, heating the mixture to 250° C., for example, will result (according to the ideal gas equation) in the gas increasing its volume by about 85%. When heating is appropriate, it has been found desirable for the heating to be within a range from about 100° C. to about 250° C. More importantly, if properly controlled, heating will not result in the cracking of the structural matrix of the container or yield imperfections in the surface texture of the container.

In other applications, where viscosity of the hydraulically settable mixture is high, such as is required in certain molding processes, it is much more difficult to obtain adequate numbers of air voids through high shear mixing. In this case, air voids may alternatively be introduced into the hydraulically settable mixture by adding an easily oxidized metal, such as aluminum, magnesium, zinc, or tin into a hydraulic mixture that is either naturally alkaline (such as a hydraulic cement or calcium oxide containing mixture) or one that has been made alkaline (such as those containing gypsum or another alkaline hydraulic binder).

This reaction results in the evolution of tiny hydrogen bubbles throughout the hydraulically settable mixture. Adding a base such as sodium hydroxide to, and/or heating (as described below), the hydraulically settable mixture increases the rate of hydrogen bubble generation.

It may further be desirable to heat the mixture in order to initiate the chemical reaction and increase the rate of formation of hydrogen bubbles. It has been found that heating the molded product to temperatures in the range of from about 50° C. to about 100° C., and preferably from about 75° C. to about 85° C., effectively controls the reaction and also drives off a significant amount of the water. Again, this heating process does not result in the introduction of cracks into the matrix of the molded product. This second method of introducing air voids into the structural matrix can be used in conjunction with, or in place of, the introduction of air through high speed, high shear mixing in the case of low viscosity hydraulic mixtures used in some molding processes.

Finally, air voids may be introduced into the hydraulically settable mixture during the molding process by adding a blowing agent to the mixture, which will expand when heat is added to the mixture. Blowing agents typically consist of a low boiling point liquid and finely divided calcium carbonate (talc). The talc and blowing agent are uniformly mixed into the hydraulically settable mixture and kept under pressure while heated. The liquid blowing agent penetrates into the pores of the individual talc particles, which act as points from which the blowing agent can then be vaporized upon thermal expansion of the blowing agent as the pressure is suddenly reduced.

During the molding or extrusion process, the mixture is heated while at the same time it is compressed. While the heat would normally cause the blowing agent to vaporize, the increase in pressure prevents the agent from vaporizing, thereby temporarily creating an equilibrium. When the pressure is released after the molding or extrusion of the material, the blowing agent vaporizes, thereby expanding or "blowing" the hydraulically settable material. The hydraulically settable material eventually hardens with very finely dispersed voids throughout the structural matrix. Water can also act as a blowing agent as long as the mixture is heated above the boiling point of water and kept under pressure of up to 50 bars.

Air voids increase the insulative properties of the hydraulically settable containers and also greatly decrease the bulk density and, hence, the weight of the final product. This reduces the overall mass of the resultant product, which reduces the amount of material that is required for the manufacture of the containers and which reduces the amount of material that will ultimately be discarded in the case of disposable containers.

It has also been discovered that, after the cementitious container has solidified, many of the compositional designs of the present invention result in a matrix that is slightly permeable, especially to tiny hydrogen gas molecules, which can diffuse out of the structural matrix. This breatheability factor is highly desirable of certain types of food containers, such as the "clam-shell" containers used in the fast food industry, so that bread products do not become soggy.

H. Set Accelerators.

In some cases it may be desirable to accelerate the initial set of the hydraulically settable mixture by adding to the mixture an appropriate set accelerator. These include $Na_2CO_3$, $KCO_3$, KOH, NaOH, $CaCl_2$, $CO_2$, triethanolamine, aluminates, and the inorganic alkali salts of strong acids, such as HCl, $HNO_3$, and $H_2SO_4$. In fact, any compound which increases the solubility of gypsum and calcium hydroxide will tend to accelerate the initial set of hydraulically settable mixtures, particularly cementitious mixtures.

The amount of set accelerator which may be added to a particular hydraulically settable mixture will depend upon the degree of set acceleration that is desired. This in turn will depend on a variety of factors, including the mix design, the time interval between the steps of mixing the components and molding the hydraulically settable mixture, the temperature of the mixture, and the identity of the accelerator. One of ordinary skill in the art will be able to adjust the amount of added set accelerator according to the parameters of a particular manufacturing process in order to optimize the setting time of the hydraulically settable mixture.

I. Coatings.

Each of the component materials within the containers is essentially harmless to humans and animals. However, it is within the scope of the present invention to coat the hydraulically settable food and beverage containers with sealing materials and other protective coatings. One such coating is calcium carbonate, which also allows the printing of indicia on the surface of the containers. Other coatings which might be appropriate include hydroxypropylmethylcellulose, polyethylene glycol, kaolin clay, acrylics, polyacrylates, polyurethanes, melamines, polyethylene, polylactic acid, synthetic polymers, and waxes (such as beeswax or petroleum based wax).

In some cases, it may be preferable for the coating to be elastomeric, deformable, or waterproof. Some coatings may also be used to strengthen places where the hydraulically settable material may be severely bent, such as the hinge of a box or "clam-shell" container. In such cases, a pliable, possibly elastomeric, coating may be preferred. Besides these coatings, any FDA approved coating material would work depending on the application involved.

For example, an FDA-approved coating comprised of sodium silicate, which is acid resistant, is a particularly useful coating. Resistance to acidity is important, for example, where the container is exposed to foods or drinks having a high acid content, such as soft drinks or juices. Where it is desirable to protect the container from basic substances, the containers can be coated with an appropriate polymer or wax, such as are used to coat paper containers.

In some applications, such as in the case of warm, moist food, it is important that the coating allow the container to "breathe," or be permeable to water molecules, while still maintaining its ability to keep the steamy food product fairly insulated. In other words, in a "breathable" container, water cannot pass through the wall of the container, but water vapor can. Such a breatheability feature is important when serving certain food products, such as burgers, so that the bun does not become soggy.

Another type of coating that may be placed on the surface of the containers of the present invention is a reflective coating for reflecting heat into or out of the container. Such reflective coatings are well known in the art, although their applicability to hydraulically settable containers is novel.

II. Specific Applications of the Materials into Containers.

The key structural component which gives strength to the food or beverage containers of the present invention is the hydraulically settable structural matrix. Within the basic matrix formed by the reaction products of the hydraulic binder and water are incorporated other components (such as fibers, aggregates, air voids, rheology-modifying agents, dispersants, and even accelerants), which add additional characteristics and properties including strength properties.

A. Purposes of the Components within Hydraulically Settable Mixtures.

As discussed above, fibers are added to impart particular tensile strength and toughness to the hydraulically settable container; sometimes, the fibers can contribute to the insulating capabilities of the article of manufacture. In the case of insulating and/or lightweight containers, aggregates are employed to increase the insulation ability and decrease the bulk specific gravity of the hydraulically settable containers. In addition, discontinuous, finely dispersed air voids can be mechanically or chemically introduced into the hydraulically settable mixture to assist or take the place of lightweight aggregates.

In the case where low weight and high insulation are less important, or where a dense product having greater compressive strength is specifically desired, heavier weight (and less expensive) aggregates, such as finely ground sand or limestone, can be added to increase the bulk and decrease the cost of the hydraulically settable material. As discussed elsewhere, the choice of the aggregate can be very important to determining the surface finish and texture of the resultant product. Smooth glossy finishes can be obtained by adding "plate-like" aggregates (such as mica), while rougher textures can be obtained with coarser sand.

Because this invention is directed toward containers which are intended to come into contact with foodstuffs, the materials within the containers must not contain, or impart into the food or beverages therein, any hazardous substances. The typical hydraulic binders, aggregate material, and fibers used in the present invention meet this requirement. The preferred hydraulic cements that can be used herein contain differing quantities of the following compounds before hydration: CaO, $SiO_2$, $Al_2O_3$, $Fe_2O_3$, MgO, and $SO_3$. Upon hydration, these react to form very stable, rocklike compounds, which are essentially harmless to humans and animals.

In particular, upon hydration these substances are tightly bound in crystalline phases, which are largely water insoluble. Such crystalline phases have been classified as follows:

alite: tricalcium silicate (3CaO.SiO$_2$ or C$_3$S)

belite: dicalcium silicate (2CaO.SiO$_2$ or C$_2$S)

celite: tricalcium aluminate (3CaO. Al$_2$O$_3$ or C$_3$A) and tetracalcium aluminum ferrate (4CaO.Al$_2$O3.Fe$_2$O$_2$ or C$_4$AF)

These calcium silicates are only slightly water soluble over time.

The fibers used herein are preferably natural organic fibers derived from plant material, but they may also be inert inorganic fibers such as glass fibers. Either type of fiber is harmless to humans and animals.

The aggregates are preferably small, lightweight rock-like substances; in many cases, these materials will preferably contain a high percentage of air voids, which may occur naturally or be imparted into the material by known processing techniques. Like hydrated cement, these aggregates in the specific parameters of this application are also inert, very stable, unreactive, and harmless to humans and animals.

The size of the aggregates may be controlled in order to optimize the particle packing density in order to maximize the desirable properties and characteristics of the aggregates with the hydraulically settable mixture. Simply stated, particle packing techniques maximize the amount of the aggregates within the matrix and minimize the space (and hence the discontinuities) between the aggregates. This allows for greater workability with the addition of less water, which ultimately results in an easier, faster, and, thus, less expensive drying process, as well as a stronger hardened structural matrix within the food or beverage container.

The discontinuous voids which are chemically introduced into the structural matrix are most likely to be filled with air after the hydrogen diffuses out of the matrix. (As taught elsewhere, other similarly safe gases can be used in the manufacturing process.) Contrast this with polystyrene foam containers, wherein the air pockets within the formed matrix might contain harmful CFCs or other gaseous blowing agents involved in the manufacture of polystyrene. Likewise, bleached paper products may be impregnated with tiny quantities of dioxin, as discussed above.

The hydraulically settable containers within the scope of the present invention can be characterized as being lightweight, yet retaining sufficient strength for the desired purpose. Preferably, foam-like compositions of the present invention will have a bulk density of less about 0.7 g/cm$^3$, clay-like compositions less than about 0.7 g/cm$^3$, and sheet-like compositions less than about 1.2 g/cm$^3$.

Typically, the hydraulically settable containers will have a tensile strength to bulk density ratio in the range from about 1 MPa.cm$^3$/g to about 300 MPa.cm$^3$/g. In the preferred embodiments, the tensile strength to bulk density ratio will usually be in the range from about 2 MPa.cm$^3$/g to about 60 MPa.cm$^3$/g, with the more preferred range being from about 3 MPa-cm$^3$/g to about 30 MPa.cm$^3$/g.

A significant advantage of the hydraulically settable containers according to the present invention is that they do not require, or result in, the emission of dioxin or ozone-depleting chemicals. In addition, if discarded into the earth, they do not persist in the environment as containers or objects as foreign materials which must biodegrade (often over a number of years or decades) before they become environmentally innocuous. Instead, the waste hydraulically settable container is essentially composed of the same materials already found in the earth. Under the weight and pressure of typical landfills, such cups and containers will crumble and break down into an environmentally neutral granular powder that is compatible with the dirt and rock already found in the landfill. If such containers are discarded onto the ground, they will quickly decompose into an essentially dirt-like granular powder when exposed to water or other forces of nature.

Furthermore, the hydraulically settable cups and containers are fully recyclable with a minimum amount of energy and effort. Unlike paper or plastic products, which require a substantial amount of processing in order to restore them to a suitable state as raw starting materials, hydraulically settable containers can be ground-up and recycled by merely reincorporating the grindings into new containers or other cementitious materials as an aggregate component within a virgin hydraulic paste.

Tylose® and some of the other rheology-modifying agents help to increase the yield stress, and hence the workability, of the hydraulically settable mixture. Tylose® has also been shown to increase the flexibility and tensile strength (if added in large enough amounts) of the final hardened container. Lower molecular weight rheology-modifying agents can lubricate the aggregate and binder particles, as well as the adjacent mold surfaces, thereby increasing the moldability of the mixture.

This quality of containing both a hydraulic binder and an aggregate is a further departure from prior art containers, which are typically comprised of a uniform material such as polystyrene, paper, or metal, wherein impurities will impede their ability to be recycled. In contrast, impurities such as napkins, straw papers, or food residues (which are all basically cellulose sources) do not impede the full recyclability of the hydraulically settable food and beverage containers of the present invention.

B. The Processing Techniques and Conditions.

For purposes of simplicity, the term "molding," as used in this specification and the appended claims, is intended to include the variety of molding, casting, and extrusion processes discussed herein or that are well known in the art with respect to materials such as clays, ceramics, and plastics, as well as the process of releasing (or "demolding") the hydraulically settable product from the mold. The term "molding" also includes the additional processes that might occur while the hydraulically settable mixture is in the mold, e.g., heating the hydraulically settable mixture, the reaction of the hydraulic mixture with aluminum or other metals to release gas bubbles which are incorporated with the hydraulically settable mixture, and the expansion of the volume of the hydraulically settable mixture in the mold.

In order for the hydraulically settable mixtures of the present invention to be effectively molded, it is important that the hydraulically settable composition be form stable in the green state; that is to say, the molded product must rapidly be able to support its own weight. Further, it must harden sufficiently that it can be quickly ejected from the mold. Otherwise, the cost of molding may make the process uneconomical.

The molding operation during which form stability is achieved needs to occur in less than one minute for a typical product to be economically mass producible. Preferably, such form stability will occur in less than 10 seconds, and most preferably in less than 1–3 seconds.

In addition, the surface of the molded cementitious article cannot be too sticky, as that would make the demolding process impossible and make it difficult to handle and stack the molded articles.

The combination of hydraulic binders, aggregates, fibers, and (optionally) air voids results in a composition that can be formed into relatively thin sheets having roughly the same thickness as conventional cups and containers made from paper or polystyrene. The compositions can readily be molded or processed into a variety of shapes, including cups, containers, plates, platters, trays, "clam-shell" cartons, boxes, straws, lids, utensils, and similar products.

The resulting hydraulically settable containers also have low bulk density (often the bulk specific gravity is less than about 1 g/cc), resulting in a lightweight product which is comparable to conventional disposable cups and containers made of polystyrene and paper.

In order for the material to exhibit the best properties of high tensile strength, toughness, and insulation, the fibers can be unidirectionally or bidirectionally aligned or stacked according to the present invention, instead of being randomly dispersed, throughout the structural matrix. It is often preferable for the fibers to be laid out in a plane that is parallel to either of the two surfaces of the hydraulically settable sheet or container wall.

Such alignment of fibers can be achieved by any number of molding techniques, such as by jiggering, ram-pressing, pull-trusion, hot pressing, extrusion, or calendering the hydraulically settable mixture. Generally, the fibers are oriented in the direction of the flow of material during the molding process. By controlling the flow patterns of the material during the molding process, it is possible to build a container having the desired fiber orientation.

These processes also result in near zero porosity in terms of relatively large, continuous and unwanted air pockets which usually occur during normal concrete manufacture. This greatly increases the compressive and tensile strengths of the hydraulically settable material and reduces the tendency of the matrix to split or tear when the container is exposed to external mechanical forces.

The undesirable discontinuities and voids in typical cementitious products should not be confused with the finely dispersed micro-pockets of air (or other gas) that may be intentionally introduced into the hydraulically settable structural matrix by the direct introduction of gas, the use of a high shear mixer, or the addition of reactive metals. Undesired voids or discontinuities are large and randomly dispersed, and offer little in terms of added insulative properties, while at the same time greatly reducing the integrity of the structural matrix and reducing its strength characteristics.

In contrast, the intentionally introduced gas bubbles or voids are generally uniformly and finely dispersed throughout the hydraulically settable mixture and are able to insulate while allowing sufficient strength of the material for use in making food or beverage containers.

It is generally possible to obtain acceptable levels of insulation while increasing the strength of the container by using lightweight aggregates which contain air voids. This allows for a stronger, more continuous hydraulically settable binder matrix holding the particles together.

Those cups and other containers incorporating a significant amount of finely dispersed gas bubbles or voids exhibit insulating properties similar to those of polystyrene cups and containers, and yet have sufficient compressive, tensile, and flexural strengths that they will not break when dropped onto a marble surface from heights as high as two or more meters. This would not be expected, since concrete in thin cross-sections is usually very weak and brittle with extremely low flexural strength and elasticity.

Hydraulically settable containers made according to the present invention have been shown to provide sufficient insulation for hot drinks (at least about 45° C., preferably at least about 65° C., and most preferably at least about 80° C.) and food products (at least about 25° C.) over the time period typically used in the dispensing of such food and beverages in the fast food industry. In addition, the materials have demonstrated the ability to keep foods (including even ice cream or other frozen products) and beverages cold (below about 15° C. and even below about 0° C. for some food products) for the time necessary for consumption.

By altering the quantities of cement, water, aggregates, fibers, and rheology-modifying plasticizing agents, it is possible to control the rheology, or flow property, of the hydraulic paste. For example, when ram-pressing, jiggering or injection molding is used, it may often be preferable to start with a relatively highly viscous hydraulically settable mixture which will be highly form stable in the green state; the resulting molded product will then maintain its shape after being formed, even before being dried or hardened.

When extrusion, calendering, pull-trusion, or hot pressing is used, the hydraulically settable mixture is preferably less viscous and has a lower yield stress so that it will be more workable and flow easier. Because containers formed by these methods will usually be heated during formation in order to remove much of the water in order to achieve a drier, more form stable product, it will not be necessary for the hydraulically settable mixture to have as high a yield stress or initial form stability as in other molding processes.

Nevertheless, even these less viscous hydraulically settable mixtures are able to achieve rapid form stability when heated, making the manufacturing processes using them commercially acceptable and capable of mass producing the products. This is important because the longer the product remains in the mold, the higher the cost of manufacturing in most cases.

Whether a more or less viscous hydraulic paste is required, it is generally desirable to include as little water as is necessary to impart the requisite rheology for a particular molding process. One reason for minimizing the water is to control the capillary action of the water in the hydraulically settable mixture, as this may cause stickiness of the hydraulically settable mixture, which in turn can cause problems in demolding the mixture from the mold. Minimizing the amount of water eliminates the free water and reduces the chemical and mechanical adherence of the material to the mold. Hence, the capillary action and related surface tension of the water should be minimized, if possible, in order for there to be quick release of the hydraulically settable mixture during the molding process.

Furthermore, the resulting hydraulically settable products are stronger if less water is used. Of course, adding more water initially will require that more water be removed from the hydraulic mixture during the drying or hardening process, thereby increasing manufacturing costs.

In order to obtain a hydraulically settable mixture having the appropriate properties of workability and green strength, it is important to adjust the water content in combination with the use of a rheology-modifying agent and, optionally, a dispersant within the hydraulically settable mixture. As discussed above, there are a variety of suitable theology-modifying agents.

The rheology-modifying agent increases the yield stress and makes the mixture more plastic, so that it can be deformed and molded and then maintain its shape upon release of the molding pressure. This allows the molded product to withstand forces such as gravitational forces (that is, it can support its own weight without external support) as well as forces involved in demolding the product and subsequent handling of the container before it has become substantially hardened.

There are several modifications to conventional molding processes which are preferably employed in order to ease the manufacturing process. For example, it is frequently desirable to treat the mold with a releasing agent in order to prevent sticking. Suitable releasing agents include silicon oil, Teflon®, Deleron®, and UHW®. Preferably, the mold itself will be made of stainless steel and/or coated with a material having a very slick finish, such as Teflon®, Deleron®, or chrome plating polished to about 0.1 RMS.

The same effect can be achieved from the use of frictional forces. By spinning the head of the molding apparatus against the interior and/or exterior surfaces of the cementitious material, any chemical and mechanical adherence (i.e., stickiness) to the mold can be overcome.

During the process of molding and/or curing the cementitious mixture, it is often desirable to heat up the cementitious mixture in order to control the air void system by allowing for proper control of the porosity and the volume in the container. However, this heating process also aids in making the cementitious mixture form stable in the green state (immediately after molding) by allowing the surface to gain strength quickly. Of course, this heating aids in rapidly removing significant amounts of the water from the cementitious mixture. The result of these advantages is that the use of the heating process can ease the manufacturing of the cementitious food and beverage containers.

If a gas has been incorporated into the cementitious mixture, heating that mixture to 250° C. will result (according to the gas-volume equation) in the gas increasing its volume by about 85%. When heating is appropriate, it has been found desirable for that heating to be in the range from about 100° C. to about 250° C. More importantly, when properly controlled, heating will not result in the formation of cracks within the structural matrix of the container or imperfections in the surface texture of the container.

In fact, the process of adding $CO_2$ gas to the cementitious mixture during the molding process can help the molded product to quickly gain stability. For the foregoing disclosure, it will be apparent that this can be accomplished by the addition of a $CO_2$ gas or $CO_2$ generating material, such as an easily oxidized metal like zinc or aluminum, wherein the $CO_2$ generating process can be accelerated by the addition of a base and/or heat.

1. The Mixing Process.

While a variety of possible molding approaches can be used in the manufacturing of the containers of the present invention, as discussed above, there are currently three preferable methods: "direct molding," "wet sheet molding," and "dry sheet molding." While the composition of the hydraulically settable mixture will vary in the different molding processes, the mixing process will be substantially the same. Of course, different equipment will be used to conveniently provide feed stock to the molding equipment.

In order to prepare a desired hydraulically settable mixture, the fiber, water, rheology-modifying agent, and other additives are preferably blended together in a high shear mixer in order to form a well-dispersed, homogeneous mixture. High shear mixing is used for the addition of fibrous material to insure that the fibers are well dispersed throughout the mixture. This results in a more uniformly blended mixture, which improves the consistency of the green mixture and increases the strength of the final hardened product. It may also be preferable to add the hydraulic binder, as well as certain lower concentration aggregates such as mica, during the high shear mixing step in order to obtain a homogenous mixture in the shortest possible time.

The addition of fibrous materials by normal cement mixing techniques usually results in the conglomeration of the fibers, leading to deformities in the resulting sheets or articles. Standard mixers, such as drum mixers, combine the components of the desired mixture by applying low energy stirring or rotating to the components. In contrast, high shear mixers are capable of rapidly blending the mixture so as to apply high shearing forces on the particles within the hydraulically settable materials and the added fibrous materials.

As a result, the fibers and particles are uniformly dispersed throughout the mixture, thereby creating a more homogenous structural matrix within the hardened sheets. Fine particulate aggregates of relative high strength (such as sand, silica, or alumina) can also be blended using a high speed mixer, although not if included in such high concentrations to cause the hydraulic mixture to have a relatively low water content and high viscosity.

Thereafter, aggregates included in higher concentrations (and sometimes the hydraulic binder) are blended into the mixture using a low shear mixer. This is particularly true where lightweight aggregates are added which cannot withstand high shear conditions without breaking, such as perlite or hollow glass spheres. It is preferable that the size of the aggregates not exceed about 30% of the final thickness of the sheet, since oversized aggregates could damage the rollers and create flaws within the sheet surface.

Whether or not the hydraulic binder is added during the steps of high or low shear mixing depends on the nature of the hydraulic binder, as well as how the mixture is handled. It is believed that high shear mixing of the hydraulic cement after the formation of a particulate hydrosol gel can disrupt the gel and result in a final hardened product having dramatically lower compressive and tensile strengths.

In alternative embodiments, other additives, such as air-entraining agents and reactive metals, can be incorporated into the mixture in order to obtain a final material with lower density and higher insulating ability.

In a typical mixing process in the laboratory, the appropriate components are blended using a high shear, high speed mixer for about 1 minute. Thereafter, the remaining components are blended into the mixture using a low shear, low speed mixer for about 5 minutes. The total mixing time per batch of material is therefore about 6 minutes, although this may be varied depending upon the nature of the hydraulically settable mixture. Industrially, this mixing process can be substantially shortened by the use of appropriate mixers; specifically, the currently preferred method of mixing being a continuous mixing system.

In one embodiment, a cement mixer capable of both high and low shear mixing is used to meter and mix the materials in a batch mode. This mixer can handle up to 350 l of material per batch and, assuming a 6 minute mix cycle, is capable of producing 2,000 kg of a hydraulically settable mixture per hour, assuming 0.5 $g/cm^3$ per cubic foot.

In an alternative embodiment, high speed, high shear mixers described in U.S. Pat. No. 4,225,247 entitled "Mixing and Agitating Device" and U.S. Pat. No. 4,552,463 entitled "Methods and Apparatus for Producing a Colloidal Mixture" can be used for mixing the hydraulically settable mixture. Thereafter, the mixture can be transferred to a low speed, low shear mixer in order to complete the mixing process. The mixing step may also be combined with the extrusion step (discussed below) using modern extrusion equipment that includes a high shear mixing chamber.

The currently preferred embodiment for the industrial setting is equipment in which the materials incorporated into the hydraulically settable mixture are automatically and continuously metered, mixed, deaired, and extruded by a twin auger extruder apparatus. A twin auger extruder apparatus has sections with specific purposes such as low shear mixing, high shear mixing, vacuuming, and pumping. A twin auger extruder apparatus has different flight pitches and orientations which permits the sections to accomplish their specific purposes.

It is also possible to premix some of the components in a vessel, as needed, and pump the premixed components into the twin auger extruder apparatus. The preferable twin auger extruder apparatus utilizes uniform rotational augers wherein the augers rotate in the same direction. Counter-rotational twin auger extruders, wherein the augers rotate in opposite directions, accomplish the same purposes. A pugmill may also be utilized for the same purposes. Equipment meeting these specifications are available from Buhler-Miag, Inc., located in Minneapolis, Minn.

The internal components of the mixer can be made of stainless steel because the abrasion to the mixer is not great due to the relatively high water content. However, the mixer components can be carbide coated for extended life, thereby resisting any abrasion and the strongly basic conditions expected from a mixture containing aggregates and a hydraulic binder.

The various component materials that will be combined within the hydraulically settable mixtures of the present invention are readily available and may be purchased inexpensively in bulk quantities. They may be shipped and stored in bags, bins, or train cars, and later moved or unloaded using conventional means known in the art. In addition, the materials can be stored in large storage silos and then withdrawn and transported by means of conveyors to the mixing site.

As previously discussed, the hydraulically settable mixture is microstructurally engineered to have certain desired properties. Consequently, it is important to accurately meter the amount of material that is added during any batch or continuous mixing of the components.

2. The "Direct Molding" Process.

(a) Positioning.

After the hydraulically settable mixture has been prepared as discussed above, the next step in the "direct molding" process is positioning the cementitious mixture between a set of dies for subsequent shaping of the cementitious container. The dies comprise a male die having a desired shape and a female die having a shape substantially complementary to that of the male die. Accordingly, as the cementitious mixture is pressed between the dies, the cementitious mixture is formed into a container having the complementary shape of the dies.

The present invention envisions two general methods for positioning the cementitious mixture between the male die and the female die. In the preferred embodiment, the male die is partially inserted into the female die such that a gap distance is created between the dies. The "gap distance" is defined as the distance one die must travel with respect to the other die for mating of the dies. The dies are "mated" when they are inserted into one another so as to form a mold area between the dies. The "mold area" defines the desired shape of the container and is the area that the cementitious mixture is pushed into when the dies are mated.

When the dies are positioned so as to have a gap distance, a cavity remains between the dies. This "cavity" comprises the mold area between the dies, and a second area also between the dies which corresponds to the gap distance. Once the cavity is formed, the cementitious mixture can be positioned into the cavity, and thus between the dies, by being injected through a hole in one of the dies or through the gap distance.

In the preferred embodiment, the female die is positioned vertically above the male die. The cementitious mixture is then injected between the dies through an injection port extending through the female die. The arrangement of having the female die above the male die is preferred, since after the forming of the cementitious container, the dies are separated, and the force of gravity assists in insuring that the cementitious container remains on the male die. This is beneficial as it is easier to subsequently remove the container from the male die without deforming the container.

Before positioning the cementitious mixture, it is preferable to minimize the gap distance between the dies so as to limit the movement of the cementitious mixture during the final pressing or mating of the dies. Minimizing the movement of the mixture decreases the chance of irregularities in the final container as a result of differential flow in the cementitious mixture.

The gap distance between the male die and the female die is typically in a range of about 2 mm to about 5.0 cm, with 2 mm to about 3 cm being preferred, and 2 mm to about 1 cm being most preferred. It should be noted, however, that for unusually large objects, the gap distance may be much larger to facilitate positioning of the cementitious mixture.

In an alternative embodiment, a vacuum auger is used to inject or feed the cementitious mixture between the dies. The vacuum auger applies a negative pressure to the cementitious mixture as the mixture is being transferred for positioning. This negative pressure removes air trapped in the cementitious mixture. Failure to remove such air (unless the air is desired to create voids to impart insulative characteristics) can result in the container having a defective or nonhomogeneous structure matrix.

The second method for positioning the cementitious mixture between the dies is performed while the dies are still fully separated. This method comprises forming a portion of the cementitious material into a mass, the portion being sufficient to create the container, then placing the mass between the dies, typically by resting the mass on the top of the male die. Subsequently, as the dies are mated, the mass is pressed between the dies.

In an alternative embodiment, a template is used to position the cementitious mass. In this embodiment, the male die has a base with a circumference, and the template has a passage with a perimeter substantially complimentary to the circumference of the base of the male die.

This method comprises forming a portion of the cementitious mixture into a mass having a diameter sufficiently large to span the passage of the template. The mass is then placed on the template so as to span the passage. Finally, the template is placed between the male die and the female die such that the passage is complementarily aligned with the dies. Thereby, as the dies are pressed together, the male die travels through the passage of the template in order to press the cementitious mixture between the dies.

The above method can further include the step of depositing the template onto the male die, such that the template becomes positioned about the base of the male dies while the mass independently rests on the male die. Subsequently, as the dies are pressed together, the mass is again pressed between the dies. Additional benefits relating to the use of the template will be discussed hereinafter with respect to the step relating to removing the container from the dies.

(b) Forming and Molding.

The next step in the manufacturing process is pressing the cementitious mixture between the male die and the female die in order to mold the cementitious mixture into the desired shape of the cementitious container.

The pressure exerted by the dies forms the cementitious mixture into the desired configuration for the container. Accordingly, the pressure must be sufficient to actually mold the cementitious mixture between the dies. Furthermore, it is preferable that the pressure be sufficient to produce a container with a uniform and smooth finished surface.

The amount of pressure applied to the cementitious mixture also affects the strength of the resulting container. Research has found that the strength of the resultant product is increased for mixtures where the cement particles are close together. The greater the pressure used to press the cement mixture between the dies, the closer together the cement particles are pushed, thereby increasing the strength of the resulting container. That is to say, the less porosity that there is in the cementitious mixture, the higher the strength of the resulting product.

As high pressures are applied to cementitious mixtures with low concentration of water, the space between the particles is decreased. Thus, the water existing within the mixture becomes more effective in encasing the particles and reducing their friction force. In essence, as pressure is applied to a cementitious mixture, the mixture becomes more fluid or workable and, thus, less water needs to be added. In turn, the strength of the resulting product is increased. In application to the present invention, the higher the pressure exerted by the dies, the lower the amount of water that needs to be added to the mixture.

Although a high pressure is generally desirable, it can also have a negative effect. To produce a lightweight cementitious container, low density aggregates (such as perlite or hollow glass spheres) are typically added to the mixture. As the pressure exerted by the dies is increased, these aggregates may be crushed, thereby increasing the density of the aggregate and the resulting container, thereby decreasing the insulative effect of the aggregates.

Accordingly, the pressure applied by the dies should be optimized so as to maximize the strength, structural integrity, and low density of the cementitious container. Within the present invention, the pressure exerted by the male die and the female die on the cementitious mixture is preferably within a range from about 50 psi to about 20,000 psi, more preferably from about 100 psi to about 10,000 psi, and most preferably from about 150 psi to about 2000 psi. However, as discussed below, the amount of pressure will vary depending upon the temperature and time of the molding process.

The step of pressing further includes expelling the air from between the dies when the dies are pressed together. Failure to remove such air can result in air pockets or deformities in the structural matrix of the cementitious container. Typically, air between the dies is expelled through the gap distance between the dies as the dies are pressed together.

In an alternative embodiment, the dies may have a plurality of vent holes extending through the dies so as to make them permeable. Accordingly, as the dies are pressed together, the air between the dies is expelled through the vent holes. The vent holes thus prevent air pockets which could deform the cementitious container from forming within the cavity.

The vent holes also prevent the creation of a vacuum within the cavity as the dies are separated, by allowing air to return into cavity. Such a vacuum could exert an undue force on the newly formed cementitious container, thereby disrupting its structural integrity. Furthermore, vent holes permit the escape of excess steam created during the heating process which will be discussed later. The vent holes can exist in either or both of the dies.

(c) Heating.

The next step in the manufacturing process is heating the cementitious mixture for a sufficient period of time to impart improved form stability to the cementitious container. The preferred method for heating the cementitious mixture comprises heating the male die and the female die each to a respective temperature before pressing the cementitious mixture.

Increasing the temperature of the dies prior to the pressing step serves several functions. For ease in molding the cementitious mixture into a container without crushing the aggregate, an excess of water is added to the mixture. By applying heated dies to the mixture, a portion of the water in the cementitious mixture evaporates in the form of steam, thereby decreasing the volume percent of water and, thus, increasing the ultimate strength of the container.

Furthermore, as the water on the surface of the container evaporates, that portion of the cementitious mixture rapidly becomes dry. The friction forces between the dry particles in the cementitious mixture form a strong thin "shell" around the container which provides the cementitious container with form stability.

The application of heat to the cementitious mixture also increases the rate of curing. As discussed below, however, the dies remain pressed on the cementitious mixture for such a short period of time that only a fraction of the cementitious mixture reacts to become cured. A substantial amount of strength required for form stability is thus a result of the friction forces between the dry particles. As a result, the container is still in the green state even after achieving form stability.

The ability to rapidly impart form stability to the cementitious container in the green state is important, as it permits mass production of the containers. Form stability allows the containers to be quickly removed from the pressing apparatus so that new containers can be formed using the same pressing or molding equipment.

Another purpose for increasing the temperature of the dies is to minimize adherence of the cementitious mixture to the dies. As the steam is emitted from the cementitious mixture, it creates a "cushion" between the dies and the cementitious mixture. This steam boundary layer provides a substantially uniform force that pushes the cementitious mixture away from the die and, thus, prevents the cementitious mixture from sticking to the dies.

Furthermore, experiments have determined that if the male die and female die have a variance in temperature, the cementitious material will have a tendency to remain on the die with the lower temperature when the dies are separated. Accordingly, one can select the die on which the cementitious container is to remain on as the dies are separated, by having the desired die at a lower temperature.

The respective temperatures of the dies are important for maximizing the speed of the manufacturing process and are dependent, in part, upon the duration that the dies are in contact with cementitious material. In general, it is desirable that the temperature be as high as possible—the higher the temperature, the faster the drying on the surface of the cups, the quicker the cups can be removed, and the more cups that can be made per unit time.

The problem with higher temperatures, however, is that if the cementitious mixture becomes too hot, the water throughout the cementitious mixture, as opposed to just on the surface of the containers, turns to steam. The sudden release in pressure associated with demolding can result in the cracking, or even explosion, of the molded container once the dies are separated. However, this cracking can often be solved by faster closing and opening speeds of the press.

Moreover, the faster the cementitious material cures, the greater the likelihood of a deformity forming within the cementitious container as a result of differential flow. That is, as the dies are pressed together, the cementitious material flows into the desired shape. However, once the cementitious mixture on the surface of a container starts to dry, the drier cement has different flow properties than the remaining wet cementitious material. This differential in flow properties can result in deformities such as agglomerates, voids, cracks, and other irregularities in the structural matrix of the cementitious container.

Accordingly, the interrelationship between time and temperature is that the temperature of the dies can be increased as the time that the dies are in contact with the cementitious mixture is decreased. Furthermore, the temperature can be increased as the gap distance between the dies is decreased. However, there are limits to how high the temperature can go before the hydraulic mixtures become damaged.

To achieve the above desired objectives, it is preferable to heat the female and male die to a temperature within the range from between about 50° C. to about 250° C., more preferably to between about 75° C. to about 160° C., and most preferably to between about 120° C. to about 140° C. For reasons previously discussed, it is desirable to have the cementitious container remain on the male die after separation of the dies. Accordingly, the male die preferably has a lower temperature than the female die. The temperature variance between the female die and male die should preferably be in the range from about 10° C. to about 30° C.

The duration in which the heated male die and the heated female die are both in contact with the cementitious material (i.e., the time that the dies are mated) is preferably within the range from about 0.05 seconds to about 30 seconds, more preferably between about 0.7 seconds to about 10 seconds, and most preferably between about0.8 seconds to about 5 seconds.

In an alternative embodiment, the step of heating the cementitious container further includes exposing the cementitious container to heated air after the dies are separated, but before the container is removed from the die, that is, while the cementitious container is supported on the male die. Exposure to heated air insures that the container is form stable before it is removed from the die.

In another alternative embodiment, the step of heating the cementitious mixture can be accomplished by exposing the cementitious mixture to microwaves.

(d) Removing.

After the molded article has achieved some form stability, the newly formed cementitious container is removed from the dies. In the preferred embodiment, the newly formed cementitious container remains on the male die when the dies are separated. In one embodiment, the male die and the female die are rotated as they are separated so as to prevent the cementitious container from adhering to the dies.

As previously discussed, once the dies are separated, heated air can be blown over the container for a few seconds to further increase form stability. The cementitious container can then be removed from the male die without deformation. In the preferred embodiment, a standard process known as airveying is used to remove the cementitious container from the male die. Airveying is a process in which a negative pressure is applied to the container for sucking the container from off the die. The container then travels through a "U" shaped tube that deposits the container right side up.

The airveying process is preferable due to its gentle handling of the form stable containers and its low operating and capital costs. Heating air which is present to dry containers may be used to provide the bulk air transport carrying the containers through the length of the tubes. The air ducts are simply ports in the male die through which air can be injected to provide a uniform force to push the container off the male die. Such air ducts have substantially the same size, shape, and position as the vent holes previously discussed.

In one embodiment, the air ducts and vent holes may be one and the same. The air inserted in the air ducts must be low enough not to damage the containers. It is envisioned in the preferred embodiment that air ducts are located on the male die to help eject the containers from the male die and into the tubes.

In an alternative embodiment, the cementitious container can be mechanically removed from the male die by simply picking up the container. Such a process, however, requires exceptional care so as not to deform the container. The preferred method for mechanically removing the cementitious container incorporates using a template.

The template is circumferentially located at the base of the male die and is removable. The cementitious container is loaded onto the template via the lip of the cementitious container by either lifting the template or lowering the male die. When the container is removed from the dies, the container is form stable due to its dried surface. However, the container will still have green cement between its walls and, thus, it will not have reached its maximum strength. In such a condition, the cementitious container is strongest in compression along its vertical axis. Accordingly, the benefit of using the template is that the force applied for removing the container is applied along the strongest axis of the container, thereby minimizing possible deformation to the container.

(e) Initial Hardening.

Once molded, the cementitious mixture is allowed to harden in the desired shape of the cementitious container. To economically produce the inventive container, it must be rapidly hardened to a point where it has sufficient strength to be packaged, shipped, and used without substantial deformation.

Hardening of the container is accomplished by exposing the container to heated air, such as in a conventional tunnel oven. The application of the heated air drives off a portion of the water in the cementitious mixture, thereby increasing the friction forces between the particles and, thus, increasing the strength of the resulting container. Furthermore, the application of heated air to the containers increases the reaction rate of the cement, which provides early strength to the container through curing. Accordingly, hardening results from both an increase in the friction forces between the particles and curing of the cementitious mixture.

In the preferred embodiment, the container is hardened only to the extent that it has sufficient strength for packaging and transport without deformation. Ideally, the hardened container retains a small amount of unreacted water that permits the container to continue to cure, and thus increase in strength, during the period of time it is transported and stored prior to use.

In yet another embodiment, the air is blown over the container to increase the rate at which the cementitious mixture dries, thereby increasing the rate of hardening.

The air can also be applied through an autoclave capable of regulating the humidity, pressure, and temperature in the environment in which the container is cured. Increasing the humidity and temperature assists in producing more complete hydration of the cementitious mixture, thereby producing a stronger container.

It is this ability to rapidly harden the cementitious containers that makes it possible to economically complete the mass production of the cementitious containers.

In summary, the following conclusions can be drawn with respect to the drying of the cementitious product:

(1) The higher the temperature, the shorter the drying time.

(2) The higher the air speed, the shorter the drying time.

(3) Once a majority of the water is removed from a container, exposing the container to temperatures above 250° C. will burn organic fibers in the mixture, thereby decreasing tensile strength of the fibers and containers.

(4) The thinner the material wall of the container, the shorter the drying time.

(5) The higher the temperature is above 100° C., the lower the tensile strength of the resultant container.

3. The "Wet Sheet Molding" Process.

(a) Extrusion.

Once the hydraulically settable mixture has been properly blended, it is extruded through a thick sheet-type die. The hydraulically settable mixture is formed into sheets of precise thickness by first extruding the material through an appropriate extruder die and then passing the extruded material through one or more pairs of reduction rollers.

Within the interior chamber, one or more auger screws exert forward pressure on the hydraulically settable mixture and advance it through the interior chamber toward a die head having a transverse slit. The cross-sectional shape of the die slit is configured to create a sheet of a desired width and thickness generally corresponding to die width and die thickness.

Alternatively, the extruder apparatus may comprise a piston instead of an auger screw in order to exert forward pressure on the hydraulically settable mixture and advance it through the interior chamber. An advantage of using a piston extruder is the ability to exert much greater pressures upon the hydraulically settable mixture. Nevertheless, due to the highly plastic-like nature of mixtures typically employed in the present invention, it not generally necessary, or even advantageous, to exert pressures greater than those achieved using an auger-type extruder.

In contrast, an important advantage of using an auger-type extruder is that it has the ability to remove unwanted macroscopic air voids within the hydraulically settable mixture. Failure to remove unwanted air voids can result in the sheet having a defective or nonhomogeneous structural matrix. Removal of the air voids may be accomplished using conventional venting means known in the extrusion art, wherein the mixture is first passed into a vacuum chamber by a first auger screw and then extruded through the extruder die head by means of a second auger screw.

Alternatively, the unwanted air voids may be removed from the hydraulically settable mixture by a process known as "venting", wherein the excess air collects under pressure within the interior chamber and escapes from the extruder chamber while the mixture is compressed and moved forward by the auger-screw.

Although the preferred width and thickness of the die will depend upon the width and thickness of the particular sheet to be manufactured, the thickness of the extruded sheet will usually be at least twice, and sometime many times, the thickness of the final calendered sheet. The amount of reduction (and, correspondingly, the thickness multiplier) will depend upon the properties of the sheet in question. Because the reduction process helps control fiber orientation, the amount of reduction will often correspond to the degree of desired orientation.

In addition, the greater the thickness reduction, the greater the elongation of the sheet. In a typical manufacturing process an extruded sheet with a thickness of about 6 mm is calendered to form a wet sheet with a thickness of about 0.5 mm to about 1 mm.

Although the die slit is generally rectangularly shaped, it may contain areas of increased thickness along its width in order to form an extruded sheet having varying thickness along its width. In this case, it will also generally be preferable to pass the sheet through a series of rollers having recesses or gap variations which correspond to the areas of increased extruded thickness. In this way a sheet having reinforced areas of increased strength and stiffness can be produced.

In addition to narrow die slits to form flat sheets, other dies may be used to form other objects or shapes, the only criterion being that the extruded shape be capable of being passed between a pair of rollers. For example, it may not be desirable to extrude an extremely wide sheet, which would require a very large, expensive die. Instead, a pipe may be extruded and continuously cut and unfolded using a knife located just outside the die head.

It will be understood that an important factor which will affect the optimum speed or rate of extrusion is the final thickness of the sheet. A thicker sheet contains more material and will require a higher rate of extrusion to provide the necessary material. Conversely, a thinner sheet contains less material and will require a lower rate of extrusion in order to provide the necessary material.

As set forth above, adequate pressure is necessary in order to temporarily increase the workability of the hydraulically settable mixture in the case where the mixture has a deficiency of water and has a degree of particle packing optimization. In a mixture that is water deficient, the spaces (or interstices) between the particles contain insufficient water to lubricate the particles in order to create adequate workability under ordinary conditions.

However, as the mixture is compressed within the extruder, the compressive forces force the particles together, thereby reducing the interstitial space between the particles and increasing the apparent amount of water that is available to lubricate the particles. In this way, workability is increased until the mixture has been extruded through the die head, at which point the reduced pressure causes the mixture to exhibit an almost immediate increase in stiffness and green strength, which is generally desirable.

It should be understood that the pressure exerted on the hydraulically settable mixture during the extrusion process should not be so great so as to crush or fracture the lightweight, lower strength aggregates (such as perlite, hollow glass spheres, pumice, or exfoliated rock).

In light of each of the factors listed above, the amount of pressure which will be applied by the extruder in order to extrude the hydraulically settable mixture will preferably be within the range from between about 50 kPa to about 70 MPa, more preferably within the range from between about 150 kPa to about 30 MPa, and most preferably within the range from between about 350 kPa to about 3.5 MPa.

In some cases, particularly where a lower density, higher insulating sheet is desired, it may be advantageous to employ a blowing agent, which is added to the mixture prior to the extrusion process.

It will be understood that the extrusion of hydraulically settable binder through the die head will tend to unidirectionally orient the individual fibers within the hydraulically settable mixture along the "Y" axis, or in the lengthwise direction of the extruded sheet. As will be seen herein below, the calendering process will further orient the fibers in the "Y" direction as the sheet is further elongated during the reduction process. In addition, by employing rollers having varying gap distances in the "Z" direction (such as conical rollers) some of the fibers can also be oriented in the "X" direction, i.e., along the width of the sheet. Thus, it is possible to create a sheet by extrusion, coupled with calendering, which will have bidirectionally oriented fibers.

(b) Forming and Molding.

Once the sheet is formed, the next step is to fashion a portion of the sheet into the desired shape for the container or article. In the preferred embodiment, the sheet is pressed between a male die of a desired shape and a female die having a substantially complementary shape to the male die. As a portion of the sheet is pressed between the dies, the mixture is formed into a container having the complementary shape of the dies.

Although solid single piece dies (the male die and the female die each comprising one solid piece) are the preferred dies based on ease and economy, alternative dies include split dies and progressive dies. The use of multi-component split dies permits the production of complex shapes that are easily removed from the mold.

In contrast to the split die, where the components press together simultaneously to form the object, a progressive die is a multi-component die whose various parts are pressed together in a delayed sequence to form the desired container. By selecting the order and time when the various components of the die are pressed together, a complex container can be formed having a more uniform thickness.

For example, a progressive male die used to make a bowl may include a base and a side component. By having the base component press first, the remainder of the sheet is pulled in against the side of the female die. The side component of the male die can then be pressed to form the side of the bowl without stretching the sheet, thereby forming a bowl having a more uniform thickness.

Just as in the direct molding process, the amount of pressure exerted by the dies onto the sheet serves several functions which must be considered when determining how much pressure to apply. While a sheet of material is used as compared with directly injecting the material, the parameters and the cautions discussed above will generally apply to the wet sheet molding process.

In an alternative method for fashioning the container from the sheet, the various methods of vacuum forming, as commonly used in the plastics industry, can be incorporated. Vacuum forming uses atmospheric pressure (about 14.7 psi) to force the sheet to conform to a mold. Both male and female molds can be used for vacuum forming.

The term "vacuum mold" as used in the specification and appended claims is intended to include either or both the male mold and female mold used in vacuum forming.

Drape forming is used with male molds. The sheet is positioned over the top of the mold, or the mold is placed into the sheet. The air between the sheet and the mold is then evacuated, contouring the sheet around the mold. The resulting product is thickest in the center of the part where the material first touches the mold. It is thinnest in high-draw areas around the periphery, which contacts the mold last.

Straight vacuum forming is used with female molds. The sheet is sealed against the top of the female mold. The mold cavity is evacuated, and atmospheric pressure pushes the material against the sidewalls of the cavity. This forming technique results in material distribution (thin in the middle and thick around the edges) that is essentially opposite of that obtained when the same part is produced by drape forming on a male mold.

Drape vacuum forming, as opposed to drape forming, is similar to straight vacuum forming except that the edges of the sheet are pressed all the way to the base of the female mold before the cavity is evacuated. This provides a better vacuum for the molding process.

Snapback, billow/air slip, and billow drape are multi-step vacuum forming techniques designed to improve the wall thickness uniformity of products produced on male molds by prestretching the sheet prior to its contacting the mold. Stretching the sheet freely in air without touching anything allows the material to thin out uniformly. As a result, the surface area of the sheet is also increased so that it more closely matches that of the mold.

Snapback vacuum forming utilizes a vacuum box to pre-stretch the sheet. The vacuum box is mounted to a platen opposite the male mold. The cementitious sheet is sealed against the vacuum box, and a partial vacuum, sufficient to achieve the desired amount of stretching, is applied to the box. The mold is then pushed into the concave sheet. The box is vented to the atmosphere and a vacuum is drawn on the mold. The atmospheric pressure then forces the material against the mold.

Billow/air-slip vacuum forming utilizes a pressure box with a male mold positioned inside it. The sheet is sealed against the box. The box is pressured with compressed air and the sheet billows up to form a bubble that provides the appropriate stretching. The mold is pushed up into the convex bubble. The box and the male mold are then evacuated and the sheet is forced against the mold.

Billow drape vacuum forming is a reverse draw technique that utilizes a pressure box to blow a bubble in the sheet. The male mold, mounted opposite the box, is pushed into the convex bubble. The air in the bubble is vented to the atmosphere in a controlled manner. By matching the amount of air being vented to that being displaced by the mold, the sheet material is wiped or draped against the mold. When the mold completely penetrates the sheet, a vacuum is applied to the mold and the box is vented to the atmosphere to complete the forming operation.

Plug-assist and billow/plug-assist/snap back are multistep vacuum forming techniques designed to improve the wall thickness uniformity of parts produced with female molds. They utilize mechanical assists (or plugs) to force more material into high dry areas of the part.

Plug assist vacuum forming is used in conjunction with straight vacuum or drape forming techniques. The plug is mounted on a platen opposite the female mold. The sheet is sealed against the mold, and the plug pushes the material into the mold prior to drawing a vacuum. When the mold is evacuated, the material is forced off the plug and up against the mold cavity.

Billow/plug-assist/snap back forming combines several different forming techniques. The sheet is sealed against a female mold. The mold is pressurized to stretch the sheet by blowing a bubble. A plug mounted opposite the mold is forced into the convex bubble, and controlled venting of the displaced air in the bubble causes the material to be draped over the plug. When the plug is fully extended, the mold is evacuated and the material is pushed off the plug and onto the mold.

Pressure forming uses compressed air in addition to atmospheric pressure. Pressures typically range from about 40 Pa to about 200 Pa. Pressure forming requires special equipment with platens and/or molds in pressure boxes capable of locking up and holding the necessary pressure. Pressure forming can be incorporated into any of the vacuum forming techniques previously described.

The twin sheet forming process produces hollow parts. Two sheets are positioned between two female molds with matching perimeters or contact surfaces. The mold cavity contours may or may not be identical. The molds come together and bind the two sheets together where the molds meet. The two sheets may be either pressure formed simultaneously or vacuum formed subsequently utilizing conventional forming techniques.

The term "vacuum forming processes," as used in the appended claims, is intended to include pressure form and twin sheet forming processes in addition to the specifically enumerated vacuum forming techniques.

(c) Heating and Form Stability.

The creation of initial form stability in the hydraulically settable product after it is molded can be accomplished in substantially the same way as with the direct molding process.

(c) Drying.

Once initial form stability has been achieved, the hydraulically settable product can be dried and hardened by the same various techniques described above with respect to the direct molding process.

4. The "Dry Sheet Molding" Process.

(a) Extrusion.

The extrusion method used in connection with the "Dry Sheet Molding" process is, in all material aspects, substantially the same as that preferably utilized with the wet sheet molding process. Of course, the use of different processing equipment down the processing line may result in the need to make some modifications to the extrusion process, but such modifications are within the skill of the art in light of the foregoing teachings.

(b) Calendering.

In most embodiments of the dry sheet molding process, it will be preferable to "calender" the extruded sheet by passing it between at least one pair of rollers, the purpose of which is to improve the uniformity and surface quality of the sheet and also usually reduce the thickness of the sheet. In some embodiments, the calendering step will only reduce the thickness of the sheet by a small amount, if at all. In other cases, the calendering process will substantially reduce the thickness of the sheet.

As the thickness of the sheet is reduced when passing through a pair of rollers, it will also elongate in the forward moving direction. One consequence of sheet elongation is that the fibers will further be oriented or lined up in the "Y" direction. In this way, the reduction process in combination with the initial extrusion process will create a sheet having substantially unidirectionally oriented fibers in the "Y", or lengthwise, direction.

This process of squeezing or pressing the sheet, as well as the speed differential between the entering sheet and the rollers, creates a certain amount of shearing forces on the sheet. The application of an excessively large shearing force can disrupt the integrity of the structural matrix of the sheet and create flaws within the sheet, thereby weakening the sheet. Because of this, the thickness of the sheet should be reduced in steps small enough to prevent undo damage to the sheet. In most cases, the reduction of thickness of the sheet though each pair of rollers should be less than about 80%; more preferably, the reduction should be less than about 50%.

The diameter of each of the rollers should be optimized depending on the properties of the hydraulically settable mixture and the amount of thickness reduction of the hydraulically settable sheets. When optimizing the diameter of the rollers, two competing interests should be considered. The first relates to the fact that smaller diameter rollers tend to impart a greater amount of shearing force into the sheet as it passes between the rollers. This is because the rate of reduction of the hydraulically settable sheet is much greater at any given speed with the smaller diameter roller as it passes between the rollers.

Using larger diameter rollers allows more of the sheet to come in contact with the surface of the rollers as the sheet passes between them. Thus, the step of squeezing or pressing the sheet into a thinner sheet by the rollers is accomplished along a shorter distance and in a shorter period of time when smaller diameter rollers are used as compared to larger diameter rollers.

However, the use of larger diameter rollers also has the drawback that the hydraulically settable material comes into contact with the roller for a greater period of time, thereby resulting in an increase in drying of the sheet during the calendering process. While some drying is advantageous, drying the sheet too quickly during the calendering process could result in the introduction of fractures and other flaws within the structural matrix. The use of smaller diameter rollers reduces the drying effect of the calendering process.

It is preferable to treat the roller surfaces in order to prevent sticking or adhesion of the hydraulically settable sheet to the rollers. One method entails heating the rollers, which causes some of the water within the hydraulic mixture to evaporate and to create a steam barrier between the sheet and the rollers. Evaporation of some of the water also reduces the amount of water within the hydraulic mixture, thereby increasing the green strength of the sheet. The temperature of the rollers, however, must not be so high as to dry or harden the surface of the sheet to the point which would create residual stresses, fractures, flaking, or other deformities or irregularities in the sheet. Accordingly, it is preferable to heat the rollers to a temperature within the range from between about 50° C. to about 140° C., more preferably to between about 70° C. to about 120° C., and most preferably to between about 85° C. to about 105° C.

In addition, the rate of drying of the sheet can be reduced by incorporating aggregates having a low specific surface area. Aggregates which have a greater specific surface area can more readily release any water absorbed within the aggregate as compared to aggregates having a lower specific surface area.

Finally, it has been found that heating the hydraulically settable mixtures of the present invention increases the rate of the hydration reaction between the hydraulic binder and water. Heating the hydraulic mixtures of the present invention makes it possible to obtain substantial hydration of the hydraulic binder in as little as one hour. Because a substantial amount of the final strength can be obtained even before the hydration reaction has reached the standard 28-day level, heated hydraulically settable sheets of the present invention can achieve a substantial amount of their final strength within as little as 10 minutes.

In an alternative embodiment, adhesion between the hydraulically settable sheets and rollers can be reduced by cooling the rollers to, or below, room temperature. Heating the mixture in the extruder to about 85° C., for example, and then cooling the sheet surface causes the vaporizing water to condense, which is thought to create a thin film of water between the sheet and the roller. The rollers should be cool enough to prevent the surface of the sheet from adhering to the rollers, but not so cold that it causes the sheet to freeze or become so stiff or inflexible that it will fracture or shatter during the calendering process.

Overcooling the material can also greatly retard the hydration reaction, although this may be desirable in some cases. Accordingly, it is preferable to cool the rollers to a temperature within the range from between about 20° C. to about 40° C., more preferably to between about 0° C. to about 35° C., and most preferably to between about 5° C. to about 30° C.

Another way to reduce the level of adhesion between the rollers and the hydraulically settable sheet is to treat the roller surfaces in order to make them less amenable to adhesion. Rollers are typically made from polished stainless steel and coated with an antistick material such as polished chrome, nickel, or teflon.

It has been discovered that the amount of shear and downward pressure of the rollers can be reduced, while still deriving the same amount of sheet reduction, by employing a roller having a slightly conical shape in conjunction with a flat roller. However, the degree of gap differential in the "Z" direction as a result of the conical shape should be controlled to prevent spreading or widening of the sheet in the "X" direction, unless such widening is desired. However, widening is not usually desired because the widened portion is not usually of a constant thickness and must typically be trimmed and discarded. By using conical rollers, it is possible to obtain higher elongation and sheet reduction without applying more shear to the sheet.

Orienting the fibers maximizes the tensile strength imparting properties of the fibers in the direction of orientation. In addition, orienting the fibers is particularly useful to reinforce a hinge or score within the sheet. Fibers which are greater in length than the width of the fold or bend can act as a bridge to connect the material on either side of the fold or bend even if the matrix is partially or even substantially fractured along the fold or bend. This bridging effect is enhanced if the fibers are generally aligned perpendicular to the fold or bend.

Finally, it should be understood that due to the plastic nature and relatively high level of workability of the hydraulically settable mixture, the calendering process will usually not result in much compression of the sheet. In other words, the density of the sheet will remain substantially the same throughout the calendering process, although some compaction would be expected, particularly where the sheet has been significantly dried while passing between other reduction rollers. Where compaction is desired, the sheet can be passed between a pair of compaction rollers following a drying step, as set forth more fully below.

One of ordinary skill in the art will appreciate that the extrusion step need not formerly employ the use of an "extruder" as the term is used in the art. The purpose of the extrusion step is to provide a continuous, well-regulated supply of hydraulically settable material to the rollers. The extrusion step preferably orients the fibers in the direction of the flow of the material. This may be achieved by other mechanisms known to those skilled in the art to effect the "extrusion" or flow of material through an appropriate opening.

(c) Roller Drying.

Although the calendering step often results in partial or even substantial drying of the hydraulically settable sheet, it will be preferable to further dry the sheet in order to obtain a sheet with the desired properties of tensile strength and toughness. This may be accomplished in a number of ways, each of which involves heating the sheet in order to drive off the excess water. A preferred method of drying the sheet involves the use of large diameter, heated drying rollers known in the art as "Yankee" rollers. The main concern is that the combined surface areas of the rollers be adequate to efficiently effectuate drying of the sheet.

In contrast to the reduction rollers, which are generally aligned in pairs, the drying rollers are individually aligned so that the sheet passes over a maximum surface of each roller individually in sequence. In this way, the two sides of the hydraulically settable sheet are alternatively dried in steps. While the sheet passes between the reduction rollers during the calendering step in a generally linear path, the sheet follows a generally sinusoidal path when wrapping around and through the rollers (e.g., "Yankee" rollers) during the drying step.

The side adjacent to the first drying roller is heated by the drying roller while the other side is exposed to the air. The heated sheet loses water in the form of vapor, which can escape out the sides of the roller or the surface of the sheet opposite the roller. The vapor also provides a nonstick barrier between the sheet and roller. The drying rollers may have tiny holes within the surface in order to allow some of the water vapor to escape through the holes during the drying step.

As the sheet continues on its path it is rolled onto a second drying roller where the other side comes into contact with the roller surface and is dried. This process may be continued for as many steps as needed in order to dry the sheet in the desired amount. In some cases it may be preferable to dry one side of the sheet more than the other.

The temperature of the drying rollers will depend on a number of factors, including the moisture content of the sheet as it passes over a particular roller. In any event, the temperature of the drying rollers should be less than about 300° C. Although the internal temperature of the hydraulically settable material should not be heated above 250° C. in order to prevent the destruction of the organic constituents (such as rheology-modifying agent or fibers), rollers heated to above this temperature may be used so long as there is adequate water within the mixture to cool the material as the water vaporizes. Nevertheless, as the amount of water decreases during the drying process, the temperature of the rollers should be reduced to prevent overheating of the material.

In some cases, it may be preferable to use a drying tunnel or chamber in conjunction with the drying rollers. In order to obtain the full effect of heat convection drying, it is often preferable to circulate the heated air in order to speed up the drying process.

In some cases, the drying process set forth above will be the final step before the sheet is either used to form a container or other object or, alternatively, rolled onto a spool or stacked as sheets until needed. In other cases, particularly where a sheet with a smoother, more paper-like finish is desired, this drying step will be followed by one or more additional steps set forth more fully below, including a compacting step and/or a finishing step. In the case of compaction, it is generally preferable to leave the sheets with some amount of moisture to prevent fracturing of the matrix during the optional compaction step. Otherwise, if the drying step is not followed by a compaction step, it is generally desired to substantially dry out the sheet in order to quickly maximize the tensile strength and toughness of the sheet.

(d) Finishing.

In many cases, it may be desirable to compact the hydraulically settable sheet in order to achieve the final thickness, tolerance, and surface finish. In addition, the compaction process can be used to remove unwanted voids within the structural matrix. The sheet is passed between a pair of compaction rollers after being substantially dried during the drying process. The compaction process generally yields a sheet with higher density and strength, fewer surface defects, and a smaller thickness.

The compaction process preferably yields a sheet of reduced thickness and increased density without causing further elongation of the sheet and without negatively disrupting or weakening the structural matrix. In order to achieve compaction without elongating the sheet and without weakening the structural matrix, it is important to control the drying process so that the sheet contains an amount of water within an optimum range. If the sheet contains too much water, the compaction rollers will elongate the sheet in similar fashion as the reduction rollers. In fact, the compaction rollers are substantially the same as the reduction rollers, the only difference being that compaction, rather than elongation, will occur if the sheet is dry enough.

On the other hand, overdrying the sheet prior to the compaction step can yield a weaker sheet. At some point the hydraulically settable sheet can become so dry and hard that the structural matrix cannot be compressed without fracturing. The fracturing of the structural matrix can diminish the final strength of the sheet even if the fractures are microscopic and not visible to the naked eye. The compaction process of a dry sheet may be improved by spraying the surface of the sheet with water, which provides the sheet with adequate moisture and also fixes and aligns the compacted particles within the sheet surface.

It may also be preferable to further alter the surface of the hydraulically settable sheet by passing the sheet between one or more pairs of finishing rollers. For example, in order to create a sheet with a very smooth surface on one or both sides, the sheet may be passed between a pair of hard and soft rollers.

In other embodiments, the finishing rollers can impart a desired texture, such as a meshed or checkered surface. Instead of using a hard and a soft roller, rollers which can imprint the sheets with the desired finish may be used. If desired, the rollers can imprint the surface of the sheet with a logo or other design. Special rollers capable of imparting a water mark can be used alone or in conjunction with any of these other rollers.

It may be desired to corrugate the sheets in a manner similar to corrugated cardboard. This is accomplished by passing a semi-moist sheet between a pair of corrugated rollers. The moisture content of the sheet should be controlled so that the corrugation process does not result in a sheet with a damaged structural matrix. This may typically be carried out using steam.

(e) Scoring.

In some cases it may be desirable to alternatively score, score cut, or perforate the sheet in order to define a line upon which the sheet may fold or bend. A score cut can be made by using a sharp knife blade mounted on a score press or it can be accomplished using continuous die cut rollers. A score may be made in the sheet by means of a scoring die. Finally, a perforation may be made by means of a perforation knife.

The purpose of the score, score cut, or perforation is to create a location on the hydraulically settable sheet where the sheet can be bent or folded. This creates a "hinge" within the sheet with far greater bendability and resilience than possible with an unscored or unperforated hydraulically settable sheet. In some cases multiple score cuts or perforations may be desirable.

Cutting a score line or perforation within the sheet creates a better fold line or hinge for a number of reasons. First, it provides a place where the sheet might more naturally bend or fold. Second, cutting a score makes the sheet at the score line thinner than the rest of the sheet, which reduces the amount of lengthwise elongation of the surface while bending the sheet. The reduction of surface elongation reduces the tendency of the structural matrix to fracture upon being folded or bent. Third, the score cut or perforation allows for a controlled crack formation within the matrix in the event that fracture of the structural matrix occurs.

It may sometimes be preferable to concentrate more fibers at the place in which the score cut or perforation will be made. This can be accomplished by co-extruding a second layer of hydraulically settable material containing a higher fiber content at predetermined timed intervals to correspond with the location of the score cut or perforation. In addition, fibers can be placed on top of, or injected within, the sheet during the extrusion or calendering processes in order to achieve a higher fiber concentration at the desired location.

The hydraulically settable sheet will preferably be in a substantially dry or semi-hardened state during the scoring or perforation process. This is desirable to prevent the score or perforation from closing up through the migration of moist material into the score cut. Since scoring generally (and perforation always) involves cutting through a portion of the structural matrix, the sheet can even be totally dry without the scoring or perforation process harming the sheet. However, in cases where a score is pressed rather than cut into the sheet surface, the sheet should be moist enough to prevent fracture due to the dislocation of the structural matrix.

In most cases where a thinner sheet (<1 mm) is being score cut, the cut will have a depth relative to the thickness of the sheet that is within the range from between about 10% to about 50%, more preferably within the range from between about 20% to about 35%. In the case of thicker sheets, the score cut will usually be deeper due to the decrease in bendability of the thicker sheet.

As discussed below, it may be desirable to coat the sheet or to apply print or other indicia on the surface of the sheet. This can be accomplished using printing means known in the art of printing paper or cardboard products. Because the sheets have a relatively high porosity like paper or cardboard, the applied ink will tend to dry rapidly. In addition, decals, labels or other indicia can be attached or adhered to the cementitious sheet using methods known in the art.

Finally, the substantially hardened sheets can be immediately used to form containers or other objects, or they may be stored until needed such as, for example, by winding the sheets into a roll or cutting and stacking individual sheets into a pile. The hydraulically settable sheets made according to the processes set forth above can then be used just like paper or cardboard and can be fashioned into an endless variety of containers or other useful objects, even in manufacturing equipment which is currently used with paper or cardboard.

The sheets or continuous rolls of hydraulically settable material manufactured by the foregoing process can be utilized in existing equipment to make a variety of food and beverage containers. Sheets of such material have be used in conventionally available cup and package making equipment which were designed for use with paper. In light of the similar functional characteristics of the dried sheets of the hydraulically settable compositions of the present invention to paper, they can be substituted in most equipment for paper. Those modifications which must be made in the container manufacturing and processing operations have been found to be easily within the skill of those in the art.

5. The Post-molding and Curing Processes.

(a) Coating.

It may desirable to coat the hydraulically settable products prepared using the processes set forth above. Coatings can be used to alter the surface characteristics of the hydraulic product in a number of ways. They may provide protection against moisture, base, acid, or oil-based solvents. They may also provide a smoother or glossier surface. They may even reinforce the hydraulically settable product, particularly at a bend or fold line in a sheet material that has been formed into a container.

Some coatings can be applied to the surface of the product during the sheet forming or product molding process, in which case the process is an "on-machine" process. In an on-machine process, the coating may be applied as a liquid, gel, or even a thin film sheet. It may be preferable to apply the coating after the hydraulic product has been formed and dried to at least a limited extent, in which case the process is an "off-machine" process.

The object of the coating process is usually to achieve a uniform film with minimum defects on the surface of the product. The selection of a particular coating process depends on a number of substrate variables, as well as coating formulation variables. The substrate variables include the strength, wettability, porosity, density, smoothness, and uniformity of the matrix of the product. The coating formulation variables include total solids content, solvent base (including water solubility and volatility), surface tension, and rheology. Coating processes known in the art that may be used to coat the hydraulically settable sheets or products of the present invention include spraying, blade, puddle, air-knife, printing, and gravure coating.

(b) Stacker/Accumulator.

A custom automatic stacker can be installed at the end of the manufacturing line to create sets of stacks. The stacks are loaded onto a rotary table which allows a manual removal of the stack cups and placement into the downstream printing step.

(c) Printing.

Another optional step in the manufacturing process is applying print or designs to the container through the use of a conventional printer, such as an offset, Van Dam, laser, direct transfer contact, and thermographic printers. However, essentially any hand or mechanical means can be used. Of coarse, hydraulically settable products such as those disclosed herein are particularly well suited for such a use. Furthermore, as mentioned above, it is within the scope of the present invention to coat the containers with a government approved coating, most of which are currently used and well adapted for placing indicia thereon. One skilled in the art will appreciate that sheet porosity and ink quantities must be compatible.

(d) Bagging/Cartonizing.

Prior to shipping the containers they must be properly packaged. Accordingly, the finished stacks of cups are taken off the printer and manually loaded into poly bags and then loaded into cartons.

(e) Palletizing.

The finished cartons are then collected, sealed, marked, stacked and wrapped in standard carton handling/palletizing equipment for subsequent shipment.

III. Examples of the Preferred Embodiments.

To date, numerous tests have been performed comparing the properties of containers of varying composition. Below are specific examples of cementitious compositions which have been created according to the present invention.

EXAMPLE 1

A cementitious cup was formed by jiggering a cementitious mixture containing the following components:

| | |
|---|---|
| Portland White Cement | 2.0 kg |
| Water | 1.004 kg |
| Perlite | 0.702 kg |
| Tylose ® 4000 | 60 g |

The portland cement, Tylose®, and perlite were mixed for about 2 minutes; thereafter, the water was added and the mixture was blended for an additional 10 minutes. The resultant cementitious mixture had a water-to-cement ratio of approximately 0.5. The concentration of cement paste (cement and water) in this mixture was 79.8% by weight, with perlite comprising 18.6%, and the Tylose® being 1.6% by weight of the cementitious mixture.

The resultant cementitious material was then cast by jiggering into the shape of a cup. This cup had a wall thickness of 4.5 mm, and would insulate to 65° C., which means that the maximum temperature on the outside of the cup would be 65° C. when the cup is filled with hot water (88° C.). The cup was designed to have a predetermined bulk density by adding a porous aggregate (in this case perlite).

Another porous aggregate such as calcium silicate microspheres or hollow glass spheres can be used (as seen in later examples). Because porous aggregates have a low specific gravity, they can impart a degree of insulation ability to the material within the containers. This and later examples demonstrate that it is possible to manufacture a lightweight container from cement which can be designed to have adequate insulation for a particular purpose. Because increasing the insulative effect of the container generally accompanies a reduction in strength, it is preferable to design the material to have only that range of insulation necessary for a given purpose. In addition, later examples will show that the container design can be altered in order to obtain an adequately insulating container without increasing the actual insulating effect of the material within the container.

In this first example, the relatively large wall thickness of the cups resulted from an attempt to make the cups more insulating, not because the thickness was necessary in order for the cup to have adequate strength. However, the resulting cementitious cup had a good surface finish and was easily cast by jiggering. While the cup was relatively dense (having a bulk specific gravity of about 1.6), it did demonstrate the concept that a cementitious mixture can be designed to have form stability in the green state and still be molded by conventional means.

EXAMPLE 2

A cementitious cup was formed by jiggering a cementitious mixture containing the following components:

| | |
|---|---|
| Portland White Cement | 2.0 kg |
| Water | 1.645 kg |
| Perlite | 0.645 kg |
| Tylose ® 4000 | 20 g |
| Tylose ® 15002 | 15 g |
| Cemfill ® glass fibers (4.5 mm) | 370 g |

The cementitious mixture was prepared utilizing the procedures set forth with respect to Example 1, except that the fibers were added after mixing the cement, water, Tylose®, and perlite for about 10 minutes. The combined mix was then mixed for an additional 10 minutes. The resultant cementitious mixture had a water-to-cement ratio of approximately 0.82. The concentration of cement paste (cement and water) in this mixture was 77.6% by weight, with perlite comprising 13.7%, the Tylose® 4000 and FL 15002 comprising 0.43% and 0.32%, respectively, and the glass fibers being 7.9% by weight of the cementitious mixture.

The resultant cementitious mixture was then cast by jiggering into the shape of a cup. The cup had good surface finish, like the cup of Example 1, but it also had a higher toughness and fracture energy than the cup of Example 1 because of the addition of the glass fibers. The cups so obtained demonstrated an adequate amount of strength, and did not break when dropped onto a concrete or marble floor from heights of up to 2 meters, as would have been expected when dropping thin-walled cementitious objects from this height.

EXAMPLE 3

A cementitious cup was formed by jiggering an extruded cementitious mixture containing the following components:

| Portland White Cement | 4.0 kg |
| --- | --- |
| Water | 1.179 kg |
| Calcium silicate microspheres | 1.33 kg |
| Tylose ® Fl 15002 | 30 g |
| Cemfill ® glass fibers (4.5 mm; alkali resistant) | 508 g |

The cementitious mixture was prepared utilizing the procedures set forth with respect to Example 2, except that the microspheres were added in place of the perlite. The resultant cementitious mixture had a water-to-cement ratio of approximately 0.29, which is dramatically lower than that of Examples 1 and 2. This demonstrates that, depending upon the aggregate system, significantly different water to cement ratios can be designed into the composition. The concentration of cement paste (cement and water) in this mixture was 73.5% by weight, with the microspheres comprising 18.9%, the Tylose® comprising 0.43%, and the glass fibers being 7.2% by weight of the cementitious mixture.

The resulting cementitious cup did not have as good a surface finish as Examples 1 and 2, but it was lighter. The cementitious mixture could be readily jiggered and extruded and would insulate hot water to 63° C.

While early prototypes of the present invention, the cups prepared according to Examples 1–3 taught that the concepts tested therein were sound. These examples taught that adding porous, lightweight aggregates to the cementitious mixture alone does not generally result in a material having the same insulation ability as polystyrene. Neither the addition of perlite, nor the calcium silicate microspheres imparted the degree of insulation desired for commercial use with coffee and other hot drinks within the mix designs used in these examples. Therefore, methods of imparting insulation other than by merely adding inorganic materials to the cement matrix were explored.

In the next series of examples, finely dispersed, microscopic, discontinuous air voids were introduced into the hydraulically settable structural matrix, which had the effect of greatly increasing the insulative ability of the cup.

EXAMPLE 4

A cementitious cup was formed by jiggering a cementitious mixture containing the following components:

| Portland White Cement | 2.52 kg |
| --- | --- |
| Water | 1.975 kg |
| Vermiculite | 1.457 kg |
| Vinsol resin | 2.5 g |
| Tylose ® 4000 | 25 g |
| Tylose ® FL 15002 | 75 g |
| Abaca fiber | 159 g |

The cementitious mixture was prepared by prewetting the abaca fiber (which had been pretreated by the manufacturer with sodium hydroxide so that greater than 85% of the cellulose was α-hydroxycellulose) and then combining the fibers with each of the other components except vermiculite. This mixture was mixed for about 10 minutes, and then mixed a further 10 minutes after the vermiculite was added. The resultant cementitious mixture had a water-to-cement ratio of approximately 0.78. The concentration of cement paste (cement and water) in this mixture was 72.3% by weight, with the vermiculite comprising 23.4%, the Tylose® 4000 and FL 15002 comprising 0.40% and 1.21%, respectively, the vinsol resin (an air entraining agent) comprising 0.04%, and the abaca fibers being 2.6% by weight of the cementitious mixture.

The cup made in Example 4 was cast by jiggering to have a wall thickness of about 2.5 mm, which is substantially thinner than the wall thicknesses obtained for the cups in Examples 1–3. Nevertheless, the cementitious cup of Example 4 was able to insulate down to 62° C. (a significant improvement over the earlier cups in light of the reduced wall thickness). The surface finish was very smooth, and the cup had a high toughness and fracture energy. The cup had a capacity of about 390 cc and weighed about 95 g.

EXAMPLE 5

A cementitious cup was formed by jiggering a cementitious mixture containing the following components:

| Portland White Cement | 2.52 kg |
| --- | --- |
| Water | 2.31 kg |
| Vermiculite | 2.407 kg |
| Vinsol resin | 2.5 g |
| Tylose ® 4000 | 25 g |
| Tylose ® 15002 | 75 g |
| Abaca fiber | 159 g |
| Aluminum (<100 mesh) | 0.88 g |

The cementitious mixture was made utilizing the procedures set forth with respect to Example 4. The resultant cementitious mixture had a water to cement ratio of approximately 0.92. This mixture was readily cast by jiggering, even though it had a relatively high water-to-cement ratio. The concentration of cement paste (cement and water) in this mixture was 64.4% by weight, with the vermiculite comprising 32.1%, the Tylose® 4000 and 15002 comprising 0.33% and 1.0%, respectively, the vinsol resin (an air entraining agent) comprising 0.03%, the abaca fibers being 2.1%, and the amount of aluminum being about 0.01% by weight of the cementitious mixture.

The addition of aluminum resulted in the incorporation of finely dispersed hydrogen bubbles within the cementitious mixture. Hence, the resultant cup was even more lightweight and porous than the cup of Example 4, weighing only 85 g.

The cup further had a smooth surface finish and there was no degradation in the toughness, fracture energy, or insulation capability.

EXAMPLE 6

A cementitious cup was formed by jiggering a cementitious mixture containing the following components:

| | |
|---|---|
| Portland White Cement | 2.52 kg |
| Water | 1.65 kg |
| Vermiculite | 1.179 kg |
| Perlite | 0.262 kg |
| Vinsol resin | 5.0 g |
| Tylose® 4000 | 12.5 g |
| Tylose® FL 15002 | 37.5 g |
| Abaca fiber | 159 g |
| Aluminum (<100 mesh) | 1.5 g |

The cementitious mixture was made utilizing the procedures set forth with respect to Example 4. The resultant cementitious mixture had a water-to-cement ratio of approximately 0.65. The concentration of cement paste (cement and water) in this mixture was 71.6% by weight, with the perlite comprising 4.5%, the vermiculite comprising 20.2%, the Tylose® 4000 and 15002 comprising 0.21% and 0.64%, respectively, the vinsol resin (an air entraining agent) comprising 0.086%, the abaca fibers being 2.7%, and the amount of aluminum being about 0.026% by weight of the cementitious mixture.

The resulting cementitious cup had properties and characteristics substantially similar to those of the cup made in Example 5.

The cups of Examples 4–6 yielded better results, both in terms of strength and, especially, insulative ability compared to cups in the previous examples. Cups made in Examples 4–6 were able to insulate to 62° C. These examples demonstrate that the incorporation of microscopic air voids can greatly increase the container's insulating ability without appreciably decreasing the strength. They also show that aluminum can be used to generate the air bubbles which are entrained within the cementitious mixture.

These and other experiments have shown that perlite tends to reduce the strength of the container, while imparting the same level of insulation regardless of how the cement paste was either mixed or molded. On the other hand, because vermiculite is plate-shaped, it is advantageous, both in terms of strength and insulation, to align the individual particles along parallel planes within the wall of the container. This may be achieved by jiggering, ram pressing, extrusion, or rolling the mixture.

Similarly, in order for the added fibers to be most effective, it has been found advantageous to align them within the hydraulically settable structural matrix as well. This may also be achieved using the above-mentioned molding processes. Such alignment imparts much greater strength and toughness to the resulting food or beverage container.

It has also been discovered that where a more viscous hydraulic paste is involved, it takes from between 5 and 10 minutes of mixing to obtain good flocculation of the cement paste and the resulting plastic behavior. In addition, it takes Tylose® about 5 minutes to "react" with or gel in the presence of water in order to impart its thickening effect to the mixture.

EXAMPLES 7–10

Cementitious plates were formed by passing, through a pair of rollers, various cementitious mixtures containing hollow glass spheres (diameter <100 microns) as the aggregate. The components for each example was as follows:

| Example | Cement | Water | Tylose® FL 15002 | Glass Spheres |
|---|---|---|---|---|
| 7 | 4 kg | 2.18 kg | 200 g | 445 g |
| 8 | 3 kg | 1.85 kg | 150 g | 572 g |
| 9 | 2 kg | 1.57 kg | 100 g | 857 g |
| 10 | 1 kg | 1.55 kg | 100 g | 905 g |

The cementitious mixtures were prepared by first combining the hydraulic cement, Tylose®, and water together using a high shear mixer for 5 minutes. Thereafter, the glass spheres were added and mixed for 5 minutes using a low shear mixer. The resultant cementitious mixtures in Examples 7–10 had water to cement ratios of approximately 0.55, 0.62, 0.79, and 1.58, respectively. Even with the high water to cement ratio of Example 10, the cementitious mixture was form stable in the green state and readily moldable. The percentage by weight of the glass spheres in each of Examples 7–10 was 6.5%, 10.3%, 18.9%, and 25.3%, respectively.

These materials were extremely lightweight, having densities in the range from about 0.25 to 0.5. Equally important were the insulative capabilities of cups made from these mixtures having a wall thickness of 2.0 mm, as measured by the maximum temperature achieved by the outer wall of the cup when 88° C. water was placed inside the cups:

| Example | Insulation Temperature |
|---|---|
| 7 | 62° C. |
| 8 | 55° C. |
| 9 | 56° C. |
| 10 | 57° C. |

It is believed that the insulation ability of the products of Examples 9 and 10 are even greater than indicated. These cups were coated with melamine before they were tested and the solvent in the melamine may have made the effective thickness of the cups less than 2.0 mm. In fact, 2.0 mm thick sheets were placed in an oven at 150° C. for three hours; thereafter, they could be removed by hand. This means that the surface temperature was significantly less than 60° C., which may be due to the relatively low specific heat of the lightweight cementitious materials made in these examples.

EXAMPLES 11–14

The cementitious mixtures of Examples 7–10 were altered by adding varying amounts of abaca fiber, which were blended in during the high shear mixing step.

| Example | Corresponding Example | Amount of Abaca fiber |
|---|---|---|
| 11 | 7 | 149 g |
| 12 | 8 | 152 g |
| 13 | 9 | 180 g |
| 14 | 10 | 181 g |

The resultant percentage by weight of the abaca fibers in Examples 11–14 was 2.1%, 2.7%, 3.8%, and 4.8%, respectively. These cementitious materials were as lightweight and insulative as those made in Examples 7–10, but were much tougher and had a higher fracture energy. In addition, adding more fibers made the products more bendable, as in containers having hinged flaps or other closure mechanisms. Hence, the use of these abaca fibers, as well as other types of fibers, is particularly desirable in situations where such characteristics are desirable.

EXAMPLES 15–17

Plates and cups composed of cementitious mixtures of these examples were prepared according to the procedures, and using the components, of Example 7 (i.e., 4 kg of portland white cement is used) with the exceptions that aluminum powder (<100 mesh) and NaOH were added to the cementitious mixtures in the following amounts and the resultant molded plates were heated to about 80° C. for 30–60 minutes:

| Example | Aluminum | NaOH |
|---|---|---|
| 15 | 4 g | 21.9 g |
| 16 | 6 g | 34.7 g |
| 17 | 8 g | 34.7 g |

The NaOH was added to the cementitious mixture to activate the aluminum by establishing a pH in the preferable range of about 13.1–13.8. The porosity of the cementitious mixture was increased, the bulk density was decreased, insulation capability was increased, and the plates and cups were more lightweight. The rate and extent of the reaction of aluminum metal can be altered by adjusting the amount of aluminum and heat that are added. As more of each is added, the material becomes lighter, fluffier and softer, making good cushioning material.

It is important to note that shrinkage cracks were not observed in the plates of Examples 15–17, even though the cementitious mixtures were heated and much of the water was driven off rapidly.

EXAMPLES 18–20

Cementitious plates were formed by passing, through a pair of rollers, cementitious mixtures containing the components for each example as follows:

| Example | Aluminum | NaOH | Abaca Fibers |
|---|---|---|---|
| 18 | 10.0 g | 22.3 g | 60 g |
| 19 | 15.0 g | 22.3 g | 60 g |
| 20 | 22.5 g | 22.3 g | 60 g |

In each of these examples, there was 4 kg of portland white cement, 1.4 kg of water, and 40 g of Tylose® FL 15002. The cementitious mixtures were prepared substantially according to the procedures set forth in Example 1, with the exception that fibers rather than perlite aggregates are added. Like the cementitious mixtures of Examples 15–17, these materials are extremely lightweight and are very insulative because of the amount of air that was incorporated into the hydraulically settable mixtures. However, the cementitious mixtures of these examples have increased toughness and fracture energy because of the addition of the fibers.

EXAMPLES 21–24

Cementitious plates were formed by passing, through a pair of rollers, cementitious mixtures containing the components for each example as follows:

| | Glass Spheres | | | | |
|---|---|---|---|---|---|
| Example | Fine | Medium | Coarse | Aluminum | NaOH |
| 21 | 133 g | 317 g | 207 g | 4.0 g | 19.7 g |
| 22 | 133 g | 317 g | 207 g | 6.0 g | 31.2 g |
| 23 | 133 g | 317 g | 207 g | 8.0 g | 31.2 g |
| 24 | 133 g | 317 g | 207 g | 0.0 g | 0 g |

In each of these examples, there was 4 kg of portland white cement and 1.96 kg of water; hence, the water-to-cement ratio was 0.49. The amounts of Tylose® FL 15002 and abaca fibers in each mixture were 200 g and 60 g, respectively. The cementitious mixtures were prepared substantially according to the procedures set forth in Examples 15–17, with the exception that hollow glass spheres having three different diameters were used. All of the glass spheres were less than one millimeter. (Example 24, however, does not incorporate aluminum and NaOH.)

The percentage by weight of the total amount of glass spheres in each of the cementitious mixtures of Examples 21–24 was 2.1%.

The cementitious mixtures were also pressed into the shape of a cup using male and female molds. The cups had similar properties as the plates and demonstrate the viability of molding the cementitious mixture into the shape of a container.

These materials were extremely lightweight (density <0.7) and were very insulative because of the amount of air and the effective packing of the glass spheres incorporated into the mixtures. The cementitious mixtures of these examples demonstrated the value of packing the aggregates in order to maximize their effect in the resultant composition. While the cementitious mixture of Example 24 is a good composition for many circumstances, its insulative capabilities are not as great as the cementitious mixtures of Examples 21–23.

EXAMPLES 25–28

Cementitious plates were formed by passing, through a pair of rollers, cementitious mixtures containing the components for each example as follows:

| | Glass Spheres | | | | |
|---|---|---|---|---|---|
| Example | Fine | Medium | Coarse | Aluminum | NaOH |
| 25 | 171 g | 394 g | 267 g | 3.0 g | 16.7 g |
| 26 | 171 g | 394 g | 267 g | 4.5 g | 26.6 g |
| 27 | 171 g | 394 g | 267 g | 6.0 g | 26.6 g |
| 28 | 171 g | 394 g | 267 g | 0.0 g | 0 g |

In each of these examples, there was 3 kg of portland white cement and 1.67 kg of water; hence, the water-to-cement ratio was 0.56. Tylose® FL 15002 and abaca fibers were added to each mixture in amounts of 150 g and 60 g, respectively. The percentage by weight of the total amount of glass spheres in each of the cementitious mixtures of Examples 25–28 was 3.4%. Otherwise, the cementitious mixtures in these examples were prepared substantially according to the procedures of Examples 21–24.

The materials that were made in these examples are extremely lightweight and very insulative because of the amount of air and the effective packing of the glass spheres incorporated into the mixtures. The cementitious mixtures of these examples show the value of packing the aggregates in order to maximize their effect in the resultant composition. While the cementitious mixture of Example 28 is a good composition for many circumstances, it does not demonstrate the same insulative capabilities as the cementitious mixtures of Examples 25–27.

The plates of Examples 25–28 are lighter and more insulating than the corresponding plates of Examples 21–24. However, these plates have less strength than those with greater amounts of cement.

EXAMPLES 29–32

Cementitious plates were formed by passing, through a pair of rollers, cementitious mixtures containing the components for each example as follows:

|  | Glass Spheres | | | | |
| --- | --- | --- | --- | --- | --- |
| Example | Fine | Medium | Coarse | Aluminum | NaOH |
| 29 | 257 g | 591 g | 400 g | 2.0 g | 14.2 g |
| 30 | 257 g | 591 g | 400 g | 3.0 g | 22.5 g |
| 31 | 257 g | 591 g | 400 g | 4.0 g | 22.5 g |
| 32 | 257 g | 591 g | 400 g | 0.0 g | 0 g |

In each of these examples, there was 2 kg of portland white cement and 1.41 kg of water; hence, the water-to-cement ratio was 0.71. Tylose® FL 15002 and abaca fibers were added to each mixture in amounts of 100 g and 60 g, respectively. The percentage by weight of the total amount of glass spheres in each of the cementitious mixtures of Examples 29–32 was 6.8%. Otherwise, the cementitious mixtures were prepared substantially according to the procedures of Examples 29–32.

The materials that were made in these examples are extremely lightweight and very insulative because of the amount of air and the effective packing of the glass spheres incorporated into the mixtures. The cementitious mixtures of these examples show the value of packing the aggregates in order to maximize their effect in the resultant composition. While the cementitious mixture of Example 32 is a good composition for many circumstances, it does not demonstrate the same insulative capabilities as the cementitious mixtures of Examples 29–31.

The plates of Examples 29–32 are even lighter and more insulating than the corresponding plates of Examples 21–28. However, these plates have less strength that those with greater amounts of cement.

EXAMPLES 33–36

Cementitious plates were formed by passing, through a pair of rollers, cementitious mixtures containing the components for each example as follows:

|  | Glass Spheres | | | | |
| --- | --- | --- | --- | --- | --- |
| Example | Fine | Medium | Coarse | Aluminum | NaOH |
| 33 | 271 g | 624 g | 422 g | 1.0 g | 14.3 g |
| 34 | 271 g | 624 g | 422 g | 1.5 g | 22.6 g |
| 35 | 271 g | 624 g | 422 g | 2.0 g | 22.6 g |
| 36 | 271 g | 624 g | 422 g | 0.0 g | 0 g |

In each of these examples, there was 1 kg of portland white cement and 1.42 kg of water; hence, the water-to-cement ratio was 1.42. Tylose® FL 15002 and abaca fibers were added to each mixture in amounts of 100 g and 60 g, respectively. The cementitious mixtures were prepared substantially according to the procedures of Examples 21–24. Even though the water-to-cement ratio of these cementitious mixtures was very high, they were readily extruded and cast by jiggering.

The percentage by weight of the total amount of glass spheres in each of the cementitious mixtures of Examples 33–36 was 9.7%.

These materials are extremely lightweight and are very insulative because of the amount of air and the effective packing of the glass spheres incorporated into the mixtures. The cementitious mixtures of these examples show the value of packing the aggregates in order to maximize their effect in the resultant composition. While the cementitious mixture of Example 36 is a good composition for many circumstances, it does not demonstrate the same insulative capabilities as the cementitious mixtures of Examples 33–35.

The plates of Examples 33–36 are still more insulating and lighter than the corresponding plates of Examples 21–32. However, these plates have less strength than those with greater amounts of cement.

EXAMPLES 37–38

Cementitious mixtures containing the following components were used to make cementitious sheets:

| Example | Cement | Water | Tylose® FL 15002 | Abaca Fibers | Surfactant |
| --- | --- | --- | --- | --- | --- |
| 37 | 10 kg | 23.0 kg | 300 g | 200 g | 300 g |
| 38 | 10 kg | 20.0 kg | 300 g | 200 g | 300 g |

In these examples, microfine cement was utilized to make the cementitious cylinders. The cementitious mixtures were made by mixing the components for about 10 minutes in a high energy mixer of the type discussed above, which is available from E. Khashoggi Industries. This high energy and high speed mixer introduced significant amounts of air into the cementitious mixtures; this air was entrained within the cementitious mixture by use of the surfactant and stabilized by the Tylose®. The resulting cementitious mixtures were passed between a pair of rollers and formed into thin sheets (1 mm). The sheets were then scored, folded into the shape of a cereal box, and glued together using adhesive techniques known in the art. These products were alternatively hardened by passing them through a heat tunnel, which helped to remove excess water and to increase their green strength.

EXAMPLES 39–40

Cementitious mixtures containing the following components were used to make cementitious sheets:

| Example | Cement | Water | Tylose® FL 15002 | Graphite Fibers | Surfactant |
| --- | --- | --- | --- | --- | --- |
| 39 | 4.23 kg | 8.1 kg | 120 g | 260 g | 135 g |
| 40 | 10.0 kg | 20.0 kg | 300 g | 300 g | 300 g |

In these examples, microfine cement was utilized. Like the products of Examples 37 and 38, the cementitious mixtures of these examples were made by mixing the components for about 10 minutes in a high shear mixer of the type discussed above, which is available from E.

Khashoggi Industries. This high shear, high speed mixer introduced significant amounts of air into the cementitious mixtures; this air was entrained within the cementitious mixture by the surfactant.

However, due to the graphite fibers, the mixture was not as easily foamed and was not as lightweight and insulative as materials containing no graphite fibers. The resulting cementitious mixtures were passed between a pair of rollers and formed into thin sheets (1 mm), which were folded into the shape of a cereal box and glued together using adhesive techniques known in the art. These products were alternatively hardened by passing them through a heat tunnel, which helped to remove excess water and to increase their green strength.

The resulting cementitious materials were also highly insulative and had a low bulk specific gravity in the range of about 0.25–0.4.

EXAMPLE 41

A cementitious plate was formed from a cementitious mixture using the procedure set forth in Example 37, with the exception that about 1.2 kg of glass spheres was added to the "foamed" mixture of cement, water, and Tylose®. The resultant plate had an insulative ability not significantly different from standard polystyrene foam plates. The plate of this example was placed in an oven for three hours at 150° C. and could still be removed with bare fingers.

EXAMPLE 42

Thin cementitious sheets were formed by molding a cementitious mixture which included the following:

| | |
|---|---|
| Portland White Cement | 1.0 kg |
| Water | 2.5 kg |
| Tylose® FL 15002 | 200 g |
| Hollow Glass Spheres (<100 microns) | 1.0 kg |
| Abaca Fiber | 5% by volume |

The cementitious mixture was made by prewetting the abaca fiber (which was pretreated by the manufacturer so that greater than 85% of the cellulose is α-hydroxycellulose) and then adding the excess water and the fibers to a mixture of Tylose® and portland cement. This mixture was mixed at relatively high speed for about 10 minutes, and then at a relatively slow speed for 10 minutes after the hollow glass spheres were added. The resulting cementitious mixture had a water to cement ratio of approximately 2.5.

This mixture was passed between a pair of rollers and formed into thin sheets of about 1 mm in thickness. Wet sheets were scored and then folded in an attempt to create a box. However, there was a fair amount of splitting and a box with sufficient strength and integrity could not be formed.

Thereafter, sheets were first allowed to harden and then were scored, folded into the shape of a box, and glued together by adhesive means well known in the paper art. The amount of splitting at the fold was negligible, which demonstrated that it is preferable to score and then fold the thin sheets after they have been allowed to harden or solidify somewhat. The thin sheets were formed into a box that had the shape, look and weight of a dry cereal box used presently as manufactured from cardboard stock.

EXAMPLE 43

The dried sheets formed in Example 42 were cut into the appropriate shape, rolled to form a cup, and glued using adhesive means known in the art. Examples 42 and 43 demonstrate that it is possible to make boxes, cups, or other containers of similar shape which are presently made from cardboard, paper, or plastic.

The following examples demonstrate that flexible cementitious materials having high toughness and strength can be manufactured. They are useful in containment applications where cushioning and flexibility are important criteria.

EXAMPLES 44–48

Flexible sheets were formed from cementitious mixtures containing the following:

| Example | Plastic Spheres | Cement | Water | Tylose® |
|---|---|---|---|---|
| 44 | 0.12 kg | 1.0 kg | 2.0 kg | 0.1 kg |
| 45 | 0.1213 kg | 0.8 kg | 2.0 kg | 0.1 kg |
| 46 | 0.1225 kg | 0.6 kg | 2.0 kg | 0.1 kg |
| 47 | 0.1238 kg | 0.4 kg | 2.0 kg | 0.1 kg |
| 48 | 0.1251 kg | 0.2 kg | 2.0 kg | 0.1 kg |

The "plastic spheres" are made from polypropylene and have average particle sizes less than 100 microns and an average density of 0.02 g/cm$^3$. The cementitious mixtures were mixed and then formed into sheets according to the procedure set forth in Example 42. The cementitious sheets were relatively strong and very flexible compared to previous mix designs. The compressive strength of the plate made according to Example 44 was 2 MPa and the tensile strength was 1 MPa. The surprising feature is that the compressive and tensile strengths are of the same magnitude, which is very unusual for most cement products. Usually the compressive strength is far greater than the tensile strength. As less cement is added, the compressive and tensile strengths decrease in increments, with the plate of Example 48 having a tensile strength of 0.5 MPa.

These packaging materials could be physically compressed without crumbling like their nonflexible, cementitious counterparts in earlier examples, even when subject to forces that were greater than forces normally experienced by styrofoam containment materials. The flexible cementitious materials were alternatively extruded into the shape of rectangular shaped bars, which more dramatically demonstrated the degree of flexibility made possible by this mixture.

The densities of the cementitious packaging materials made in these examples ranged between 0.1 and 0.6 g/cm$^3$, with the density decreasing as less cement is used.

EXAMPLES 49–53

Flexible cementitious container materials were made according to Examples 44–48, except that prewetted abaca fibers were added to the cementitious mixture in the following amounts, as measured by unit volume:

| Example | Abaca Fiber |
|---|---|
| 49 | 2% |
| 50 | 4% |
| 51 | 6% |
| 52 | 8% |
| 53 | 10% |

The fibers were well dispersed throughout the cementitious mixture using a high shear mixer. The resulting cementitious plates and rectangular bars made therefrom had substantially the same densities and flexibilities as those in Examples 44–48, but with increasing tensile strengths as the amount of abaca fiber was increased. The tensile strengths of the materials formed herein ranged up to 5 MPa.

EXAMPLE 54

Cementitious containers are formed using any of the compositions and procedures set forth in Examples 44–53, except that the plastic spheres are concentrated near the surface of the cementitious mixture, yielding a molded material in which the plastic spheres are concentrated at or near the surfaces of the final hardened product. The container formed thereby has a higher concentration of plastic spheres near the surface of the cement matrix, where flexibility is more important, and virtually no plastic spheres in the center of the packaging material where flexibility is less important. The advantage of this is greater flexibility at the surfaces with the same amounts or less of plastic spheres in the overall compositions. At the same time, the rigidity of the center of the container walls makes them as durable and tough as the more rigid containers above.

The next set of examples utilizes cementitious mixtures which have a relatively high specific gravity, but which are formed into solid objects, such as honeycomb structures, that have a high amount of intrastructural space. This reduces the bulk specific gravity of the final product so that it is more lightweight, yet very strong and durable.

EXAMPLE 55

A honeycomb container structure is extruded from a cementitious mixture including the following:

| | |
|---|---|
| Portland White Cement | 4.0 kg |
| Fine Sand | 6.0 kg |
| Water | 1.5 kg |
| Tylose ® FL 15002 | 200 g |

The cementitious mixture is formed by mixing the ingredients together for 10 minutes using a high speed mixer to obtain a very homogeneous mixture. The cementitious mixture is then extruded to form a honeycomb structure which has very high compressive strength. Because of the honeycomb structure, the cured material is very lightweight with a block density of only 1.02 g/cm$^3$. Moreover, the cured material has a compressive strength of about 75 MPa. Depending upon the amount of space within the honeycomb structure, the block density can easily range anywhere from between 0.5 to 1.6 g/cm$^3$.

These materials can be used to form very strong, yet lightweight walls of larger food or beverage packaging containers.

EXAMPLES 56–58

Cementitious mixtures are formed according to Example 55, except that abaca fiber is included within the cementitious mixture in the following amount, as measured by volume percent of the cementitious mixture:

| Example | Abaca Fiber |
|---|---|
| 56 | 1% |
| 57 | 2% |
| 58 | 3% |

The resulting honeycomb structures have high strength, both in the green state and after they are cured, due to the reinforcing effect of the honeycomb structure. The honeycomb structures formed in these examples are more ductile than in Example 55, while the compressive strengths would be expected to be even greater. These materials can be used to form very strong, yet relatively lightweight walls of larger food and beverage packaging containers.

EXAMPLES 59–61

Cementitious mixtures are formed according to Example 55, except that fiber glass is included within the cementitious mixture in the following amount, as measured by volume percent of the cementitious mixture:

| Example | Fiber Glass |
|---|---|
| 59 | 1% |
| 60 | 2% |
| 61 | 3% |

The resulting honeycomb structures have high strength, both in the green state and after they are cured, due to the reinforcing effect of the honeycomb structure. The honeycomb structures formed in these examples are more ductile than in Example 55, while the compressive strengths would be expected to be even greater. These materials can be used to form very strong, yet relatively lightweight walls of larger food and beverage packaging containers.

EXAMPLE 62

Using any of the foregoing compositions, corrugated cementitious sheets containing a fluted inner structure sandwiched between two flat sheets are formed. The flat outer sheets are formed by calendering a sheet of the material into a flat sheet of the appropriate thickness. The corrugated, or fluted inner sheet (which is similar to the fluted or corrugated inner sheet of an ordinary cardboard box) is formed by passing either a hardened or remoistened flat cementitious sheet of the appropriate thickness through a pair of rollers with intermeshing corrugated surfaces or teeth.

Glue is applied to the surfaces of the corrugated sheet, which is then sandwiched between two flat sheets and allowed to harden.

EXAMPLE 63

Using any of the foregoing compositions, the cementitious mixture is pressed or molded into the shape of a carton. Depending on the composition, the carton will exhibit high strength, durability, flexibility, low weight, and/or low density.

EXAMPLE 64

Using any of the foregoing compositions, the cementitious mixture is molded into the shape of a crate. This can be carried out by extruding a honeycomb structure or corrugated sheet, or by molding any other appropriate structure of adequate strength. Depending on the composition, the crate will exhibit high strength, durability, flexibility, low weight, and/or low density.

EXAMPLE 65

Using any of the foregoing compositions, the cementitious mixture is molded or pressed into the shape of a lid. Depending on the composition, the lid will exhibit high strength, durability, flexibility, low weight, and/or low density.

EXAMPLE 66

Using any of the foregoing compositions, the cementitious mixture is molded into the shape of a partition. Depending on the composition, the partition will exhibit high strength, durability, flexibility, low weight, and/or low density.

EXAMPLE 67

Using any of the foregoing compositions, the cementitious mixture is molded into the shape of a liner. Depending on the composition, the liner will exhibit high strength, durability, flexibility, low weight, and/or low density.

EXAMPLE 68

Using any of the foregoing compositions, the cementitious mixture is molded into the shape of a box. This may be carried out by extrusion, and/or calendering, and/or score cutting, and/or folding. Depending on the composition, the box will exhibit high strength, durability, flexibility, low weight, and/or low density.

EXAMPLE 69

Using any of the foregoing compositions, the cementitious mixture is blow molded into the shape of a bottle. Depending on the composition, the bottle will exhibit high strength, durability, flexibility, low weight, and/or low density.

EXAMPLE 70

Using any of the foregoing compositions, the cementitious mixture is molded into the shape of a utensil. Depending on the composition, the utensil will exhibit high strength, durability, flexibility, low weight, and/or low density.

EXAMPLES 71–88

Food and beverage containers were manufactured from cementitious sheets of varying thicknesses formed from a cementitious mixture containing the following components:

| | |
|---|---|
| Portland Cement | 1.0 kg |
| Perlite | 0.5 kg |
| Mica | 0.5 kg |
| Fiber (Southern pine) | 0.25 kg |
| Tylose ® FL 15002 | 0.2 kg |
| Water | 2.5 kg |

The portland cement, mica, fiber, Tylose®, and water were mixed together in a high shear mixer for 5 minutes, after which the perlite was added and the resulting mixture mixed for an additional 5 minutes in a low shear mixer. The cementitious mixture was then placed into an auger extruder and extruded through a die having an opening in the shape of a slit. Continuous sheets were extruded which had a width of 300 mm and a thickness of 6 mm.

The sheets were thereafter passed between one or more pairs of reduction rollers in order to obtain sheets having final thicknesses of 0.2 mm, 0.3 mm, 0.4 mm and 0.5 mm, respectively. The rollers had a diameter of 17 cm and were made of stainless steel coated with polished nickel to aid in preventing the cementitious mixture from sticking to the rollers. In addition, the rollers were heated to a temperature of 110° C. to further prevent sticking between the mixture and the rollers.

In order to obtain sheets having the desired thickness, the extruded sheets were reduced in steps by using reduction roller pairs having progressively smaller gap distances between the rollers. The sheet thicknesses were reduced as follows:

$$6 \text{ mm} \Longrightarrow 2 \text{ mm} \Longrightarrow 0.5 \text{ mm} \Longrightarrow 0.4 \text{ mm}$$
$$\text{or } 0.3 \text{ mm}$$
$$\text{or } 0.2 \text{ mm}$$

A combination of the extrusion process and the calendering process yielded sheets with substantially unidirectionally oriented fibers along the length (or direction of elongation) of the sheet. Because of this, the sheets had higher tensile strength in the lengthwise direction (10–12 MPa) compared to the widthwise direction (5–6 MPa).

The hardened cementitious sheets were finished, coated, and then formed into a number of different food and beverage containers. For example, a "cold cup" (such as those in which cold soft drinks are dispensed at fast food restaurants) was made by cutting an appropriate shape from a sheet, rolling the shape into the shape of a cup, adhering the ends of the rolled sheet using conventional water-based glue, placing a disc at the bottom of the cup and then crimping the bottom of the rolled wall portion in order to hold the bottom in place, and curling the rim of the cup to strengthen the rim and create a smoother drinking surface. Sheets having thicknesses of 0.3 mm and 0.4 mm were used.

The amount of deflection when applying a constant force 1 inch below the rim was comparable to conventional paper cups. The uncoated cementitious cups did not leak when an aqueous solution containing methylene blue and 0.1% surfactant was placed inside the cup for 5 minutes. Of course, any leakage that may occur could be prevented by an appropriate coating.

A "clam shell" container (such as those presently used in the fast food industry to package hamburgers) was made by cutting an appropriate shape from a sheet, score cutting the sheet to form the desired fold lines, folding the sheet into the shape of a clam shell container, and adhering the ends of the folded sheet (using both adhesive and interlocking flap means) to preserve the integrity of the container. Sheets having thicknesses of 0.4 mm and 0.5 mm were used.

The sheet was found to more easily bend or close together on the side of the sheet opposite the score cut. It should be noted that normal scores in conventional materials generally allow the sheet to more easily bend or close together on the side of the score. The resulting clam shell containers exhibited comparable or superior insulating ability compared to paper clam shells.

A french fry container (such as those used to serve cooked french fries in the fast food industry) was made by cutting an appropriate shape from a sheet, score cutting the sheet to form the desired fold lines, folding the sheet into the shape of a french fry container, and adhering the ends of the folded sheet using adhesive means to preserve the integrity of the container. Sheets having thicknesses of 0.25 mm, 0.3 mm, 0.35 mm, 0.4 mm, 0.45 mm, and 0.5 mm were used to make the french fry containers.

A frozen food box (such as those used by supermarkets to package frozen foods such as vegetables or french fries) was made by cutting an appropriate shape from a sheet, score cutting the sheet to form the desired fold lines, folding the sheet into the shape of a frozen food box, and adhering the ends of the folded sheet using adhesive means to preserve the integrity of the box. Sheets having thicknesses of 0.25 mm, 0.3 mm, 0.35 mm, 0.4 mm, 0.45 mm, and 0.5 mm were used to make the frozen food boxes.

A cold cereal box was made by cutting an appropriate shape from a sheet, score cutting the sheet to form the desired fold lines, folding the sheet into the shape of a cold cereal box, and adhering the ends of the folded sheet using adhesive means to preserve the integrity of the cereal box. Sheets having a thickness of 0.3 mm were used.

A straw was made by rolling a piece of a 0.25 mm sheet into the form of a straw and adhering the ends together using adhesion means known in the art. In making the straw, as in making each of the containers set forth above, it was advantageous to remoisten the sheet somewhat in order to temporarily introduce a higher level of flexibility into the sheet. This minimized splitting and tearing of the sheet. Nevertheless, the straw could be rolled and crimped without the remoistening of the sheet without visible tearing and splitting.

The containers were found to break down in the presence of water over time, with 1 day being the average time of disintegration. The excess waste material that was trimmed from the sheets when making the containers was easily recycled by simply breaking it up and mixing it back into the hydraulically settable mixture.

The various containers that were made are set forth as follows, including the thickness of the sheet used to make each container:

| Example | Container | Sheet Thickness |
| --- | --- | --- |
| 71 | cold cup | 0.3 mm |
| 72 | cold cup | 0.4 mm |
| 73 | clam shell | 0.4 mm |
| 74 | clam shell | 0.5 mm |
| 75 | french fry box | 0.25 mm |
| 76 | french fry box | 0.3 mm |
| 77 | french fry box | 0.35 mm |
| 78 | french fry box | 0.4 mm |
| 79 | french fry box | 0.45 mm |
| 80 | french fry box | 0.5 mm |
| 81 | frozen food box | 0.25 mm |
| 82 | frozen food box | 0.3 mm |
| 83 | frozen food box | 0.35 mm |
| 84 | frozen food box | 0.4 mm |
| 85 | frozen food box | 0.45 mm |
| 86 | frozen food box | 0.5 mm |
| 87 | cold cereal box | 0.3 mm |
| 88 | drinking straw | 0.25 mm |

EXAMPLE 89

The cementitious sheets used to manufacture the containers in Examples 71–88 could be printed using conventional printing presses used to print conventional paper sheets. The ink was able to dry as fast or faster compared to when using conventional paper sheets. The printed sheets could then be formed into any of the containers listed above the same as without being printed.

EXAMPLE 90

A printed cementitious sheet obtained in Example 89 was formed into the shape of a cup according to the procedure set forth in Example 71, except that the top rim was treated with a mineral oil lubricant prior to the step of curling the top of the cup. Nevertheless, as above, curling was possible without mineral oil. The cup had all of the necessary properties of weight, strength, and water resistance for commercial use in the fast food industry, as well as including identifying information.

EXAMPLE 91

Clam shell containers were made using the sheets made according to Examples 71–88. The sheets were tested to determine the optimum score cut depth which would allow for the easiest bend, while at the same time leaving a hinge with the highest strength and resilience. Score depths ranging between 20% to 50% were tested, with a score depth of 25% yielding the best results. In addition, it was found that thicker sheets (0.4–0.5 mm) gave a better score and yielded a stronger, more rigid clam shell container.

EXAMPLE 92

A clam shell was made using the sheets of Examples 71–88, except that a triple reverse hinge was used. That is, a series of three score cuts were cut into the outer side of the claim shell container. Because this decreased the distance that each individual score line had to bend, the resulting hinge could be opened and closed more times without breaking compared to a single score cut hinge.

EXAMPLE 93

Cold cups made according to Examples 71 and 72 were passed through a commercial wax coating machine, whereby a uniform layer of wax was applied to the surface. The layer of wax completely sealed the surface of the cup to moisture and rendered it watertight.

EXAMPLE 94

Cold cups made according to Examples 71 and 72 were coated with an acrylic coating using a fine spraying nozzle. As did the wax in Example 93, the layer of acrylic coating completely sealed the surface of the cup to moisture and rendered it watertight. However, the acrylic coating had the advantage that it was not as visible as the wax coating. Because a thinner acrylic coating was possible, the cup looked almost as if it were uncoated. The glossiness of the cup could be controlled by using different types of acrylic coatings.

EXAMPLE 95

Cold cups made according to Examples 71 and 72 were coated with a commercially used melamine coating using a fine spraying nozzle. As in Examples 93 and 94, the layer of melamine coating completely sealed the surface of the cup to moisture and rendered it watertight. However, the melamine coating was also less visible and could be applied in a thinner coat compared to the wax coating. The glossiness of the cup could be controlled by using different types of melamine coatings.

EXAMPLE 96

Cold cups made according to Examples 71 and 72 were coated with a totally environmentally sound coating consisting of a mixture of hydroxymethylcellulose plasticized with polyethylene glycol. This coating completely sealed the surface of the cup to moisture and rendered it watertight.

However, the surface looked even more natural and less glossy as compared to cups coated with wax, acrylic, or melamine.

EXAMPLES 97–100

Clam shell containers made according to Examples 73 and 74 were alternatively coated with the same coating materials used to coat the cold cups in Examples 93–96. The results were substantially identical to those achieved with the coated cups.

| Example | Coating Material |
| --- | --- |
| 97 | wax |
| 98 | acrylic |
| 99 | melamine |
| 100 | plasticized hydroxymethylcellulose |

EXAMPLES 101–104

French fry containers made according to Examples 75–80 were alternatively coated with the same coating materials used to coat the cold cups in Examples 93–96. The results were substantially identical to those achieved with the coated cups.

| Example | Coating Material |
| --- | --- |
| 101 | wax |
| 102 | acrylic |
| 103 | melamine |
| 104 | plasticized hydroxymethylcellulose |

EXAMPLES 105–108

Frozen food containers made according to Examples 81–86 were alternatively coated with the same coating materials used to coat the cold cups in Examples 93–96. The results were substantially identical to those achieved with the coated cups.

| Example | Coating Material |
| --- | --- |
| 105 | wax |
| 106 | acrylic |
| 107 | melamine |
| 108 | plasticized hydroxymethylcellulose |

EXAMPLES 109–112

Cold cereal boxes made according to Example 87 were alternatively coated with the same coating materials used to coat the cold cups in Examples 93–96. The results were substantially identical to those achieved with the coated cups.

| Example | Coating Material |
| --- | --- |
| 109 | wax |
| 110 | acrylic |
| 111 | melamine |
| 112 | plasticized hydroxymethylcellulose |

EXAMPLES 113–116

Drinking straws made according to Example 88 are alternatively coated with the same coating materials used to coat the cold cups in Examples 93–96. The results are substantially identical to those achieved with the coated cups with regard to the outer surface of the straws, although it is more difficult to adequately coat the inside of the straw in this manner.

| Example | Coating Material |
| --- | --- |
| 113 | wax |
| 114 | acrylic |
| 115 | melamine |
| 116 | plasticized hydroxymethylcellulose |

EXAMPLE 117

The same mix design set forth in Examples 71–88 was used to manufacture sheets of varying thickness between 0.25 mm and 0.5 mm. The mixing, extrusion, and calendering processes were in every way the same. Dry sheets of each thickness were cut into circular shapes and formed into paper plates using a commercial mechanical press fitted with progressive die used to make such plates out of paper stock. The details of the stamped cementitious plates stood out perfectly and were substantially similar in shape, strength and appearance compared to conventional paper plates. However, the cementitious plates were found to be more rigid than conventional paper plates and, hence, possess more structural integrity when food is placed on or within the plates.

EXAMPLE 118

Dry sheets obtained in Example 117 were first wetted to contain 5% additional water by weight of the initially dry sheet before they were pressed into plates (keeping in mind that the apparently "dry" sheets contain water within the hydraulically settable structural matrix even when they feel dry and possess maximum stiffness). The added water helped the sheets become more flexible (i.e., higher elongation before rupture) which resulted in a plate that had a better impression and detail compared to conventional paper plates formed by the same process. The press was heated to 200° C. and the extra water evaporated during the very short press time (<1 sec) through vent holes in the heated mold, yielding a dry product of higher stiffness than paper.

EXAMPLE 119

Dry sheets obtained in Example 117 were first wetted to contain 10% additional water by weight of the initially dry sheet before they were pressed into plates. The added water helped the sheets become even more flexible, although the impressions and detail were comparable to the results of Example 118. As a result of adding extra water, the molding took a little more time in order to drive off the extra water and form a plate that was substantially dry. It was found that the molding time could be reduced by increasing the temperature of the mold. The final product was stiffer than comparable paper plates.

EXAMPLE 120

Dry sheets obtained in Example 117 were first wetted to contain 20% additional water by weight of the initially dry sheet before they were pressed into plates. The added water helped the sheets become even more flexible than the sheets in Example 119 to the point where the molding process could be classified as a wet sheet molding process rather than dry sheet stamping. The resulting product was superior to a paper stamping process because there were no fold lines whatsoever in the pressed material. The final product was stiffer than comparable paper plates.

EXAMPLE 121

Dry sheets obtained in Example 117 were first wetted to contain 30% additional water by weight of the initially dry sheet before they were pressed into plates. The added water helped the sheets become slightly more flexible than the sheets in Example 120, although the molding process and results were similar. The resulting product was superior to a paper stamping process because there were no fold lines whatsoever in the pressed material. Because of the extra water, the molding process took a little longer than when less water was used to moisten the sheets. Heating the molds to a higher temperature was found to reduce molding times. The final product was stiffer than comparable paper plates.

EXAMPLE 122

The processes of Examples 117–121 were repeated in every way except that a commercial acrylic coating was applied to one side of the sheets prior to their being pressed into plates as above. In the case where a sheet was remoistened, the water was sprayed on the side opposite the side onto which the coating was placed. The coating provided the plates with a glossier surface and rendered them more water resistant.

EXAMPLE 123

The processes of Examples 117–121 were repeated in every way except that a commercial polyethylene coating was applied to one side of the sheets prior to their being pressed into plates as above. In the case where a sheet was remoistened, the water was sprayed on the side opposite the side onto which the coating was placed. The coating provided the plates with a glossier surface and rendered them more water resistant.

EXAMPLES 124–130

The processes set forth in Examples 117–123 were repeated except that the sheets were pressed into the shape of a bowl using a conventional press used to manufacture disposable paper bowls from paper stock. The cementitious bowls had a diameter of 15 cm and a depth of 3 cm. Because of the deeper impression and greater degree of bending and deformation necessary to form a bowl from a flat sheet, sheets having an added moisture content less than 10% yielded some defects. However, the use of at least 10% added water gave a good product with better impressions, no folding and a smoother surface compared to bowls made from paper.

| Example | Added Water | Coating |
|---------|-------------|---------|
| 124 | 0% | none |
| 125 | 5% | none |
| 126 | 10% | none |
| 127 | 20% | none |
| 128 | 30% | none |
| 129 | variable | acrylic |

-continued

| Example | Added Water | Coating |
|---------|-------------|---------|
| 130 | variable | polyethylene |

EXAMPLES 131–137

The molding processes set forth in Examples 117–123 were repeated except that the sheets were pressed into the shapes of a two part breakfast platter, including a top and bottom half. The top half had a length of 20 cm and a depth of 3.5 cm, while the bottom half had a length of 21 cm and a depth of 1.0 cm. Sheets having a thickness of 0.8 mm were used, yielding pieces which each weighed between 12–15 g. Although they were as similar in weight compared to existing breakfast platters used in the fast food industry, they were less flimsy.

The top and bottom halves were complementary in size and could be interlocked together to form a closed container using tabs on the sides of the top half and slots in the sides of the bottom half. The product was flexible enough that nonshattering failure occurred when crushed. Those that were coated exhibited a synergistic effect between the coating and the hydraulically settable structural matrix, wherein the product became stronger, tougher and more elastic before rupture due to the high elongation of the elastomeric coating.

| Example | Added Water | Coating |
|---------|-------------|---------|
| 131 | 0% | none |
| 132 | 5% | none |
| 133 | 10% | none |
| 134 | 20% | none |
| 135 | 30% | none |
| 136 | variable | acrylic |
| 137 | variable | polyethylene |

EXAMPLE 138

A two-part breakfast platter was manufactured using the mix design set forth in Examples 131–137, except that instead of drying and then rewetting the calendered sheet a wet sheet was directly molded into the shape of the breakfast platter. The wet sheet was readily molded and resulted in very few surface and structural defects. The breakfast platter made in this example had a thickness of 0.5 mm and possessed similar weight and insulation properties as the platter made in the previous examples.

EXAMPLE 139

Containers set forth above were placed in a microwave oven and tested for microwave compatibility; that is, they were tested to determine whether the containers themselves, or the food items within them, become hot when container and food were exposed to microwave radiation. Although the containers may have been expected to absorb some of the radiation and become hot in light of the water tied up within the hydraulically settable structural matrix, in fact, the containers themselves remained cool. Because of the low dielectric constant of the material, all of the energy was found to go into the food, not the container.

For the same reason, steam which may have condensed onto the surface of the container during initial stages of the microwaving was found to quickly revaporize under further microwaving. Therefore, when the food container was opened, no condensed steam was found on the surface of the container after the microwave process. Any excess steam comes out when the container is opened, leaving food which looks and tastes better. This is in sharp contrast to polystyrene containers, which tend to accumulate large amounts of condensed steam on the container surfaces, thereby rendering a "soggier," and hence less desirable, food product. In addition, polystyrene containers often melt if the food is heated too long.

The specific heats of the hydraulically settable materials of the present invention are relatively low, being about 0.9 J/g·K and having a low thermal constant within the range of 0.06–014 W/m·K. This allows for less thermal conductance from the food to the container during the microwave process. It was possible, therefore, to in all cases remove the container from the microwave without burning the hands. After the container was removed from the microwave oven it slowly warmed (by absorbing some of the heat within the food), but never became too hot to touch.

EXAMPLE 140

Flat paper-like sheets suitable for manufacturing a wide variety of food and beverage containers were manufactured from a hydraulically settable mixture containing the following:

| | |
|---|---|
| Portland Cement | 1.0 kg |
| Perlite | 0.3 kg |
| Hollow Glass Spheres (<0.1 mm) | 0.8 kg |
| Mica | 0.5 kg |
| Fiber (Southern pine) | 0.25 kg |
| Tylose ® FL 15002 | 0.2 kg |
| Water | 2.6 kg |

The cement, mica, fiber, Tylose®, and water were mixed together in a high shear mixer for 5 minutes, after which the perlite and hollow glass spheres were added and the resulting mixture mixed using low shear. The mixture was extruded using an auger extruder and a die into a sheet 30 cm wide and 0.6 cm thick. The sheet was passed successively between pairs of heated rollers in order to reduce the thickness of the sheet to between 0.1 mm and 2 mm.

As a result of the lower specific surface area of the glass spheres (200–250 m$^2$/kg) compared to perlite, the mixture of Example 140 yielded a product with a more uniform thickness and improved surface finish compared to the mix design of Examples 71–88. The reduced specific surface area of the aggregates reduced the amount of moisture that was removed when contacting the heated calendering rollers. The material, therefore, remains more moldable, retains the optimum rheology, and results in less microdefects and more uniformity during the calendering process.

EXAMPLE 141

The sheets made according to Example 140 were cut, rolled, and glued into 10 oz. drinking cups using a commercial paper cup manufacturing machine. The cups were alternatively coated with a wax coating in order to render them more waterproof.

EXAMPLE 142

The mix design and molding processes of Examples 71–88 were repeated in every way except that the mica was substituted with 0.5 kg kaolin. The sheets made using this alternative mix design yielded sheets that had a glossier surface than where mica was used. The glossier surface resulted from the alignment of the smaller kaolin particles within the sheet surface when the sheet was successively passed between a pair of calendering rollers, which also acted like a pair of smoothing rollers.

EXAMPLE 143

The mix design and molding process of Example 142 were repeated in every way except that 1.0 kg of kaolin was used. The sheets that were molded using this increased amount of kaolin had a smoother surface finish than when only 0.5 kg kaolin was used.

EXAMPLE 144

The mix design and molding process of Example 142 were repeated in every way except that 1.5 kg of kaolin was used. The sheets that were molded using this increased amount of kaolin had a smoother surface finish than when only 0.5 kg or 1.0 kg of kaolin was used. However, the increase in kaolin yielded a more brittle sheet. In addition, drying defects due to the increased specific surface area were somewhat problematic when passing the sheet between the reduction rollers.

EXAMPLE 145

The mix design and molding processes of Examples 71–88 were repeated in every way except that the perlite was excluded and the amount of mica was increased to 1.5 kg. The resulting sheets made using this alternative mix design had a smoother finish. However, the hydraulically settable structural matrix was more dense and more brittle. In addition, there was an increase in drying defects. The sheets could be rolled into cups but with minor surface defects in the form of cracks. Also curling of the top was less successful than in Examples 71 and 72.

EXAMPLE 146

The mix design and molding processes of Examples 71–88 were repeated in every way except that the amount of perlite was increased to 1.0 kg. The resulting sheets and containers made therefrom had a slightly lower density but also slightly lower strength and toughness.

EXAMPLE 147

The mix design and molding processes of Examples 71–88 were repeated in every way except that the amount of perlite was increased to 0.75 kg. The resulting sheets and containers made therefrom had a slightly lower density but also slightly lower strength and toughness. However, the strength characteristics were somewhat better than when 1.0 kg of perlite was used, as in Example 146.

EXAMPLE 148

The mix design and molding processes of Examples 71–88 were repeated in every way except that the amount of perlite was reduced to 0.25 kg. The resulting sheets and containers made therefrom had a higher fiber content and a slightly higher density, but had greater strength and toughness.

EXAMPLE 149

The mix design and molding processes of Examples 71–88 were repeated in every way except that perlite was eliminated from the mix design altogether. The resulting sheets and containers made therefrom had a slightly higher density, but had greater strength and toughness.

EXAMPLE 150

An insulating cup was manufactured by directly molding a hydraulically settable mixture that contained the following components:

| | |
|---|---|
| Portland cement | 1.0 kg |
| Hollow Glass Spheres (<1 mm) | 1.1 kg |
| Fiber (Southern Pine) | 0.08 kg |
| Tylose ® FL 15002 | 0.1 kg |
| Water | 2.5 kg |

The cement, fiber, Tylose® and water were mixed together for 5 minutes using a high shear mixer. Thereafter, the hollow glass spheres were added and the resulting mixture mixed for an additional 5 minutes in a low shear mixer. The resulting mixture had the consistency of a dough-like material and could be easily molded while retaining its shape while in the green state.

The mixture was molded using a male and female die pair into the shape of a cup. The mold dies where heated to a temperature of 110°–130° C. to prevent sticking. After demolding the cup was self-supporting in the green state. The green cup was allowed to dry.

The cup had a compressive strength of 1.1 MPa, a tensile strength of 0.8 MPa, and a k-factor of 0.07 W/m·K.

EXAMPLE 151

The mix design and molding processes of Example 150 were repeated in every way, except that the glass spheres were substituted with 1.1 kg of perlite. The resulting dried molded cup had a compressive strength of 8.0 MPa, a tensile strength of 3.2 MPa, and a k-factor of 0.14 W/m·K. Thus, the use of perlite instead of hollow glass spheres yields a cup with greatly increased tensile and compressive strength, but with a higher level of thermal conductivity.

EXAMPLE 152

The mix design and molding processes of Example 150 were repeated in every way, except that glass spheres having carefully graded diameters were used in order to increase the particle packing efficiency of the hydraulically settable material. In particular, 231 g of fine, 528 g of medium, and 341 g of coarse hollow glass spheres were included, for a total content of 1.1 kg. The average diameter of the hollow glass spheres designated as "fine" was 30 microns; of the "medium" was 47 microns; and of the "coarse" was 67 microns.

The mixture had better workability due to the decrease in interstitial spaces between the particles. The resulting cups had a smoother surface and slightly superior strength characteristics. The k-factor was 0.083 W/m·K (slightly higher than in Example 150) due to the slight decrease in interstitial space and increase in overall density of the material.

The following examples relate to tests that were performed in order to optimize the mix designs that would yield products having the preferred performance criteria. Although only sheets were made in the remaining test examples, it will be understood to one of ordinary skill in the art how such sheets could be formed into appropriate food or beverage containers using any of the methods (including the examples) set forth within the Specification. In addition, many of the mix designs could also have application in either direct molding or wet sheet molding of food or beverage containers.

EXAMPLES 153–158

Cementitious sheets having a thickness of 0.4 mm were manufactured according to the processes set forth in Examples 71–88 from a hydraulically settable mixture containing the following components:

| | |
|---|---|
| Portland Cement | 1.0 kg |
| Perlite | variable |
| Mica | 0.5 kg |
| Tylose ® FL 15002 | 0.2 kg |
| Fiber (Southern pine) | 0.25 kg |
| Water | variable |

The effect of adding varying amounts of perlite was studied to determine the effect on the properties of the material, particularly the strength properties of the hardened sheet. Because of the water-absorbing behavior of perlite, it was necessary to decrease the amount of water as the amount of perlite was decreased in order to maintain the same level of rheology and workability. The amount of perlite and water for each example was as follows:

| Example | Perlite | Water |
|---|---|---|
| 153 | 0.5 kg | 2.15 kg |
| 154 | 0.4 kg | 2.05 kg |
| 155 | 0.3 kg | 1.85 kg |
| 156 | 0.2 kg | 1.65 kg |
| 157 | 0.1 kg | 1.50 kg |
| 158 | 0.0 kg | 1.40 kg |

The extrusion and calendering processes had the effect of longitudinally orienting the fibers in a substantially unidirectional manner. Therefore, the sheets possessed a "strong" and a "weak" direction. The sheets were tested for tensile strength in the two directions, designated as 0° for the strong direction and 90° for the weak direction. In addition, for each sheet, the level of elongation before failure was measured as was Young's modulus of elasticity.

The sheets were also tested for strength in the intermediate, or 45°, direction although only exemplary results for tests in this direction are given. The tensile strength, elongation, and Young's modulus of the sheets in the 45° direction generally fell between those measured in the strong and weak directions, although as a general rule they were closer to the same properties measured in the weak direction. The results are set forth as follows:

| Example | Strength (MPa) 0° | 90° | Elongation (ΔL/L) 0° | 90° | Modulus (MPa) 0° | 90° |
| --- | --- | --- | --- | --- | --- | --- |
| 153 | 10.67 | 5.18 | 1.57% | 0.66% | 2297 | 1375 |
| 154 | 11.2 | 5.33 | 2.38% | 1.25% | 2156 | 1559 |
| 155 | 13.45 | 6.27 | 2.22% | 1.00% | 2956 | 1548 |
| 156 | 16.06 | 7.73 | 3.05% | 1.01% | 3006 | 1674 |
| 157 | 17.91 | 10.0 | 1.38% | 0.98% | 3375 | 2605 |
| 158 | 13.87 | 6.76 | 1.03% | 0.48% | 3058 | 2434 |

These examples demonstrate that as the amount of perlite was decreased (which increased the concentration of fiber), the tensile strength, elongation, and Young's modulus all increased, except after the amount of perlite was reduced below a certain amount. Both the tensile strength and the Young's modulus continued to increase until the perlite was left out altogether, as in Example 158. However, the ability of the material to elongate increased as the perlite was decreased, until less than 0.2 kg was used, after which the elongation dropped considerably. Reducing the amount of perlite beyond a certain point in this mix design results in an increased amount of defects in the sheets, which decreases the strength, elongation, and elasticity of the sheets.

However, in general, as the amount of perlite is decreased, the concentrations of fiber, rheology modifying agent, and hydraulic cement are increased, which would be expected to add to the tensile strength. In addition, increasing the concentration of cement would add to the stiffness (modulus) while negatively affecting the elongation ability of the product.

Another interesting point is that the ratio of tensile strength in the strong and weak directions was only about 2:1 in these sheets, whereas in paper products the ratio is typically 3:1.

While the sheets tested above were substantially dry, sheets made according to Examples 153–158 were further dried in an oven in order to obtain a sheet of maximum dryness. The further drying of the sheets was performed in order to portray a more accurate picture of the strength and other properties of the sheets under constant conditions. Depending on the mix designs, humidity during the test procedures, or other variables, the sheets would be expected to absorb or retain a certain amount of moisture. The strength, elongation, and modulus of elasticity results for the further dried sheets are set forth as follows:

| Example | Strength (MPa) 0° | 90° | Elongation (ΔL/L) 0° | 90° | Modulus (MPa) 0° | 90° |
| --- | --- | --- | --- | --- | --- | --- |
| 153 | 14.01 | N/A | 1.53% | N/A | 2559 | N/A |
| 154 | 13.6 | 6.23 | 1.34% | 1% | 1799 | 2071 |
| 155 | 16.81 | 8.11 | 1.76% | 1.08% | 2659 | 1587 |
| 156 | 19.32 | 8.91 | 1.82% | 1.16% | 4002 | 1609 |
| 157 | 20.25 | 11.23 | 1.41% | 0.63% | 3448 | 1536 |
| 158 | 17.5 | N/A | 0.81% | N/A | 3457 | N/A |

As shown by these examples, totally drying the sheets decreases the elongation somewhat, whereas the strength and modulus of elasticity are increased. These examples therefore teach that where increased strength and stiffness are important, the sheet should be totally dry. Where increased elongation is important, the elongation may be controlled with the humidity of the sheet.

EXAMPLES 159–163

Cementitious sheets having a thickness of 0.4 mm were manufactured according to the processes set forth in Examples 71–88 from a hydraulically settable mixture containing the following components:

| | |
| --- | --- |
| Portland Cement | 1.0 kg |
| $CaCO_3$ (talc) | variable |
| Tylose ® FL 15002 | 0.20 kg |
| Fiber (Southern pine) | 0.25 kg |
| Water | variable |

The effect of adding varying amounts of talc was studied to determine the effect on the properties of the material, particular the strength properties of the hardened sheet. Because of the reduced water-absorbing behavior of talc compared to perlite, it was not necessary to decrease the amount of water by the same level as the amount of talc was decreased in order to maintain the same level of rheology and workability. The amount of $CaCO_3$ and water for each example was as follows:

| Example | $CaCO_3$ | Water |
| --- | --- | --- |
| 159 | 5.0 kg | 2.25 kg |
| 160 | 4.0 kg | 2.15 kg |
| 161 | 3.0 kg | 2.05 kg |
| 162 | 2.0 kg | 2.00 kg |
| 163 | 1.0 kg | 1.96 kg |

The strength, elongation, and Young's modulus of each of the totally dry sheets formed from the different mix designs are set forth as follows:

| Example | Strength (MPa) 0° | 90° | Elongation (ΔL/L) 0° | 90° | Modulus (MPa) 0° | 90° |
| --- | --- | --- | --- | --- | --- | --- |
| 159 | 11.59 | N/A | N/A | N/A | N/A | N/A |
| 160 | 16.16 | N/A | 0.72% | N/A | 4638 | N/A |
| 161 | 14.82 | 5.22 | 0.97% | 0.42% | 4521 | 3521 |
| 162 | 20.43 | 8.26 | 1.11% | 0.56% | 4301 | 2773 |

| 163 | 18.43 | 7.98 | 1.13% | 0.51% | 3902 | 3320 |

The use of talc yields sheets with a smoother, more defect-free surface as well as a more homogeneous microstructure compared to where perlite is used.

EXAMPLES 164–170

Cementitious sheets having a thickness of 0.4 mm were manufactured according to the processes set forth in Examples 71–88 from a hydraulically settable mixture containing the following components:

| | | |
|---|---|---|
| Portland Cement | 1.0 kg | |
| Perlite | 0.5 kg | |
| Mica | 0.5 kg | |
| Tylose ® FL 15002 | variable | |
| Fiber (Southern pine) | 0.25 kg | |
| Water | variable | |

The level of Tylose® was altered in order to determine the effect of increasing amounts of Tylose® within the cementitious mixture. Increasing the amount of Tylose® within the mixture required the addition of more water in order to dissolve the Tylose® and maintain similar theology and workability.

| Example | Tylose ® | Water |
|---|---|---|
| 164 | 0.1 kg | 2.25 kg |
| 165 | 0.3 kg | 2.75 kg |
| 166 | 0.4 kg | 3.00 kg |
| 167 | 0.5 kg | 3.25 kg |
| 168 | 0.6 kg | 3.50 kg |
| 169 | 0.7 kg | 3.75 kg |
| 170 | 0.8 kg | 4.0 kg |

The tensile strength and elongation properties increased up to a point as more Tylose® was added, while the Young's modulus fluctuated. The results of testing oven dried sheets made using the various mix designs are as follows:

| Example | Strength (MPa) 0° | (MPa) 90° | Elongation (ΔL/L) 0° | (ΔL/L) 90° | Modulus (MPa) 0° | (MPa) 90° |
|---|---|---|---|---|---|---|
| 164 | N/A | N/A | N/A | N/A | N/A | N/A |
| 165 | 13.84 | 7.25 | 1.41% | 0.75% | 2954 | 1692 |
| 166 | 16.43 | 7.9 | 1.9% | 0.83% | 2400 | 2075 |
| 167 | 21.31 | 11.58 | 3.64% | 1.06% | 3347 | 2370 |
| 168 | 16.11 | 10.35 | 1.84% | 1.13% | 2816 | 1797 |
| 169 | 15.73 | 9.56 | 1.81% | 0.93% | 2690 | 1851 |
| 170 | 18.86 | 10.33 | 2.35% | 1.45% | 2790 | 1570 |

As illustrated, increasing the concentration of Tylose® will generally tend to increase the tensile strength, modulus, and elongation before rupture. A higher elongation ability would be expected to aid in curling the rim of a cup formed from a sheet, while increasing the strength of the sheet at a score cut. However, as the concentration of Tylose® is increased above a certain amount, the material becomes less workable and more defects are introduced within the structural matrix, which would be expected to reduce the strength, modulus, and elongation of the sheet. Nevertheless, the amount of defects (and resulting strength properties) can be improved by optimizing the calendering process.

EXAMPLE 171

Based on the understanding that tensile strength and elongation generally increase as both the amount of fiber and Tylose® are increased within a mix design, a mix design was made which maximized both. The cementitious mixture included the following components:

| | |
|---|---|
| Portland cement | 1.0 kg |
| Water | 2.2 kg |
| Perlite | 0.1 kg |
| Fiber (Southern pine) | 0.25 kg |
| Tylose ® FL 15002 | 0.5 kg |

The mixture was extruded and then passed between a series of pairs of rollers into a sheet having a thickness of 0.4 mm. The totally dried sheet was found to have superior strength and elongation properties. The tensile strength was tested as 39.05 MPa in the strong direction and 18.86 MPa in the weak direction; the elongation was 1.97% in the strong direction and 1.23% in the weak direction; and the modulus of elasticity was 3935 in the strong direction and 2297 in the weak direction, which is comparable to normal paper.

EXAMPLES 172–176

Cementitious sheets having a thickness of 0.4 mm were manufactured according to the processes set forth in Examples 71–88 from a hydraulically settable mixture containing the following components:

| | |
|---|---|
| Portland Cement | 1.0 kg |
| Hollow glass spheres (4000 psi) | variable |
| Tylose ® FL 15002 | 0.2 kg |
| Fiber (Southern pine) | 0.25 kg |
| Water | variable |

The effect of adding varying amounts of hollow glass spheres was studied to determine the effect on the properties of the material, particularly the strength properties of the hardened sheet. Although glass spheres do not absorb large amounts of water, less water was required to maintain the same rheology as the amount of glass spheres was decreased because of the corresponding decrease in interparticulate space. The amounts of glass spheres and water for each example are as follows:

| Example | Glass Spheres | Water |
|---|---|---|
| 172 | 0.5 kg | 1.6 kg |
| 173 | 0.4 kg | 1.45 kg |
| 174 | 0.3 kg | 1.40 kg |
| 175 | 0.2 kg | 1.35 kg |
| 176 | 0.1 kg | 1.25 kg |

The strength, elongation, and Young's modulus of each of the totally dry sheets formed from the different mix designs are set forth as follows:

| Example | Strength (MPa) 0° | (MPa) 90° | Elongation (ΔL/L) 0° | (ΔL/L) 90° | Modulus (MPa) 0° | (MPa) 90° |
|---|---|---|---|---|---|---|
| 172 | 10.34 | 3.69 | 2.2% | 1.52% | 1166 | 620 |
| 173 | 11.1 | 4.79 | 2.02% | 1.49% | 1446 | 677 |
| 174 | 12.38 | 5.71 | 1.58% | 1.15% | 1800 | 870 |
| 175 | 14.52 | 6.89 | 1.5% | 1.1% | 1935 | 1220 |
| 176 | 19.45 | 9.66 | 1.54% | 0.96% | 2660 | 1741 |

As seen with glass spheres, the modulus of elasticity is much lower while the elongation is fairly high compared to other mix designs. The sheets are therefore more pliable and elastic. The sheets formed in Examples 172–176 were highly thermally insulating, with k-factors ranging from 0.08–0.14 W/m·K.

EXAMPLES 177–180

Cementitious sheets having a thickness of 0.4 mm were manufactured according to the process set forth in Examples 71–88 from a hydraulically settable mixture containing the following components:

| | |
|---|---|
| Portland Cement | 1.0 kg |
| Perlite | 0.5 kg |
| Mica | variable |
| Tylose® FL 15002 | 0.2 kg |
| Fiber (Southern pine) | 0.25 kg |
| Water | variable |

The effect of adding varying amounts of mica was studied to determine the effect on the properties of the material, particularly the strength properties of the hardened sheet. Because of the water-absorbing behavior of mica, it was necessary to increase the amount of water as the amount of mica was increased in order to maintain the same level of rheology and workability. The amounts of mica and water within each example are as follows:

| Example | Mica | Water |
|---|---|---|
| 177 | 1.0 kg | 2.7 kg |
| 178 | 1.5 kg | 2.9 kg |
| 179 | 2.0 kg | 3.0 kg |
| 180 | 2.5 kg | 3.2 kg |

The strength, elongation, and Young's modulus of each of the totally dry sheets formed from the different mix designs are set forth as follows:

| Example | Strength (MPa) 0° | (MPa) 90° | Elongation 0° | (ΔL/L) 90° | Modulus 0° | (MPa) 90° |
|---|---|---|---|---|---|---|
| 177 | 9.92 | 4.61 | 0.825% | 0.652% | 2127 | 1257 |
| 178 | 9.37 | 5.3 | 0.71% | 0.49% | 3079 | 2188 |
| 179 | 11.14 | 4.05 | 0.79% | 0.314% | 3100 | 1520 |
| 180 | 11.41 | 4.76 | 0.58% | 0.32% | 2693 | 1282 |

Increasing the concentration of mica increases the strength of the sheets while reducing their elongation ability. Sheets containing larger amounts of mica became very brittle.

EXAMPLE 181

Using any of the mix designs set forth above, a hydraulically settable mixture is made by substituting gypsum hemihydrate for the hydraulic cement in roughly the same quantity by weight. The hydraulically settable mixture will have a faster setting time but will generally result in sheets having similar strength, elongation, and stiffness properties.

EXAMPLE 182

Using any of the mix designs set forth above, a hydraulically settable mixture is made by substituting calcium oxide for the hydraulic cement. The hydraulically settable mixture will have a slower setting time due to the slower reaction between calcium oxide and carbon dioxide, but will generally result in sheets having similar strength, elongation, and stiffness properties. However, by removing much of the water within the mixture during or after the molding process, a level of quickly attained green strength will be possible.

EXAMPLE 183

A hydraulically settable mixture is made having the following components:

| | |
|---|---|
| Gypsum hemihydrate | 1.0 kg |
| Perlite | 0.5 kg |
| Tylose® | 0.075 kg |
| Fiber | 0.25 kg |
| Water | 2.6 kg |

The gypsum, Tylose®, fiber, and water are mixed together in a high shear mixer for 3 minutes, after which the perlite is added and mixed in a low shear mixer for an additional 3 minutes.

The mixture is extruded into a sheet having a thickness of 6 mm and then calendered in steps in order to reduce the thickness of the sheets to a final thickness ranging between 0.25 mm to 0.5 mm.

These sheets are readily formed into an appropriate food or beverage container using any appropriate procedure set forth in this Specification. The strength properties are comparable to containers made using hydraulic cement and may be useful in the place of, e.g., paper, cardboard, or polystyrene containers.

EXAMPLE 184

Any of the cementitious mix designs using hydraulic cement is altered to include about 25% gypsum hemihydrate by weight of the hydraulic cement. The gypsum acts as a water absorbing component (or internal drying agent) and results in quicker form stability. The strength properties of containers formed therefrom are comparable to mixtures not including gypsum.

EXAMPLE 185

A set accelerator is included within any of the above mix designs, resulting in a hydraulically settable mixture that will more quickly achieve form stability. The final strength of the material will be comparable to materials in which a set accelerator is not used.

EXAMPLE 186

Waste cementitious containers were composted along with waste food. After 4 weeks, the containers were completely broken down and resulted in good compost.

IV. Summary.

From the foregoing, it will be appreciated that the present invention provides novel compositions and processes for hydraulically settable containers for the storage, dispensing, packing, and portioning of food and beverages.

The present invention also provides novel compositions and processes for hydraulically settable containers which have insulating and other properties comparable to that of polystyrene foam containers, but which are more environmentally neutral. Specifically, the present invention does not require the use of, or emit, chemicals which have been implicated as causing depletion of the ozone layer, nor does it create unsightly garbage which does not degrade, or which only very slowly degrades over time in landfills.

In addition, the present invention also provides novel compositions and processes for hydraulically settable containers which can be mass produced at relatively low cost.

Further, the present invention provides novel compositions and processes for hydraulically settable containers which are flexible and disposable, but which are much more environmentally sound in their disposal than other disposable containers, such as paper, plastic, polystyrene foam, and metal materials. The present invention provides novel compositions and processes for hydraulically settable containers which are essentially comprised of the same compounds as the earth, and are similar to dirt and rock, and therefore pose little or no risk to the environment when discarded.

The present invention further provides novel compositions and processes for which the raw materials may be obtained from the earth, eliminating the need to cut down large numbers of trees in order to create the starting raw materials, as is required for the manufacture of paper containers.

The present invention further provides novel compositions and processes for improving the safety of storage and dispensing containers, in that hydraulically settable containers do not release harmful chemicals like dioxin into the foodstuffs therein, nor are dioxins produced during the manufacture of such containers.

The present invention further provides novel compositions and processes for improving the recyclability of disposable containers, particularly since the hydraulically settable materials can be reintroduced into new cement paste as an aggregate, or be incorporated as a suitable aggregate in many cement applications.

The present invention further provides novel compositions and processes for achieving lightweight containers which still give sufficient structural support for the food or beverage product.

The present invention further provides novel hydraulically settable food and beverage containers which will maintain their shape without external support, even while in the green state immediately after molding, and rapidly achieve sufficient strength so that the molded containers can be handled using ordinary manufacturing methods.

The present invention may be embodied in other specific forms without departing from its spirit or essential characteristics. The described embodiments are to be considered in all respects as illustrative only and not restrictive. The scope of the invention is, therefore, indicated by the appended claims rather than by the foregoing description. All changes which come within the meaning and range of equivalency of the claims are to be embraced within their scope.

What is claimed is:

1. An article of manufacture comprising a food or beverage container formed from a hydraulically settable matrix, said matrix including the chemical reaction products of a hydraulically settable mixture comprising water, a rheology-modifying agent, and a hydraulically settable binder selected from the group consisting of portland cement, slag cement, calcium aluminate cement, silicate cement, phosphate cement, high-alumina cement, and magnesium oxychloride cement, the hydraulically settable mixture having a rheology and early green strength during formation of the food or beverage container such that the hydraulically settable mixture is form stable through the removal of water within a period of time less than about 10 minutes after being positioned into a desired shape of the food or beverage container, the hydraulically settable matrix having a density less than about 1.6 g/cm$^3$, a thickness less than about 5 mm, and a coating on at least a portion thereof.

2. An article of manufacture as defined in claim 1, wherein the coating is selected from the group consisting of melamine, polyvinyl chloride, polyvinyl alcohol, polyvinyl acetate, polyacrylate, hydroxypropylmethylcellulose, polyethylene glycol, acrylics, polyurethane, polyethylene, synthetic polymers, waxes, elastomers, and mixtures or derivatives thereof.

3. An article of manufacture as defined in claim 1, wherein the coating comprises a biodegradable material.

4. An article of manufacture as defined in claim 1, wherein the coating comprises polylactic acid.

5. An article of manufacture as defined in claim 1, wherein the coating is selected from the group consisting of sodium silicate, calcium carbonate, kaolin clay, ceramics, and mixtures thereof.

6. An article of manufacture as defined in claim 1, wherein the coating on at least a portion of the surface of the hydraulically settable matrix of the container prevents leaching of any material into or out of the hydraulically settable matrix through the coating.

7. An article of manufacture as defined in claim 1, wherein the coating on at least a portion of the surface of the hydraulically settable matrix of the container renders such portion of the surface waterproof.

8. An article of manufacture as defined in claim, 1, wherein the hydraulically settable matrix of the container is form stable in a period of time less than about one minute after being positioned into the desired shape.

9. An article of manufacture as defined in claim 1, wherein the hydraulically settable binder includes a portland cement.

10. An article of manufacture as defined in claim 1, wherein the hydraulically settable matrix includes fibers dispersed therein.

11. An article of manufacture as defined in claim 1, wherein the hydraulically settable matrix comprises a discontinuous, nonagglomerated phase including finely dispersed voids.

12. An article of manufacture as defined in claim 1, wherein the container is in the shape of a cup.

13. An article of manufacture as defined in claim 1, wherein the container is in the shape of a box for the dispensing of food products.

14. An article of manufacture as defined in claim 1, wherein the container is in the shape of a hingedly-closable box.

15. An article of manufacture as defined in claim 1, wherein the container is in the shape of a plate.

16. An article of manufacture as defined in claim 1, wherein the container is in the shape of an article selected from the group consisting of a jar, bottle, carton, case, clam shell, crate, bowl, tray, can, platter, and dish.

17. An article of manufacture comprising a food or beverage container formed from a hydraulically settable mixture comprising a hydraulically settable binder, water, and a rheology-modifying agent, the hydraulically settable mixture having a rheology and early green strength during formation of the food or beverage container such that the hydraulically settable mixture is form stable through the removal of water from the hydraulically settable mixture within a period of time less than about 10 minutes after being positioned into a desired shape of the food or beverage container, the hydraulically settable matrix having a density less than about 1.6 g/cm$^3$, a thickness less than about 5 mm, and a coating on at least a portion thereof, the article being in the shape of a box that includes a plurality of walls defining an interior and an opening which permits access to the interior, the box including at least one enclosure that is hingedly attached to a wall and selectively able to at least partially cover the opening.

18. An article of manufacture comprising a food or beverage container at least a portion formed from a hydraulically settable sheet having a coating thereon, the sheet formed from a hydraulically settable mixture including a hydraulically settable binder, water, fibers, and a rheology-modifying agent, wherein the hydraulically settable sheet is characterized in that it may be bent, folded or rolled with significant mechanical deformation after the sheet has been substantially dried without complete rupture of the sheet, said hydraulically settable sheet having a maximum thickness of about 5 mm.

* * * * *

UNITED STATES PATENT AND TRADEMARK OFFICE
CERTIFICATE OF CORRECTION

PATENT NO. : 5,514,430
DATED : May 7, 1996
INVENTOR(S) : Per Just Andersen, Ph.D. and Simon K. Hodson It is certified that error appears in the above-indentified patent and that said Letters Patent is hereby corrected as shown below:

Title page;

In Item No. 56, entitled "References Cited", subsection "OTHER PUBLICATIONS", at page 1, 2nd column, in the 14th line of text, change "Anderson" to --Andersen--.

At col. 1, lines 45-49, after "Technology" (line 45) delete the following text: "Just Andersen, Ph.D., and Simon K. Hodson, now issued U.S. Pat. No. 5,453,310. For purposes of disclosure, both of these applications are incorporated herein by specific reference."

At col. 8, line 13, after "made from" change "hydraulic" to --hydraulically--; at line 20, after "other" change "article" to --articles--.

At col. 22, line 59, after "flocculating" change "affects" to --effects--.

At col. 28, line 58, after "materials" delete ",".

At col. 29, line 28, change "Anderson" to --Andersen--.

At col. 40, line 57, after "suitable" change "theology" to --rheology--.

At col. 53, line 13, after "pressure" change "form" to --forming--.

UNITED STATES PATENT AND TRADEMARK OFFICE
CERTIFICATE OF CORRECTION

PATENT NO. : 5,514,430
DATED : May 7, 1996
INVENTOR(S) : Per Just Andersen, Ph.D. and Simon K. Hodson It is certified that error appears in the above-indentified patent and that said Letters Patent is hereby corrected as shown below:

At col. 56, line 13, after "through the" insert --drying--.

At col. 59, line 44, after "contact," change "and" to --or--, and after "thermographic" change "printers" to --printer--.

At col. 59, line 46, after "Of" change "coarse" to --course--.

At col. 87, line 24, after "similar" change "theology" to --rheology--.

At col. 92, line 25, after "claim" delete ",".

Signed and Sealed this

Twenty-seventh Day of August, 1996

Attest:

BRUCE LEHMAN

Attesting Officer     Commissioner of Patents and Trademarks